US007551764B2

(12) United States Patent
Chiles et al.

(10) Patent No.: US 7,551,764 B2
(45) Date of Patent: *Jun. 23, 2009

(54) CURRENCY BILL AND COIN PROCESSING SYSTEM

(75) Inventors: Mark G. Chiles, Montgomery, TX (US); Curtis W. Hallowell, Palatine, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 21 days.

This patent is subject to a terminal disclaimer.

(21) Appl. No.: 11/880,011

(22) Filed: Jul. 19, 2007

(65) Prior Publication Data

US 2007/0269097 A1 Nov. 22, 2007

Related U.S. Application Data

(63) Continuation-in-part of application No. 11/403,371, filed on Apr. 13, 2006, now Pat. No. 7,269,279, which is a continuation-in-part of application No. 10/368,144, filed on Feb. 18, 2003, now Pat. No. 7,158,662.

(60) Provisional application No. 60/367,171, filed on Mar. 25, 2002.

(51) Int. Cl.

*G06K 9/00* (2006.01)
*G07F 7/00* (2006.01)
*G07F 7/04* (2006.01)

(52) U.S. Cl. ........................ 382/135; 194/205; 194/206

(58) Field of Classification Search ................. 382/135, 382/136, 137, 138, 139, 140; 209/534; 194/206, 194/207, 208, 215, 216, 217, 346; 235/379, 235/419, 437, 462.1, 462.2, 476; 702/33, 702/34; 705/35, 40, 42, 45

See application file for complete search history.

(56) References Cited

U.S. PATENT DOCUMENTS 2,922,893 A 1/1960 Ett ............................ 250/219

(Continued)

FOREIGN PATENT DOCUMENTS

DE 2760269 7/1977

(Continued)

OTHER PUBLICATIONS

*Complaint Cummins-Allison Corp.* v. *Glory Ltd., Glory Shoji Co. Ltd., and Glory* (*U.S.A.*), *Inc*., Civil Action No. 02C-7008, N.D. Ill. 2002.

(Continued)

*Primary Examiner*—Abolfazl Tabatabai
(74) *Attorney, Agent, or Firm*—Nixon Peabody LLP

(57) ABSTRACT

A system for processing currency and other media includes a compact currency bill processing device, a coin scale, and a controlling device. The compact currency bill processing device is adapted to count and determine the denomination of currency bills received in an input receptacle and transported, one bill at a time, to at least one output receptacle. The coin scale adapted to receive and determine a coin total for at least one group of coins of a single denomination. The controlling device is communicatively coupled to the currency bill processing device and the coin scale, and includes an integrated keypad and printer. The keypad is adapted to manually receive information from an operator, and the printer is adapted to print a hardcopy of information associated with the currency bills, the coins, and other media.

33 Claims, 27 Drawing Sheets

U.S. PATENT DOCUMENTS 3,245,534 A 4/1966 Smith et al. .................... 382/7
3,246,295 A 4/1966 DeClaris et al. ............... 382/56
3,280,974 A 10/1966 Riddle et al. ............. 209/111.8
3,409,109 A 11/1968 Iizuka et al. ................... 194/4
3,480,785 A 11/1969 Aufderheide ............... 250/219
3,487,905 A 1/1970 James, Sr. ...................... 194/4
3,496,370 A 2/1970 Haville et al. ............... 250/219
3,509,535 A 4/1970 Berube ....................... 340/149
3,612,835 A 10/1971 Andrews et al. ...... 235/61.11 D
3,618,765 A 11/1971 Cooper et al. ............... 209/534
3,635,321 A 1/1972 Frazier, Sr. ..................... 194/4
3,679,314 A 7/1972 Mustert ........................ 356/71
3,759,382 A 9/1973 Walkley et al. .......... 209/111.7
3,764,899 A 10/1973 Peterson et al. ........... 324/61 R
3,778,628 A 12/1973 Novak et al. ................ 250/556
3,815,021 A 6/1974 Kerr ......................... 324/61 R
3,842,281 A 10/1974 Goodrich .................... 250/461
3,870,629 A 3/1975 Carter et al. ............. 209/111.8
3,906,449 A 9/1975 Marchak ................. 340/149 R
3,952,183 A 4/1976 Abe ....................... 235/92 SB
3,976,198 A 8/1976 Carnes et al. ......... 209/111.7 T
4,041,456 A 8/1977 Ott et al. ............... 340/146.3 R
4,081,131 A 3/1978 Sand et al. .................. 235/419
4,096,991 A 6/1978 Iquchi ........................ 235/419
4,114,804 A 9/1978 Jones et al. ................. 235/476
4,147,430 A 4/1979 Gorgone et al. ............... 356/51
4,164,770 A 8/1979 Jeffers ........................ 360/113
4,166,945 A 9/1979 Inoyama et al. ............. 235/379
4,167,458 A 9/1979 Louzos et al. ................. 204/14
4,179,685 A 12/1979 O'Maley ............ 340/146.3 H
4,243,216 A 1/1981 Mazumder .................. 271/122
4,250,806 A 2/1981 Boyson et al. ................. 101/2
4,255,651 A 3/1981 Phillips ....................... 235/92
4,275,874 A 6/1981 DiBlasio ..................... 271/187
4,277,774 A 7/1981 Fujii et al. ............... 340/146.3
4,283,708 A 8/1981 Lee ...................... 340/146.3 Z
4,288,781 A 9/1981 Sellner et al. ............... 358/486
4,302,781 A 11/1981 Ikeda et al. ................. 358/486
4,311,914 A 1/1982 Huber ........................ 250/556
4,313,598 A 2/1982 DiBlasio ..................... 271/124
4,334,619 A 6/1982 Horino et al. ............... 209/551
4,348,656 A 9/1982 Gorgone et al. ....... 340/146.3 R
4,349,111 A 9/1982 Shah et al. .................. 209/534
4,352,988 A 10/1982 Ishida ........................ 250/559
4,355,300 A 10/1982 Weber .................. 340/146.3 C
4,356,473 A 10/1982 Freudenthal ......... 340/146.3 H
4,365,700 A 12/1982 Arimato et al. ................ 194/2
4,381,447 A 4/1983 Horvath et al. .............. 250/223
4,386,432 A 5/1983 Nakamura et al. ............. 382/7
4,388,662 A 6/1983 Jeffers et al. ................ 360/113
4,413,296 A 11/1983 Jeffers ........................ 360/113
4,416,449 A 11/1983 McInerny ................... 271/122
4,420,153 A 12/1983 Winkler et al. .............. 271/304
4,442,541 A 4/1984 Finkel et al. ................... 382/7
4,461,028 A 7/1984 Okubo ........................ 382/15
4,464,786 A 8/1984 Nishito et al. .................. 382/7
4,464,787 A 8/1984 Fish et al. ...................... 382/7
4,470,496 A 9/1984 Steiner ....................... 194/4 C
RE31,692 E 10/1984 Tyburski et al. ................ 382/7
4,479,049 A 10/1984 Hirose ....................... 235/279
4,480,177 A 10/1984 Allen ......................... 235/379
4,482,058 A 11/1984 Steiner ....................... 209/534
4,487,306 A 12/1984 Nao et al. ................... 382/135
4,490,846 A 12/1984 Ishida et al. ................... 382/7
4,503,963 A 3/1985 Steiner .......................... 194/4
4,513,439 A 4/1985 Gorgone et al. ................ 382/7
4,532,641 A 7/1985 Nishimura ................... 377/14
4,539,702 A 9/1985 Oka ............................. 382/7
4,542,829 A 9/1985 Emery et al. ................ 209/534
4,547,896 A 10/1985 Ohtombe et al. ............ 382/318
4,553,846 A 11/1985 Hilton et al. ................ 356/429
4,556,140 A 12/1985 Okada .......................... 194/4
4,557,597 A 12/1985 Iwama ......................... 356/71
4,558,224 A 12/1985 Gober ..................... 250/460.1
4,559,451 A 12/1985 Curl ........................... 250/560
4,559,452 A 12/1985 Igaki et al. .................. 250/560
4,563,771 A 1/1986 Gorgone et al. ................ 382/7
4,567,370 A 1/1986 Falls ....................... 250/461.1
4,587,412 A 5/1986 Apisdorf ..................... 235/449
4,587,434 A 5/1986 Roes et al. .................. 250/556
4,588,292 A 5/1986 Collins ........................ 356/71
4,592,090 A 5/1986 Curl et al. ...................... 382/7
4,593,184 A 6/1986 Bryce et al. ................. 235/449
4,611,345 A 9/1986 Ohnishi et al. ................. 382/7
4,625,870 A 12/1986 Nao et al. ................... 209/534
4,628,194 A 12/1986 Dobbins et al. ............. 235/379
4,645,936 A 2/1987 Gorgone ..................... 250/556
4,646,767 A 3/1987 Hikita ........................ 133/8 R
4,653,647 A 3/1987 Hashioto .................... 209/534
4,658,289 A 4/1987 Nagano et al. ................ 358/75
4,674,060 A 6/1987 Larkin et al. ................ 364/567
4,677,682 A 6/1987 Miyaqawa et al. ............. 382/7
4,681,229 A 7/1987 Uesaka et al. ............... 209/534
4,683,508 A 7/1987 Jeffers et al. ................ 360/113
4,690,268 A 9/1987 Ueshin ....................... 198/399
4,694,963 A 9/1987 Takesako .................... 209/534
4,697,071 A 9/1987 Hiraoka et al. .............. 235/379
4,700,368 A 10/1987 Munn et al. .................... 377/8
4,707,843 A 11/1987 McDonald ..................... 377/8
4,716,456 A 12/1987 Hosaka ........................ 358/75
4,733,308 A 3/1988 Nakamura et al. .......... 358/496
4,747,492 A 5/1988 Saito et al. .................. 209/534
4,749,076 A 6/1988 Akagawa et al. ............ 194/207
4,749,087 A 6/1988 Buttifant ........................ 382/7
4,761,002 A 8/1988 Reed et al. ................. 271/111
4,764,725 A 8/1988 Bryce ......................... 324/234
4,764,976 A 8/1988 Kallin et al. ................. 382/65
4,784,274 A 11/1988 Mori et al.
4,787,518 A 11/1988 Yuge et al. .................. 209/534
4,817,176 A 3/1989 Marshall et al. ............... 382/43
4,820,909 A 4/1989 Kawaucki et al. ........... 235/379
4,823,393 A 4/1989 Kawakami ..................... 382/7
4,825,246 A 4/1989 Fukuchi et al. ................ 355/4
4,827,531 A 5/1989 Milford ......................... 382/7
4,841,358 A 6/1989 Kammato et al. ............. 358/75
4,850,468 A 7/1989 Kobayashi et al. .......... 194/207
4,881,268 A 11/1989 Uchida et al. .................. 382/7
4,905,840 A 3/1990 Yuge et al. .................. 209/534
4,906,988 A 3/1990 Copella ...................... 340/825
4,908,516 A 3/1990 West ......................... 250/556
4,922,109 A 5/1990 Bercovitz et al. ........... 250/556
4,973,851 A 11/1990 Lee ........................... 250/556
4,984,280 A 1/1991 Abe ............................. 382/7
4,984,692 A 1/1991 Obara ........................ 209/583
4,985,614 A 1/1991 Pease et al. ................. 235/440
4,992,860 A 2/1991 Hamaquchi et al. ........... 358/75
4,996,604 A 2/1991 Oqawa et al. ............... 358/486
5,012,932 A 5/1991 Omura et al. ............... 209/534
5,020,787 A 6/1991 Arikawa ........................ 271/3
5,027,415 A 6/1991 Hara et al. .................. 382/135
5,047,871 A 9/1991 Meyer et al. ................ 358/486
5,051,900 A 9/1991 Ito et al. ..................... 364/408
5,054,621 A 10/1991 Murphy et al. .............. 209/534
5,055,834 A 10/1991 Chiba ......................... 382/135
5,068,519 A 11/1991 Bryce ......................... 235/449
5,076,441 A 12/1991 Gerlier ....................... 209/534
5,105,364 A 4/1992 Kawamura et al. .......... 364/478
5,119,025 A 6/1992 Smith et al. ................. 324/252
5,122,754 A 6/1992 Gotaas ....................... 324/676
5,146,067 A 9/1992 Sloan et al. ................. 235/381
5,151,607 A 9/1992 Crane et al. ................. 250/556
5,163,672 A 11/1992 Mennie ...................... 271/187
5,167,313 A 12/1992 Dobbins et al. ............. 194/317
5,167,411 A 12/1992 Isobe ......................... 271/273

| | | | | |
|---|---|---|---|---|
| 5,172,907 A | 12/1992 | Kalisiak | 271/227 |
| 5,183,142 A * | 2/1993 | Latchinian et al. | 194/206 |
| 5,199,543 A | 4/1993 | Kamagami et al. | 194/207 |
| 5,201,395 A | 4/1993 | Takizawa et al. | 194/206 |
| 5,207,788 A | 5/1993 | Geib | 271/122 |
| 5,220,395 A | 6/1993 | Yamashita et al. | 355/313 |
| 5,236,072 A | 8/1993 | Cargill | 194/207 |
| 5,240,116 A | 8/1993 | Stevens et al. | 209/534 |
| 5,242,041 A | 9/1993 | Isobe | 194/207 |
| 5,251,738 A * | 10/1993 | Dabrowski | 194/206 |
| 5,259,490 A | 11/1993 | Gardellini | 194/207 |
| 5,261,518 A | 11/1993 | Bryce | 194/206 |
| 5,295,196 A | 3/1994 | Raterman et al. | 382/7 |
| 5,297,030 A | 3/1994 | Vassigh et al. | 364/405 |
| 5,301,786 A | 4/1994 | Yoshihara | 194/207 |
| 5,304,813 A | 4/1994 | DeMan | 250/556 |
| 5,308,992 A | 5/1994 | Crane et al. | 250/556 |
| 5,309,515 A | 5/1994 | Troung et al. | 382/7 |
| 5,341,408 A | 8/1994 | Melcher et al. | 377/8 |
| 5,358,088 A | 10/1994 | Barnes et al. | 194/206 |
| 5,363,949 A | 11/1994 | Matsubayashi | 194/206 |
| 5,367,577 A | 11/1994 | Gotaas | 382/135 |
| 5,394,992 A | 3/1995 | Winkler | 209/552 |
| 5,397,003 A | 3/1995 | Stevens et al. | 209/534 |
| 5,402,895 A | 4/1995 | Mikkelsen et al. | |
| 5,408,417 A | 4/1995 | Wilder | 364/479 |
| 5,418,458 A | 5/1995 | Jeffers | 324/235 |
| 5,419,423 A | 5/1995 | Ishida et al. | 194/206 |
| 5,421,443 A | 6/1995 | Hatamachi et al. | 194/206 |
| 5,430,664 A | 7/1995 | Cargill et al. | 364/550 |
| 5,437,357 A | 8/1995 | Ota et al. | 385/135 |
| 5,465,821 A | 11/1995 | Akioka | 194/207 |
| 5,467,405 A | 11/1995 | Raterman et al. | 382/135 |
| 5,467,406 A | 11/1995 | Graves et al. | 382/135 |
| 5,478,992 A | 12/1995 | Hamada et al. | 235/379 |
| D369,984 S | 5/1996 | Larsen | D10/97 |
| 5,547,062 A | 8/1996 | Mays et al. | |
| 5,553,320 A | 9/1996 | Matsuura et al. | 235/379 |
| 5,577,589 A | 11/1996 | Garcia Tinoco | 194/204 |
| 5,607,040 A | 3/1997 | Mathurin, Sr. | 194/207 |
| 5,616,915 A | 4/1997 | Simpkins et al. | 250/221 |
| 5,633,949 A | 5/1997 | Graves et al. | 382/135 |
| 5,639,081 A | 6/1997 | Hatamachi et al. | 271/177 |
| 5,640,463 A | 6/1997 | Csulits | 382/135 |
| 5,652,802 A | 7/1997 | Graves et al. | 382/135 |
| 5,657,846 A | 8/1997 | Schwartz | 194/206 |
| 5,680,472 A | 10/1997 | Conant | 382/135 |
| 5,687,963 A | 11/1997 | Mennie | 271/119 |
| 5,692,067 A * | 11/1997 | Raterman et al. | 382/135 |
| 5,704,491 A | 1/1998 | Graves | 209/534 |
| 5,724,438 A | 3/1998 | Graves | 382/135 |
| 5,751,840 A | 5/1998 | Raterman et al. | 382/135 |
| 5,761,089 A | 6/1998 | McInerny | 364/550 |
| 5,790,693 A | 8/1998 | Graves et al. | 382/135 |
| 5,790,697 A | 8/1998 | Munro et al. | 382/135 |
| 5,806,650 A | 9/1998 | Mennie et al. | 194/206 |
| 5,815,592 A | 9/1998 | Mennie et al. | 382/135 |
| 5,822,448 A | 10/1998 | Graves et al. | 382/135 |
| 5,832,104 A | 11/1998 | Graves et al. | 382/135 |
| 5,867,589 A | 2/1999 | Graves et al. | 382/135 |
| 5,870,487 A | 2/1999 | Graves et al. | 382/135 |
| 5,875,259 A * | 2/1999 | Mennie et al. | 382/135 |
| 5,905,810 A | 5/1999 | Jones et al. | 382/135 |
| 5,909,502 A | 6/1999 | Mazur | 382/135 |
| 5,909,503 A | 6/1999 | Graves et al. | 382/135 |
| 5,912,982 A | 6/1999 | Munro et al. | 382/135 |
| 5,915,518 A | 6/1999 | Hopwood et al. | 194/207 |
| 5,938,044 A | 8/1999 | Weggesser | 209/534 |
| 5,940,623 A | 8/1999 | Watts et al. | 395/712 |
| 5,943,655 A | 8/1999 | Jacobsen | 705/30 |
| 5,960,103 A | 9/1999 | Graves et al. | 382/135 |
| 5,966,456 A | 10/1999 | Jones et al. | 382/135 |
| 5,975,273 A | 11/1999 | Zwahlen et al. | 194/206 |
| 5,982,918 A | 11/1999 | Mennie et al. | 382/135 |
| 5,992,600 A | 11/1999 | Baudat | 194/207 |
| 5,992,601 A | 11/1999 | Mennie et al. | 194/207 |
| 6,012,564 A | 1/2000 | Mukai | 194/206 |
| 6,012,565 A | 1/2000 | Mazur | 194/207 |
| 6,021,883 A | 2/2000 | Casanova et al. | 194/217 |
| 6,026,175 A | 2/2000 | Munro et al. | 382/135 |
| 6,028,951 A | 2/2000 | Raterman et al. | 382/135 |
| 6,039,645 A | 3/2000 | Mazur | 453/10 |
| 6,068,194 A | 5/2000 | Mazur | 235/492 |
| 6,072,896 A | 6/2000 | Graves et al. | 382/135 |
| 6,073,744 A | 6/2000 | Raterman et al. | 194/207 |
| 6,074,334 A | 6/2000 | Mennie et al. | 493/438 |
| 6,128,402 A | 10/2000 | Jones et al. | 382/135 |
| 6,162,122 A | 12/2000 | Acres et al. | 463/29 |
| 6,220,419 B1 | 4/2001 | Mennie | 194/207 |
| 6,234,294 B1 | 5/2001 | Defeo et al. | 194/207 |
| 6,237,739 B1 | 5/2001 | Mazur et al. | 194/207 |
| 6,241,069 B1 | 6/2001 | Mazur et al. | 194/207 |
| 6,256,407 B1 | 7/2001 | Mennie et al. | 382/135 |
| 6,278,795 B1 | 8/2001 | Anderson et al. | 382/135 |
| 6,311,819 B1 | 11/2001 | Stromme et al. | 194/207 |
| 6,318,537 B1 | 11/2001 | Jones et al. | 194/346 |
| 6,351,551 B1 | 2/2002 | Munro et al. | 382/135 |
| 6,363,164 B1 | 3/2002 | Jones et al. | 382/135 |
| 6,371,303 B1 | 4/2002 | Klein et al. | 209/534 |
| 6,378,683 B2 | 4/2002 | Mennie | 194/207 |
| 6,381,354 B1 | 4/2002 | Mennie et al. | 382/135 |
| 6,398,000 B1 * | 6/2002 | Jenrick et al. | 194/200 |
| 6,459,806 B1 | 10/2002 | Raterman et al. | 382/135 |
| 6,460,705 B1 | 10/2002 | Hallowell | 209/534 |
| 6,493,461 B1 | 12/2002 | Mennie et al. | 382/135 |
| 6,539,104 B1 | 3/2003 | Raterman et al. | 382/135 |
| 6,560,355 B2 | 5/2003 | Graves et al. | 382/135 |
| 6,588,569 B1 | 7/2003 | Jenrick et al. | 194/206 |
| 6,601,687 B1 | 8/2003 | Jenrick et al. | 194/206 |
| 6,603,872 B2 * | 8/2003 | Jones et al. | 382/135 |
| 6,621,919 B2 | 9/2003 | Mennie et al. | 382/135 |
| 6,628,816 B2 | 9/2003 | Mennie et al. | 382/135 |
| 6,636,624 B2 | 10/2003 | Raterman et al. | 382/135 |
| 7,000,828 B2 | 2/2006 | Jones | 235/379 |
| 2001/0019624 A1 | 9/2001 | Raterman et al. | 382/135 |
| 2001/0035603 A1 | 11/2001 | Graves et al. | 271/265.01 |
| 2002/0001393 A1 | 1/2002 | Jones et al. | 382/100 |
| 2002/0020603 A1 | 2/2002 | Jones et al. | 194/346 |
| 2002/0056605 A1 | 5/2002 | Mazur et al. | 194/207 |
| 2002/0085245 A1 | 7/2002 | Mennie et al. | 358/498 |
| 2002/0085745 A1 | 7/2002 | Jones et al. | 382/135 |
| 2002/0103757 A1 | 8/2002 | Jones et al. | 705/45 |
| 2002/0104785 A1 | 8/2002 | Klein et al. | 209/534 |
| 2002/0107801 A1 | 8/2002 | Jones et al. | 705/45 |
| 2002/0118871 A1 | 8/2002 | Jones et al. | 382/137 |
| 2002/0122580 A1 | 9/2002 | Jones et al. | 382/137 |
| 2002/0126885 A1 | 9/2002 | Mennie et al. | 382/135 |
| 2002/0126886 A1 | 9/2002 | Jones et al. | 382/135 |
| 2002/0131630 A1 | 9/2002 | Jones et al. | 382/137 |
| 2002/0136442 A1 | 9/2002 | Jones et al. | 382/135 |
| 2002/0145035 A1 | 10/2002 | Jones | 235/379 |
| 2002/0154804 A1 | 10/2002 | Jones et al. | 382/135 |
| 2002/0154805 A1 | 10/2002 | Jones et al. | 382/135 |
| 2002/0154806 A1 | 10/2002 | Jones et al. | 382/135 |
| 2002/0154807 A1 | 10/2002 | Jones et al. | 382/135 |
| 2002/0154808 A1 | 10/2002 | Jones et al. | 382/135 |
| 2003/0009420 A1 | 1/2003 | Jones | 705/39 |
| 2003/0015395 A1 | 1/2003 | Hallowell et al. | 194/206 |
| 2003/0015396 A1 | 1/2003 | Mennie | 194/206 |
| 2003/0059098 A1 | 3/2003 | Jones et al. | 382/135 |
| 2003/0062242 A1 | 4/2003 | Hallowell et al. | 194/302 |
| 2003/0081824 A1 | 5/2003 | Mennie et al. | 382/135 |
| 2003/0108233 A1 | 6/2003 | Raterman et al. | 382/135 |
| 2003/0121752 A1 | 7/2003 | Stromme et al. | 194/207 |
| 2003/0121753 A1 | 7/2003 | Stromme et al. | 194/207 |
| 2003/0132281 A1 | 7/2003 | Jones et al. | 235/379 |

| | | | | |
|---|---|---|---|---|
| 2003/0139994 A1 | 7/2003 | Jones | ........................... | 705/36 |
| 2003/0168310 A1 | 9/2003 | Strauts et al. | ............... | 194/302 |
| 2003/0182217 A1 | 9/2003 | Chiles | ......................... | 705/35 |
| 2005/0205655 A1 | 9/2005 | Carter | ........................ | 235/7 R |

FOREIGN PATENT DOCUMENTS

| | | |
|---|---|---|
| DE | 2659929 | 11/1977 |
| DE | 2935668 | 9/1979 |
| EP | 0077464 | 4/1983 |
| EP | 0130824 | 6/1984 |
| EP | 0130825 | 6/1984 |
| EP | 0132329 | 6/1984 |
| EP | 0206675 | 6/1986 |
| EP | 0253935 | 10/1986 |
| EP | 0264125 | 10/1987 |
| EP | 0325364 | 7/1989 |
| EP | 0338123 | 10/1989 |
| EP | 0342647 | 11/1989 |
| EP | 0487 316 | 5/1992 |
| EP | 0613 107 | 8/1994 |
| GB | 2038063 | 7/1980 |
| GB | 2061232 | 5/1981 |
| GB | 2088832 | 6/1982 |
| GB | 2119138 | 11/1983 |
| GB | 2190996 | 12/1987 |
| GB | 2204166 | 11/1988 |
| JP | 54-60999 | 6/1979 |
| JP | 54-71673 | 6/1979 |
| JP | 54-71674 | 6/1979 |
| JP | 55-52538 | 12/1980 |
| JP | 56-16287 | 2/1981 |
| JP | 56-136689 | 10/1981 |
| JP | 58-139296 | 8/1983 |
| JP | 59-186079 | 10/1984 |
| JP | 59-231692 | 12/1984 |
| JP | 60-191379 | 9/1985 |
| JP | 60-215293 | 11/1985 |
| JP | 61-14557 | 4/1986 |
| JP | 61-82290 | 4/1986 |
| JP | 61-41439 | 9/1986 |
| JP | 62-220843 | 9/1987 |
| JP | 63-91794 | 4/1988 |
| JP | 63-271687 | 11/1988 |
| JP | 63-276688 | 11/1988 |
| JP | 64-64090 | 3/1989 |
| JP | 2-22786 | 1/1990 |
| JP | 2-12492 | 2/1990 |
| JP | 5-11355 | 7/1993 |
| WO | WO 81/01211 | 4/1981 |
| WO | WO 87/06041 | 10/1987 |
| WO | WO 90/07165 | 6/1990 |
| WO | WO 91/11778 | 8/1991 |
| WO | WO 92/17394 | 10/1992 |
| WO | WO 93/23824 | 11/1993 |
| WO | WO 94/19773 | 9/1994 |
| WO | WO 95/24691 | 9/1995 |
| WO | WO 96/10800 | 4/1996 |
| WO | WO 97/30422 | 2/1997 |

OTHER PUBLICATIONS

Redacted Declaration of Hiroya Mouri (12 pages) (Nov. 19, 2002).
Glory Model UF-1, Instruction Manual (30 pages) (date uncertain, prior to Nov. 20, 2002)(Japanese)[Nov. 19, 2002 Mouri Ex. 1].
Glory Model UF-1, Translation of Instruction Manual—(29 pages) (date uncertain, prior to Nov. 20, 2002) (Glory's translation) [Nov. 19, 2002 Mouri Ex. 1a].
Glory UF-1 brochure (2 page)(date unknown, prior to Nov. 20, 2002) (Japanese) [Nov. 19, 2002 Mouri Ex. 2].
Glory GFB-30 brochure (2 page) (date unknown, prior to Nov. 20, 2002) (Japanese) [Nov. 19, 2002 Mouri Ex. 3].
Glory GFB-30 operation manual (16 pages) (date unknown, prior to Nov. 20, 2002) (Japanese) [Nov. 19, 2002 Mouri Ex. 6].
Glory GSA-500 Service Manual (119 pages) (May 1989) [Nov. 19, 2002 Mouri Ex. 5].
Glory GFU-200 operator manual (26 pages) (date unknown, first page marked 92-3-2) (Japanese) [Nov. 19, 2002 Mouri Ex. 8].
Glory GFR-110 Instruction Manual—Currency Reader Counter (26 pages) (dated Aug. 23, 1999) [Nov. 19, 2002 Mouri Ex. 10].
Glory GFR-S Series Currency Counters/Discriminators GFR-S60; GFR-S80; GFR-S80V (4 pages) (date © 2002) [Nov. 19, 2002 Mouri Ex. 12].
Declaration of Sadaaki Uesaka (7 pages) (Nov. 19, 2002).
Glory's Monthly Newsletter, Jun. 1985 (38 pages) (Japanese) [Nov. 19, 2002 Uesaka Ex. 2].
Glory's Monthly Newsletter, Jun. 1985—partial translation (4 pages) [Nov. 19, 2002 Uesaka Ex. 3].
Glory Money O.A. Catalog, Jun. 1989 (44 pages) (Japanese) [Nov. 19, 2002 Uesaka Ex. 5].
Declaration of Akira Hoyo (5 pages) (Nov. 15, 2002).
Billcon D-202/204 Service Manual—Second Translation (Glory) (cover marked 630229) (25 pages) [Nov. 15, 2002 Hoyo Ex. 2a].
Billcon D-202/204—Nikkin Newspaper ad, Apr. 17, 1987 (2 pages) (Japanese) [Nov. 15, 2002 Hoyo Ex. 3].
Billcon D-202/204—Nikkin Newspaper ad, Apr. 17, 1987 (2 pages) (English translation) [Nov. 15, 2002 Hoyo Ex. 3a].
Billcon D-202/204 brochure (2 pages) (date uncertain, prior to Nov. 20, 2002) (Japanese) [Nov. 15, 2002 Hoyo Ex. 5].
Billcon D-202/204 brochure (2 pages) (date uncertain, prior to Nov. 20, 2002) (English translation) [Nov. 15, 2002 Hoyo Ex. 5a].
Billcon D-202/204 videotape of Japanese television show entitled "Small and Worldwide Companies" (allegedly aired Jan. 10, 1988) (Japanese) [Nov. 15, 2002 Hoyo Ex. 6].
Declaration of Philip C. Dolsen (6 pages)(Nov. 20, 2002).
Dolsen, Philip C. Cirriculum (4 pages) (Oct. 29, 2002) [Nov. 20, 2002 Dolsen Ex. 1].
OKI Semiconductor data book, MSM80C85A-2RS/GS/JS—8 Bit CMOS Microprocessor (10 pages) (alleged Mar. 1989) [Nov. 20, 2002 Dolsen Ex. 3A].
OKI Semiconductor data book, MSM80C88A-2RS/GS/JS—8 Bit CMOS Microprocessor (27 pages) (alleged Mar. 1989) [Nov. 20, 2002 Dolsen Ex. 3B].
Intel 80286, Intel data sheet, High Performance Microprocessor with Memory Management and Protection (28 pages; pp. 3-1 to 3-55) (alleged 1988) [Nov. 20, 2002 Dolsen Ex. 4].
NEC uPD780C-1 Microprocessor, NEC data book (23 pages; pp. 4-3 to 4-25) (alleged 1987) [Nov. 20, 2002 Dolsen Ex. 5].
NEC PD70216 processor, NEC data book (34 pages; pp. 3-161 to 3-227) (alleged 1987) [Nov. 20, 2002 Dolsen Ex. 6].
Dolsen claim chart for claims 40-43, 46-48, 76-78, 81, 101, 105, 108, 110-111 U.S. Pat. No. 6,459,806 [Nov. 20, 2002 Dolsen Ex. 7].
Glory GFR-S80V Operation Keys, pp. 1-11 (May 17, 2002) English (GL000106-116).
Glory Catalog pp. 4-11 listing various Glory machines including GFU-100, GFF-8CF, GFF-8, GFB-500/520, GFF-8E, and GSA-500 and maintenance policy and fees, English (GL001916-1923) (date uncertain, last page dated Aug. 15, 1990).
De La Rue 3000 Series Used banknote sorting machines, 10 legal size pages, English (GL001924-33) (date uncertain, prior to Nov. 4, 2002).
De La Rue 3400/3500 Series High Speed Currency Sorting Systems brochure, 4 pages, English (GL001934-37)(© 1989).
The New Billcon K-300 Series brochure, 2 pages, English (GL002389-90) (Dec. 1999).
The New Billcon N-Series Compact Note Counter brochure, 2 pages, English (GL00231-92) (© 2000).
The New Billcon K-300 Series Brochure, 2 pages, (© 1999) English (GL002396-97).
Billcon D-202/204 brochure, 2 pages, Japanese (date uncertain, prior to Nov. 7, 2002) (GL002398-99).
De La Rue Teller Cash Dispatch™ Applications brochure, 8 pages, (© 1999) English (GL002475-2482).
De La Rue Cash Systems, Coin Processing Banknote Counting brochure, 4 legal pages, (date uncertain, prior to Nov. 7, 2002) English (G1002485-88).

De La Rue Cash Systems, 2650 Currency Counting Machine brochure, 2 pages, (date uncertain, prior to Nov. 7, 2002) English (GL002489-90).
De La Rue Cash Systems, The Euro Range for Note and Coin Handling brochure, 4 pages, (date uncertain, prior to Nov. 7, 2002) English (GL002491-94).
Currency Systems International Cobra™ Banknote Sorter brochure, 3 pages, (© 2001) English (GL002495-97).
De La Rue Cash Systems Cobra™ 4004 Banknote Sorter brochure, 2 legal pages, (© 2001) English (GL002498-99).
De La Rue Cash Systems TCR Twin Safe™ Teller Cash Recycler, 2 pages, (© 2001) English (GL002500-01).
De La Rue's WestLB Panmure Marketing Pamphlet regarding Cash Systems Division, 16 pages, (Apr. 29, 2002) English (GL002502-17).
De La Rue Cash Systems 2800 VB Value Balancing currency counter brochure, 2 pages (Sep. 1999) English (GL002518-19).
De La Rue Cash Systems 8672 Máquina contadora de billetes brochure, 2 pages (date uncertain, handwritten date Nov. 1999) (Spanish) (GL002520-21).
Sprintquip Quicksort™ 2800 brochure, 2 pages, (hand dated Sep. 1999) English (GL002523-24).
Brandt® Model 8643 Currency/Document Counter brochure, 2 pages, (© 1995) English (GL002527-28).
De La Rue Cash Systems 2700VB Currency Counting Machine brochure, 2 pages (hand dated Sep. 1999) English (GL002529-30).
De La Rue Cash Systems Brandt 8625 Currency Counting Machine, 2 pages (hand dated Nov. 1999) English (GL002531-32).
De La Rue Cash Systems Branch Cash Automation Applications (Powerpoint), 28 pages, (date uncertain, prior to Nov. 7, 2002) English (GL002539-66).
De La Rue Commercial Self Service (Powerpoint), 24 pages, (date uncertain, prior to Nov. 7, 2002) English (GL002567-90).
De La Rue Automated Depositories (Powerpoint), 2 pages, (date uncertain, prior to Nov. 7, 2002) English (GL002591-92).
De La Rue Systems 2800VB Value Balancing Sorter/Counter brochure, 2 pages, (date uncertain, prior to Nov. 7, 2002) English (GL002593-94).
De La Rue Systems 2700VB Specification page of brochure, 1 page, (date uncertain, prior to Nov. 7, 2002) English (GL002595).
Magner® 15 Desktop banknote counter brochure, 2 pages, (date uncertain, prior to Nov. 7, 2002) English (Gl002596-97).
MAG II Model 20 Currency Counter brochure, 2 pages, (date uncertain, prior to Nov. 7, 2002) English (GL002605-06).
Banc Equip Magner Products Product Price List, 2 pages, (date uncertain, prior to Nov. 7, 2002) English (GL002613-14).
Magner Model 35 Currency Counting Machines brochure, 2 pages, (date uncertain, prior to Nov. 7, 2002) English (GL002625-26).
Magner 75 Series Currency Counting Machines brochure, 2 pages, (date uncertain, prior to Nov. 7, 2002) English (GL002627-28).
G&D BPS 200 Desktop Banknote Processing System brochure, 10 pages, (date uncertain, prior to Nov. 7, 2002) Englsih (GL002629-38).
G&D BPS 200 Desktop Banknote Processing System brochure, 2 pages, (date uncertain, prior to Nov. 7, 2002) English (GL002643-44).
G&D One Size Does Not Fit All! Brochure, 1 page, (date uncertain, prior to Nov. 7, 2002) English (GL002645).
G&D BPS 500 Banknote Processing System brochure, 4 pages, (date uncertain, prior to Nov. 7, 2002) English (GL002646-49).
G&D Numeron webpage picture of sorting machine and Design Award for Numeron, 2 page, (Mar. 29, 2002) (GL002650-51).
G&D BPS 200 Banknote Processing System brochure, 2 pages, (date uncertain, prior to Nov. 7, 2002) English (GL002652-53).
G&D BPS 500 Banknote Processing System brochure, 1 page (hand dated Sep. 1999) English (GL002654).
G&D Company Magazine, 36 pages, (Mar. 1998) English (GL002655-90).
G&D Cards and Card Systems brochure, 15 pages, (© 1998) English (GL002691-2705).
G&D Portrait of a Company Group brochure, 19 pages, (© 1997?) English (GL002706-24).
Mosler TouchSort™ *Plus* Currency Processing System brochure, 2 pages (© 1999) English (GL002727-28).
Mosler Satellite Branch Facilities—Riddell National Bank, Brazil, Indiana brochure, 1 page, (date uncertain, prior to Nov. 7, 2002) English (GL002729).
Mosler TouchSort™ Currency Processing System brochure, 2 pages, (date uncertain, prior to Nov. 7, 2002) English (GL002730-31).
Mosler marketing brochure, 4 pages, (© 1999) English, (GL002732-35).
Glory UC-10-10A Brochure, 2 pages, (date uncertain, prior to Nov. 7, 2002) Japanese (GL002777-78).
Glory UC-10A pamphlet, 1 legal page, (date uncertain, prior to Nov. 7, 2002) Japanese (GL002779).
Glory pamphlet of various machines, 1 legal page, (date uncertain, prior to Nov. 7, 2002) Japanese (GL002780).
Glory UF-1 brochure, 2 pages, (date uncertain, prior to Nov. 7, 2002) Japanese (GL002781-82).
Glory GFU-200 Desk-top Currency Fitness Sorter/Counter brochure, 2 pages, (date uncertain, prior to Nov. 7, 2002) English (GL002839-40).
Glory GFR-100 Currency Reader Counter brochure, 4 pages, (© 1995), English (GL002860-63).
Glory GFR-100 Currency Reader Counter Instruction Manual, 31 pages (Jan. 8, 1996) English (GL002864-94).
Glory Tank Currency Discriminators GFR-110 & GFR-S80 brochure, 2 pages, (© 2000) English (GL002959-60).
Glory Currency Reader Counter GFR-S80, S60 Instruction Manual, 33 pages (Nov. 1, 2000) English (GL002961-93).
Glory UW-100 Compact Currency Fitness Sorter brochure, 2 pages (© 1999) English (GL003027-28).
Glory Currency Fitness Sorter UW-100 Instruction Manual, 38 pages (Feb. 19, 2002) English (GL003029-66).
Glory UW-200 Multi-Purpose Company Currency Sorter brochure, 2 legal pages (© 1999) English (GL003067).
Glory Currency Sorter UW-200 With Fitness sorting mode (FIT) Instruction Manual, 44 pages (Oct. 23, 2001) English (GL003068-111).
Billcon D-202-204 brochures, 6 pages, (date uncertain, prior to Nov. 7, 2002) Japanese (Gl003112-17).
Billcon® R-900 E-DS Note Counter with Dual Speed and Denomination Sorting Function brochure, 2 pages, (date uncertain, prior to Nov. 7, 2002) English (GL003167-68).
Billcon R-900DS Currency Counter Operating Manual, 6 pages, (date uncertain, prior to Nov. 7, 2002) English (GL003169-74).
Billcon R-900 Currency Counter Service Manual (601221), 31 pages, (date uncertain, prior to Nov. 7, 2002) English (GL003175-3205).
Declaration of Toshio Numata (7 pages) (Nov. 16, 2002).
AFB: AFB Currency Recognition System, 1 page (1982).
Billcon: D-202, D204 Operator's Manual, 10 pages (cover marked 611215) (Japanese).
Billcon: D-202, D204 Operator's Manual—First Translation, 14 pages.
Billcon: D-202, D204 Operator'Manual—Second Translation (Glory), 10 pages.
Billcon: D-202/204 Service Manual, 25 pages (cover marked 630229) (Japanese) (date uncertain).
Billcon: D-202/204 Service Manual—Translation, 25 pages (date uncertain).
Banking Machine Digest No. 31, 3 pages (Japanese) (date uncertain).
First Translation of Banking Machine Digest No. 31, 3 pages (last page has date of Dec. 5, 1988).
Second Translation of Banking Machine Digest No. 31 (Glory), 2 pages (first page has date of Dec. 5, 1988).
Third Translation of Banking Machine Digest No. 31, 3 pages, (Last page has date of Dec. 5, 1988).
Billcon: 38$^{th}$ Banking Uniform Show (1 page) and translation (2 pages ) (1998).
Billcon: D212 Note Counter, 4 pages—Japanese and Translation (date uncertain).
Billcon: D212—Odd Bill Detecting Bill Counter—Instruction Manual, 17 pages, Japanese and translation (p. 17 dated 1994).

Cummins: JetScan—Model 4060—Currency Scanner/Counter—Operator's Manual, 44 pages, (Aug. 1991).
Cummins: Sale of JetScan Currency Scanner/Counter, Model 4060, 1 page, (Aug. 1991).
Cummins: JetScan—Model 4061—Currency Scanner/Counter—Operating Instructions, 47 pages, (Apr. 20, 1993).
Cummins: Sale of JetScan Currency Scanner/Counter, Models 4061, 1page, (Apr. 20, 1993).
Cummins: JetScan—Model 4062—Currency Scanner/Counter—Operating Instructions, 53 pages, (Nov. 28, 1994).
Cummins: Sale of JetScan Currency Scanner/Counter, Models 4062, 1 page, (Nov. 28, 1994).
Cummins: Offer for Sale of Optical/Magnetic Detection, 1 page, (Sep. 1992).
Cummins: Sale of Doubles Detection, 1 page, (Aug. 1991).
Cummins: Sale of Doubles Detection, 1 page, (Jun. 1992).
Cummins: Sale of Magnetic Detection, 1 page, (Aug. 1991).
Cummins: Sale of Multiple Density Sensitivity Setting, 1 page, (Apr. 1993).
Cummins: Sale of Multiple Magnetic Sensitivity Setting, 1 page, (Apr. 1993).
Cummins: Declaration of Per Torling, 6 pages, (Mar. 18, 1999).
*Cummins-Allison Corp*. v. *Glory U.S.A., Inc*., 2 pages, N.D. III. 1998.
Currency System International: Currency Processing System CPS 300, 4 pages, (© 1992).
Currency System International: Description of CSI CPS 600 and CPS 900 devices, 1 page (date: estimated 1994).
Currency Systems International: Medium Speed Currency Sorting Family, CPS 600 and CPS 900, 4 pages (© 1994).
Currency System International: CPS 1200, 4 pages, (© 1992).
Currency System International: Mr. W. Kranister in Conversation with Richard Haycock, 5 pages, (est. 1994).
De La Rue Systems: "The Processing of Money and Documents," 4 pages (© 1987).
De La Rue: 3100 Serie, L'Internationale des Machines a trier les Billets (© 1989) (French).
De La Rue Systems, 3100 Series Operation Instructions, 52 pages (Oct. 1986).
De La Rue Systems Currency Sorting Machines With Pattern Recognition: 3120 User Guide, 2 pages (1987).
De La Rue System Limited Use of The Diagnostics Function 3110 MK.II/3120 Machines, 20 pages (Oct. 1986) (printed Jan. 30, 2003).
De La Rue Systems U.S. Dollar Sorter: 3110 MK II International Currency Sorting machine—User Guide, 2 pages (1987).
De La Rue Systems: 2300 Series Note Counter—Making Technology Count, 4 pages, (1987).
De La Rue Systems: 2300—Operating Instruction Manual, 3 pages (© 1986).
De La Rue Systems: 2100 Banknote Counting Machine—Operator Instruction and Maintenance Sheet, 4 pages (© 1980).
De La Rue: 2700 Currency Counting Machine—User Guide, Revision 1, 53 pages, (Aug. 26, 1999).
De La Rue Systems: 2700VB brochure, 1 page, (Dec. 9, 1996).
De La Rue Systems: 9000 Series High Speed Document Reader/Sorters, 8 pages (© 1980).
G&D: CHP 50 User's Guide, 61 pages (Mar. 1998).
Glory: GFB 200/210/220/230 DeskTop Bank Note Counter brochure, 2 pages (est. before Aug. 9, 1994).
Glory: GFB-200, 210, 220 & 230 Banknote Counting Machine—Operator's Manual, 24 pages (Aug. 1994).
Glory: GFB 500/520 DeskTop Bank Note Counters brochure, 2 pages (Sep. 21, 1993).
Glory: GFB 500/520/600 Bank Note Counting Machine—Operating Instructions, 22 pages (1996).
Glory: GFB 700 Bank Note Counting Machine—Operating Instructions, 32 pages (Sep. 1998).
Glory: GFR 100 "Unstoppable" ReadMaster Currency Discriminator brochure, 2 pages (Aug. 6, 1998).
Glory: GFR 100 Currency Reader Counter—Instruction Manual, 30 pages (Aug. 15, 1995).
Glory: GFR 100 Currency Reader Counter—Instruction Manual, 32 pages (Aug. 20, 1998).
Glory: GFR 100 and GFB 700 Tank Tough Currency Discriminators brochure, 2 pages (Aug. 6, 1998).
Glory: GFR-110 and GFR-S80 Tank Tough Currency Discriminator brochure 2 pages (Dec. 7, 1999).
Glory: GFRT1 Currency Scanner, 1 page, (Dec. 1994).
Glory: GFR-X Banknote Counter with Denomination Recognition, 3 pages (est. Dec. 1994).
Glory: UF-1D brochure and translation, 2 pages (est. before Aug. 9, 1994).
Glory: UW-100 Compact Currency Fitness Sorter, 2 pages (© 1999).
Glory: UW-200 Multi-Purpose Compact Currency Sorter, 4 pages (© 1999).
Glory: GSA-500 Sortmaster brochure, 2 pages (est. Jan. 14, 1994).
Glory: GSA-500 Sortmaster brochure, 4 pages (est. Jan. 14, 1994).
Glory: GSA-500—Instruction Manual, 40 pages (prior to Jul. 1998).
Glory: GSA-500—Operating Procedures, 9 pages (prior to Jul. 1998).
Glory: Sale of Glory GSA-500 Sortmaster, 1 page (1986).
Glory: Cash Handling Systems Product Brochure, 11 pages (Apr. 25, 1994).
JCM: BC-30 Bill Counter, 2 pages (date unknown, prior to Aug. 2002).
JCM: DBC-3 U.S. Dollar Bank Note Checker, 2 pages (date unknown, prior to Aug. 2002).
Mosler Toshiba: CF-400 Series Currency Sorter, 4 pages (© 1983).
MoslerToshiba: CF-400 Series Fitness Sorter, 6 pages (estimated 1989 or earlier).
Mosler/Toshiba CF-420 brochure, "Wouldn't It Be Great . . . ," 4 pages (© 1989).
Mosler: CF-420 Cash Management System—Operator's Manual, 72 pages, (© 1989).
Mosler: CF-420 Cash Management System—Operator's Manual, Chapter 5, 18 pages, (© 1989).
Mosler: CF-420 Cash Management System—Operator's Manual, Chapter 7, 15 pages, (© 1989).
Toshiba/Mosler: CF-420—Drawings of portions of Mosler CF-420 Cash Management System (Figs. A-C) and description of the same, 4 pages (1989).
Toshiba/Mosler: CF-420—Description of Toshiba/Mosler CF-420 Device, 1 page (date estimated 1989).
Mosler/Toshiba: Model CS 6600—Optical Currency Counter/Sorter, 4 pages, (© 1985).
Mosler/Toshiba: Model CS 6600—Optical Currency Counter/Sorter, 4 pages (© 1992).
Mosler/Toshiba: Model CS-6600 Currency Handler brochure—"Let Mosler Help You Cut Costs Four Ways," 4 pages (© 1993).
Musashi Co.: New Generation-tellac-5 Series Compact Currency Counter, 2 pages (1988).
Musashi Co.: Operation Manual for Maintenance and Learning Modes for Tellac-5, 5DD, SD, DDA, A & SSD, 13 pages (prior to Aug. 2002).
Toyocom: Model NS-100—News Product News by Toyocom—"Toyocom Currency Counter Now Reads Denominations," 1 page (Sep. 26, 1994).
Toyocom: Model NS-100—Operation Guide Preliminary, 37 pages, (Jun. 13, 1995).
Japanese Reference X and Statement of Relevance, 6 pages, (date uncertain).
Geldinstitute—3 , 2 pages (1983).
Translation for Geldinstitute—5, 5 pages (1983).
Armor Safe Technologies, LLC of Texas, Armor Safe brochure entitled "Welcome to Armor Safe Technologies, Changing the Way The World Counts Cash" (1 page) (Printed on Jun. 29, 2007 from www.armorsafe.com website).
Tidel brochure entitled "Tidel Cash Management Solutions" (1 page) (Printed on Jul. 19, 2007 from www.tidel.com website).
NamSys Inc brochure entitled "Specializing In Currency Management Solutions" (2 pages) (Printed on Jun. 29, 2007 from www.namsys.com website).
Corporate Safe Specialists brochure entitled "Security Innovation Service" (1 page) (Printed on Jun. 29, 2007 from www.corporatesafe.com website).

Wincor Nixdorf brochure entitled Bulk coin deposit/single coin dispensing (1 page) (Printed on Jun. 29, 2007 from www.wincor-nixdorf.com website).
Tranax Technologies brochure entitled "Tranax" (1 page) (Printed on Jun. 29, 2007 from www.tranax.com website).
PCT International Search Report for International Application No. PCT/US2007/09134 dated Sep. 22, 2007 (2 pages).

* cited by examiner

CURRENCY BILL AND COIN PROCESSING SYSTEM

CROSS-REFERENCE TO RELATED APPLICATION

This application is a continuation in part of U.S. patent application Ser. No. 11/403,371, filed on Apr. 13, 2006, which is a continuation in part of Ser. No. 10/368,144 filed Feb. 18, 2003 U.S. Pat. No. 7,158,662, issued on Jan. 2, 2007, claiming priority to U.S. Provisional Patent Application Ser. No. 60/367,171, filed on Mar. 25, 2002.

FIELD OF THE INVENTION

The present invention relates generally to the field of currency processing systems and, more particularly, to a system for processing coins and currency bills using a coin scale communicatively coupled to a currency bill processing machine.

BACKGROUND OF THE INVENTION

Generally, most currency processing machines used in banks and retail environments either process currency bills or count coins, but not both. One type of machine that does process both coins and currency bills is a redemption type of machine for exchanging bulk coins and currency bills for larger denomination currency bills. These machines can be found in a casino environment, for example. However, these are typically higher-end machines that are expensive and quite large, occupying a lot of floor space.

In other environments, including banks and casinos, the currency bills and coins are processed by two different devices. For example, a currency bill processing machine may be used to process the currency bills, while a coin processing device may be used to process the coins. Coin counters, coin sorters, and coin scales are examples of devices used to process coins. Use of a coin scale requires that the coins be sorted before using the coin scale as coin scales are capable of only processing one coin denomination at a time. Nevertheless, two separate machines are generally used to process currency bills and coins.

One drawback associated with using two separate machines—a currency bill processing device and a coin processing device—is the increased floor or counter space that accompanies the use of two separate machines. Another drawback associated with the use of two separate machines for processing currency bills and coins is that an operator processing the currency has to manually add, or at least manually enter, the totals from the coin and currency bill processing—a process that carries with it the potential for human error. Furthermore, manual entry adds to the overall time in which it takes to process the coins and currency bills. Therefore, a need exists for a small, compact, and inexpensive currency processing system that reduces the time required to process currency bills and coins.

SUMMARY OF THE INVENTION

According to one embodiment, a system for processing currency and other media includes a compact currency bill processing device, a coin scale, and a controlling device. The compact currency bill processing device is adapted to count and determine the denomination of currency bills received in an input receptacle and transported, one bill at a time, to at least one output receptacle. The coin scale adapted to receive and determine a coin total for at least one group of coins of a single denomination. The controlling device is communicatively coupled to the currency bill processing device and the coin scale, and includes an integrated keypad and printer. The keypad is adapted to manually receive information from an operator, and the printer is adapted to print a hardcopy of information associated with the currency bills, the coins, and other media.

According to another embodiment, a method processes currency bills and coins using a compact currency processing system. The method includes counting currency bills of a plurality of denominations using a currency bill processing device to determine a currency bill total, and determining a coin total for at least one group of coins of a single denomination using a coin scale. The method further includes prompting operator input on a display of a controlling device. The controlling device is communicatively coupled to the currency bill processing device and the coin scale, and the display is integrated into a housing of the controlling device. Operator input is received via a keypad of the controlling device, the keypad being integrated into the housing of the controlling device. An aggregate total is determined corresponding to the sum of the currency bill total and the coin total. A hardcopy of information is printed on a printer of the controlling device, the hardcopy of information being associated with the currency bills and the coins. The printer is integrated into the housing of the controlling device.

According to yet another embodiment, a currency processing system includes a supporting enclosure, a currency bill processing device, a coin scale, and a controlling device. The supporting enclosure includes an interior tray, the interior tray being movable between an extended position and a retracted position. The extended position of the interior tray being such that the interior tray is at least partially outside a main frame of the supporting enclosure, the retracted position being such that the interior tray is completely inside the main frame of the supporting enclosure. The currency bill processing device, which determines a currency bill total, is located on a top surface of the supporting enclosure. The coin scale determines a coin total for at least one group of coins of a single denomination. The coin scale is located on the interior tray of the supporting enclosure. The controlling device is communicatively coupled to the currency bill processing device and the coin scale, and is located on the interior tray of the supporting enclosure. The controlling device includes an integrated keypad and an integrated printer.

The above summary of the present invention is not intended to represent each embodiment, or every aspect, of the present invention. Additional features and benefits of the present invention will become apparent from the detailed description, figures and claims set forth below.

Figure 1:
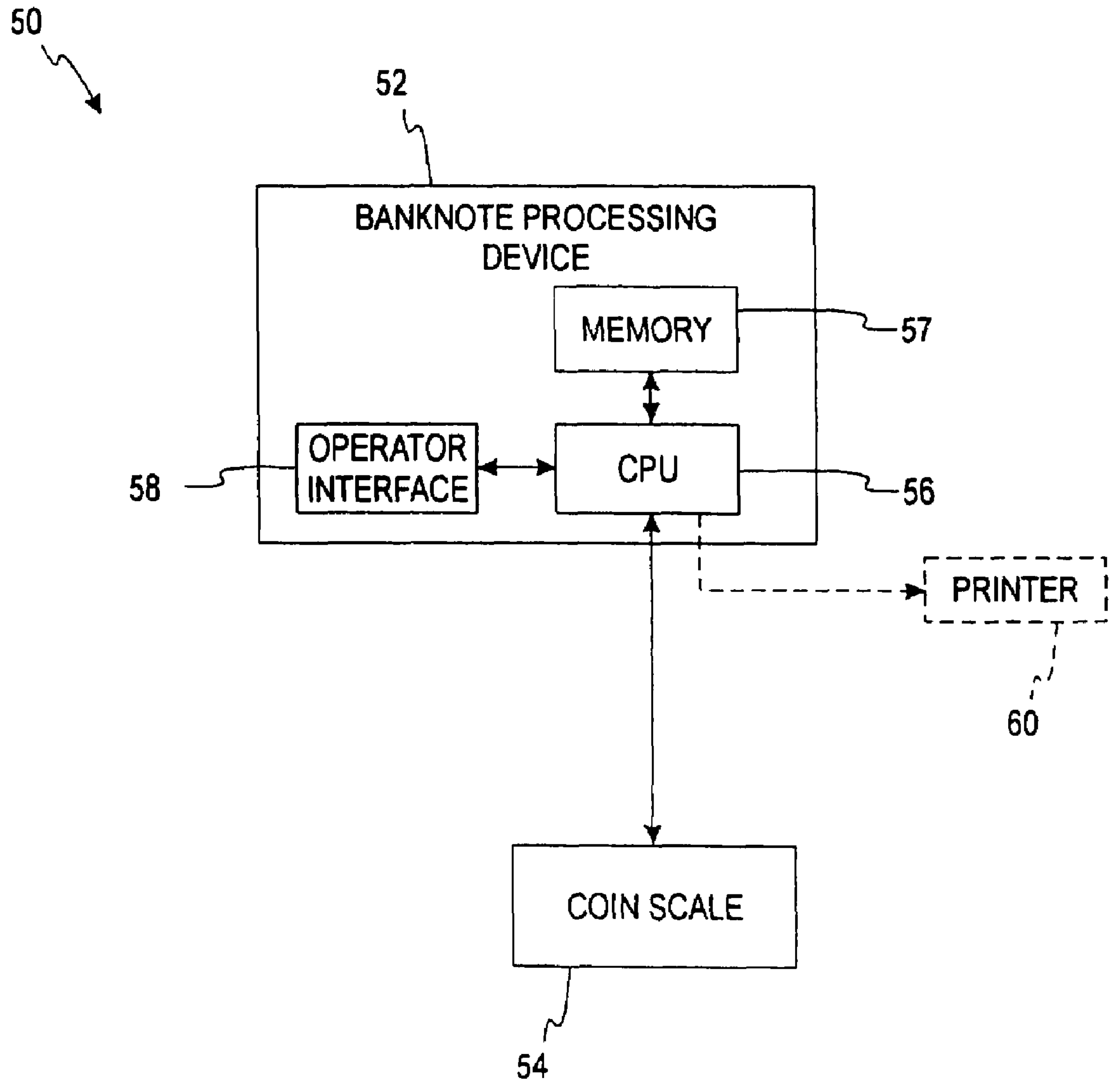
FIG. 1 is a functional block diagram of a currency bill and coin processing system according to one embodiment of the present invention.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents and alternatives falling within the spirit and scope of the invention as defined by the appended claims.

DETAILED DESCRIPTION OF THE ILLUSTRATED EMBODIMENTS

Referring now to FIG. 1, a functional block diagram of a currency bill and coin processing system 50 is shown according to one embodiment of the present invention. One use of the currency bill and coin processing system 50 is to total currency bills and coins in a batch such as, for example, a cash till drawer at a bank or a retail store. The currency bill processing system 50 includes a compact currency bill processing device 52 for counting currency bills and/or other media, and a coin scale 54 for counting coins, currency, and/or other media. The currency bill processing device 52 and the coin scale 54 are communicatively linked for summing currency bill totals and coin totals determined by the respective devices. The currency bill processing device 52 and the coin scale 54 may be communicatively linked by way of wires or by a wireless communication system according to alternative embodiments of the currency bill and coin processing system 50. According to alternative embodiments of the present invention, the currency bill processing device 52 can denominate and authenticate currency bills in addition to counting currency bills and the coin scale 54 can "count" (calculate value from weight) bagged coins, rolled coins, coins in other containers, loose coins and currency bills as is described in further detail below.

The currency bill processing device 52 includes a processor such as a central processing unit (CPU) 56 for controlling the operation of the device 52 and the coin scale 54. The CPU 56 is linked to a memory 57 for storing information such as currency bill processing results, coin weight, and count totals as well as master authenticating characteristic information for use in authenticating currency bills, master denominating characteristic information for use in denominating currency bills, and the algorithms necessary for calculating coin and currency bills totals with the coin scale 54. In an alternative embodiment of the currency bill and coin processing system 50, the CPU 56 is an integral component of the coin scale 54, as opposed to the currency bill processing device 52. In another alternative embodiment, the currency bill and coin processing system 50 is controlled by a personal computer that is linked to the system 50.

The currency bill and coin processing system 50 includes an operator interface 58 communicatively linked to the CPU 56 for receiving input from and displaying information to an operator of the system 50. The operator interface 58 can comprise an LCD display and a keypad or a touch-screen according to alternative embodiments of the present invention. According to the embodiment of the system 50 shown in FIG. 1, the operator interface 58 is part of the currency bill processing device 52. In alternative embodiments of the currency bill and coin processing system 50, the operator interface 58 is a component of the coin scale 54, or part of an external personal computer linked to the system 50. According to another alternative embodiment, the currency bill and coins processing system is linked to an optional printer 60 for providing an operator with a hardcopy of totals and results from the processing of currency bills, coins, or bills with the system 54.

Figure 2:
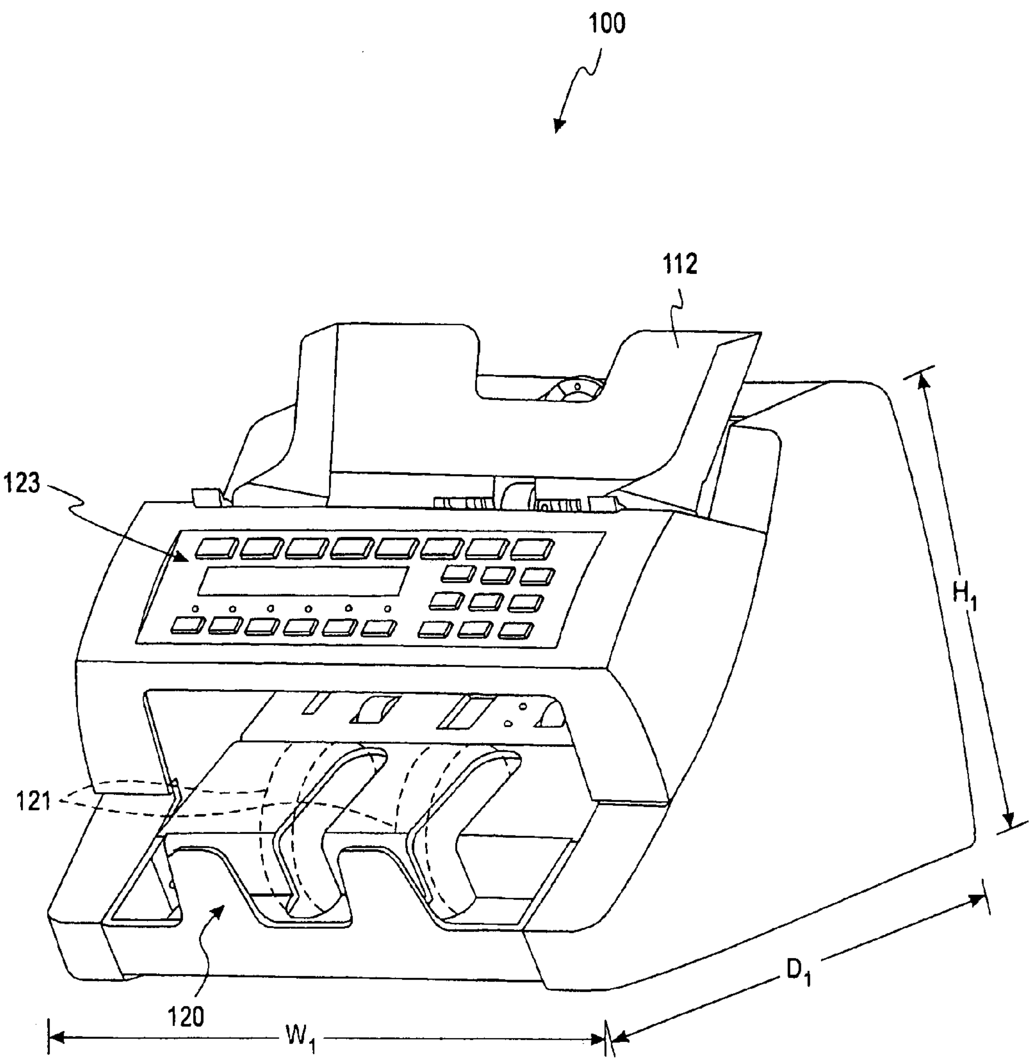
FIG. 2 is a perspective view of a single-pocket currency bill processing device for use with the currency bill and coin processing system of FIG. 1.
Figure 3:
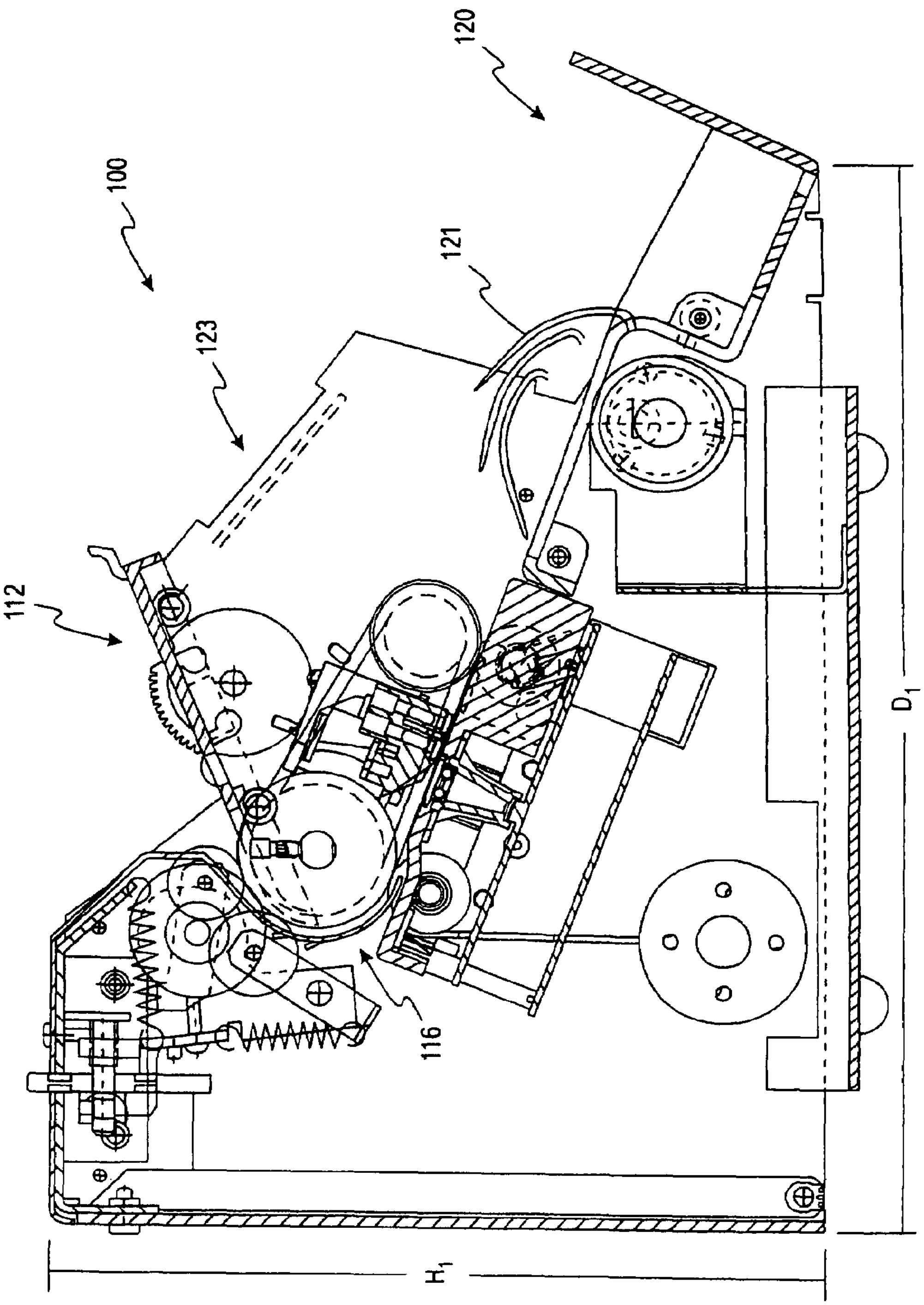
FIG. 3 is a cross-sectional view of the single-pocket device of FIG. 2.
Figure 4:
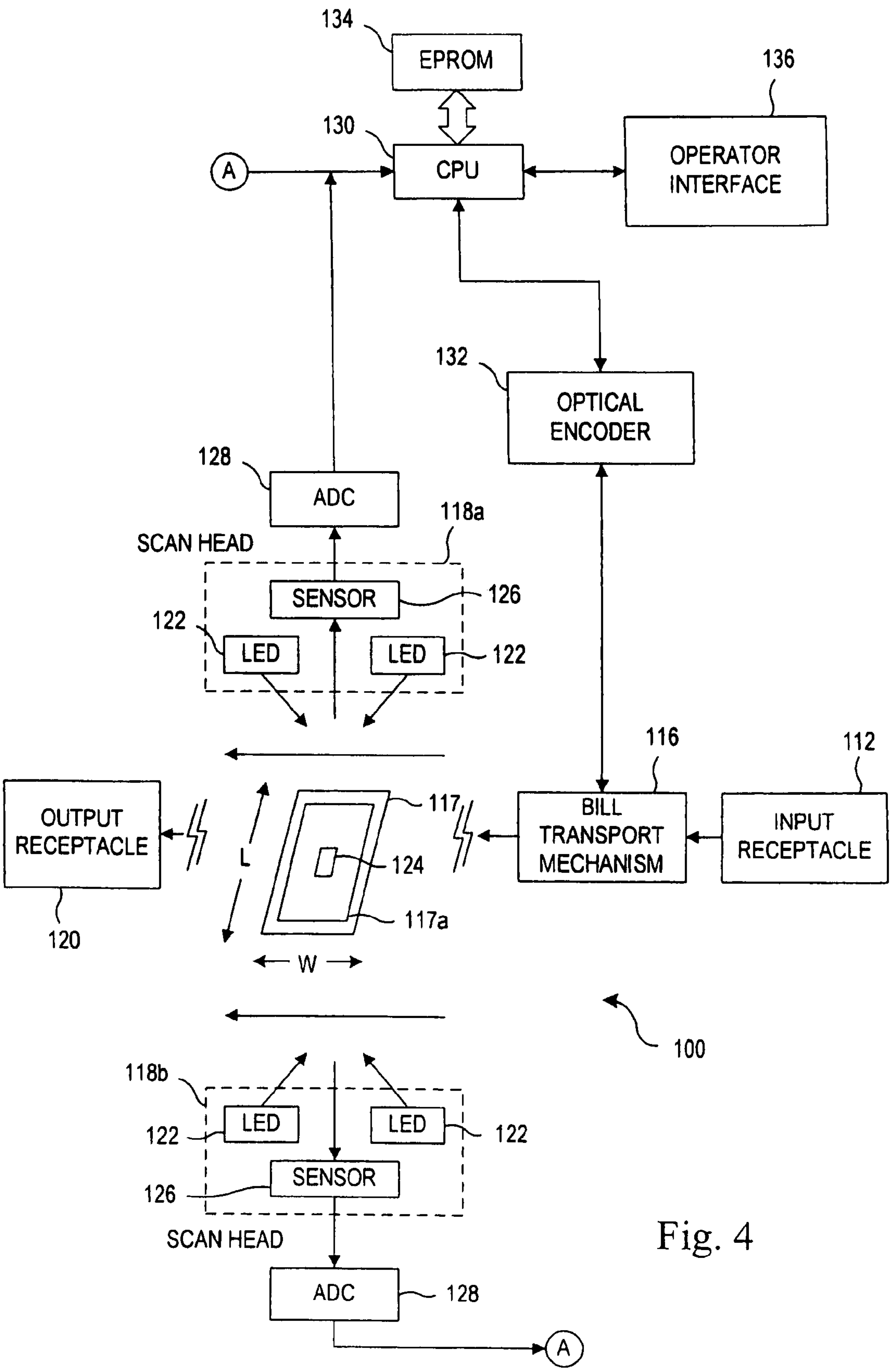
FIG. 4 is a functional block diagram of the single-pocket device of FIG. 2.

Referring now to FIGS. 2-4, a currency bill processing device 100 having a single output receptacle ("single-pocket device") for use with one embodiment of the currency bill and coin processing system 50 will be described. The single-pocket device 100 includes an input receptacle 112 for receiving a stack of currency bills to be processed. Currency bills stacked in the input receptacle 112 are picked out or separated, one at a time, and sequentially transported by a currency bill transport mechanism 116, between a pair of scanheads 118*a* and 118*b* where, for example, the currency denomination of the currency bill is scanned and identified. In the embodiment depicted, each scanhead 118*a,b* is an optical scanhead that scans for characteristic information from a currency bill 117 which is used to identify the denomination of the currency bill. The scanned currency bill 117 is then transported to an output receptacle 120, which may include a pair of stacking wheels 121, where currency bills so processed are stacked for subsequent removal.

The single-pocket device 100 includes an operator interface 123, which is shown in FIG. 2, for communicating with an operator of the single-pocket device 100. The interface 123 can function as the operator interface 52 (FIG. 1) of the currency bill and coin processing system 50. The interface 123 receives input from and displays information to an operator of the currency bill and coin processing system 50. Input data may comprise, for example, operator-selected operating modes and operator-defined operating parameters for the currency bill and coin processing system 50. Output data displayed to the operator may comprise, for example, a selection of operating modes and/or information relevant to the status of currency bills being processed by the single-pocket device 100. In one embodiment, the interface 123 comprises a touch-screen which may be used to provide input data and display output data related to the operation of the currency bill and coin processing system 50. Alternatively, the interface 123 may employ physical keys or buttons and a separate display or a combination of physical keys and displayed touch-screen keys.

In alternative embodiments of the present invention, additional sensors can replace or be used in conjunction with the optical scanheads 118*a,b* in the single-pocket device 100 to analyze, authenticate, denominate, count, and/or otherwise process currency bills. For example, size detection sensors, magnetic sensors, thread sensors and/or ultraviolet/fluorescent light sensors may be used in the single-pocket device 100 to evaluate currency bills. The use of these types of sensors for currency evaluation are described in commonly owned U.S. Pat. No. 6,278,795, which is incorporated herein by reference in its entirety.

According to one embodiment of the single-pocket device 100, each optical scanhead 118*a,b* comprises a pair of light sources 122 that direct light onto the currency bill transport path so as to illuminate a substantially rectangular light strip 124 upon a currency bill 117 positioned on the transport path adjacent the scanhead 118. Light reflected off the illuminated strip 124 is sensed by a photodetector 126 positioned between the two light sources. The analog output of the photodetector 126 is converted into a digital signal by means of an analog-to-digital (ADC) convertor unit 128 whose output is fed as a digital input to a processor such as the CPU 102.

According to one embodiment, the currency bill transport path is defined in such a way that the transport mechanism 116 moves currency bills with the narrow dimension of the currency bills being parallel to the transport path and the scan direction. Put another way, the wide edge of a currency bill is the leading edge of the currency bill. As a currency bill 117 traverses the scanheads 118*a,b*, the light strip 124 effectively scans the currency bill across the narrow dimension of the currency bill. In the embodiment depicted, the transport path is so arranged that a currency bill 117 is scanned across a central section of the currency bill along its narrow dimension, as shown in FIG. 4. Each scanhead functions to detect light reflected from the currency bill as it moves across the illuminated light strip 124 and to provide an analog representation of the variation in reflected light, which, in turn, represents the variation in the dark and light content of the printed pattern or indicia on the surface of the currency bill. This variation in light reflected from the narrow dimension scanning of the currency bills serves as a measure for distinguishing, with a high degree of confidence, among a plurality of currency denominations which the system is programmed to handle.

Additional details of the mechanical and operational aspects of the single-pocket device 50 are described in detail in U.S. Pat. Nos. 5,295,196 and 5,815,592 each of which is incorporated herein by reference in its entirety. According to various alternative embodiments, the currency processing device 100 is capable of processing, including denominating, currency bills at a rate ranging between about 800 to over about 1500 currency bills per minute.

While the single-pocket device 100 of FIGS. 2-4 has been described as a device capable of determining the denomination of processed currency bills, the currency bill and coin processing system 50 utilizes note counting devices ("note counters") according to alternative embodiments of the present invention. Note counting devices differ from currency bill denominating devices in that note counters do not denominate the currency bills being processed and are not designed to process and determine the total value of a stack of mixed denomination currency bills. Note counters are disclosed in commonly owned U.S. Pat. Nos. 6,026,175; 6,012,565; and 6,493,461; each of which is incorporated herein by reference in its entirety.

The single-pocket device 100 described above in connection with FIGS. 2-4, is small and compact, such that it may be rested upon a tabletop, desktop or countertop. According to one embodiment, the single-pocket device 100 has a height $H_1$ of about 9.5 inches (about 24.13 cm), width $W_1$ of about 11 inches (about 27.94 cm), a depth $D_1$ of about 12 inches (about 30.48 cm), and a weight ranging from 15-20 pounds. In this embodiment, therefore, the single-pocket device 100 has a "footprint" of about 11 inches by 12 inches (27.94 cm by 30.48 cm) or approximately 132 square inches (about 851.61 $cm^2$) which is less than one square foot, and a volume of approximately 1254 cubic inches (about 20,549.4 $cm^3$) which is less than one cubic foot. According to alternative embodiments, the single-pocket device 100 has a height $H_1$ ranging from 7 inches to 12 inches, a width $W_1$ ranging from 8 inches to 15 inches, a depth $D_1$ ranging from 10 inches to 15 inches, and a weight ranging from about 10 to about 30 pounds, which results in a footprint ranging from about 80 $in^2$ to about 225 $in^2$.

In alternative embodiments of the currency bill and coin processing system 50, currency bill processing devices having a plurality of output receptacles ("multi-pocket devices") are used in place of the single-pocket device 100. Multi-pocket devices having two, three, four and six pockets are described in detail in the commonly owned U.S. Pat. No. 6,256,407 B1, which is incorporated herein by reference in its entirety, and these various multi-pocket embodiments may be employed in the currency bill and coin processing system 50.

Figure 5:
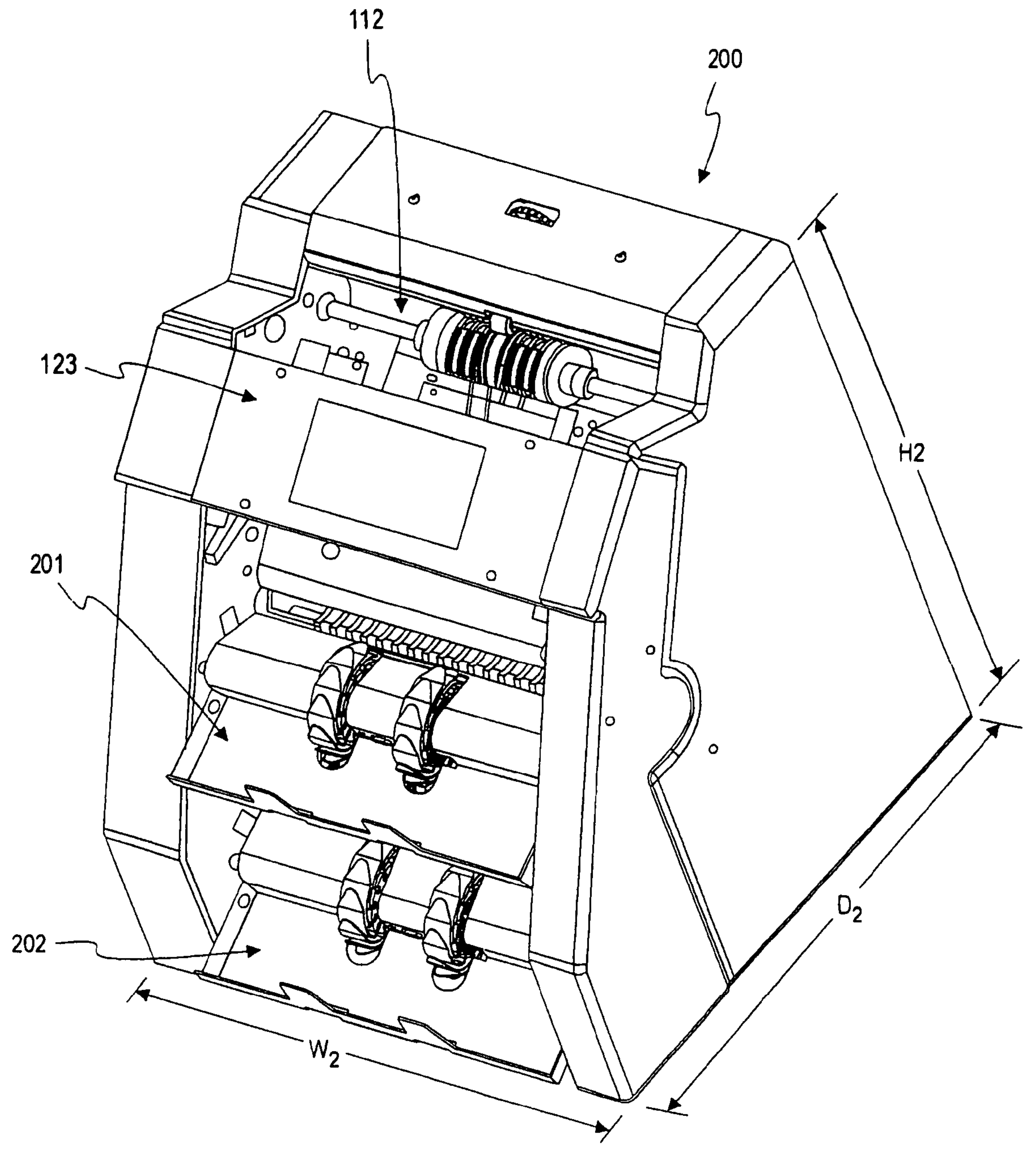
FIG. 5 is a perspective view of a two-pocket currency bill processing device for use with the currency bill and coin processing system of FIG. 1, according to an alternative embodiment of the present invention.
Figure 6:
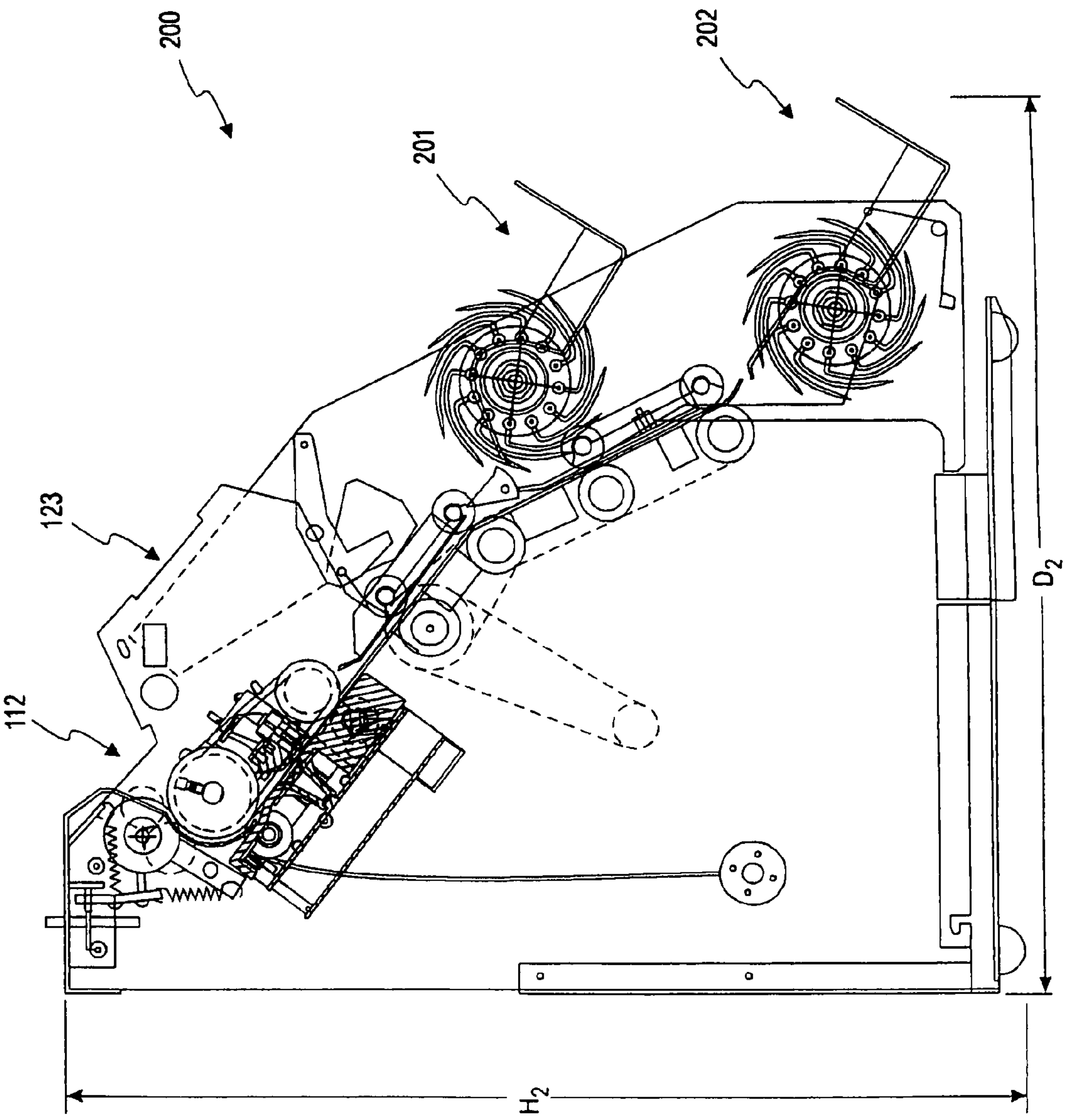
FIG. 6 is a cross-sectional view of the two-pocket currency bill processing device of FIG. 5.

Referring now to FIGS. 5 and 6, a currency bill processing device 200 having two output receptacles 201, 202 ("two-pocket device) is shown. The two-pocket device 200 can be used as the currency bill processing device 52 (FIG. 1) according to an alternative embodiment of the currency bill and coin processing system 50. The two-pocket device 200 includes an input receptacle 112 (similar to that shown in FIG. 2) and an operator interface 123 (similar to that shown in FIG. 2) for communicating with an operator of the two-pocket device 200. Generally, the two-pocket device 200 operates in a manner similar to that of the single-pocket device 100 (FIGS. 2-4), except that the transport mechanism of the two-pocket device 200 is adapted to transport the currency bills to either of the two output receptacles 201, 202. The two output receptacles 201, 202 may be utilized in a variety of fashions according to a particular application. For example, currency bills may be directed to the first output receptacle 201 until a predetermined number of currency bills have been transported to the first output receptacle 201 (e.g., until the first output receptacle 201 reaches its capacity or a strap limit) and then directs subsequent currency bills to the second output receptacle 202. In another application, all currency bills are transported to the first output receptacle 201 expect those currency bills triggering error signals, such as "no call" error signals (i.e., currency bill whose denomination is not identified) and "suspect document" error signals (i.e., currency bills failing an authentication test), which are directed to the second output receptacle 202. Further details of the operational and mechanical aspects of the two-pocket device 200 illustrated in FIG. 5 are detailed in commonly owned U.S. Pat. Nos. 5,966,456; 6,278,795 B1; and 6,311,819 B1, each of which is incorporated herein by reference.

The two-pocket device 200 of FIGS. 5 and 6 is small and compact which allows the device 200 to be conveniently placed on a table-top. According to one embodiment, the two-pocket device 200 has a height $H_2$ of about 17.5 inches (about 44.45 cm), a width $W_2$ of about 13.5 inches (about 34.29), a depth $D_2$ of about 15 inches (about 38.1 cm), and weighs approximately 35 pounds (about 15.9 kg). Accordingly, the two-pocket device 200 has a footprint of about 230 square inches (1406 $cm^2$) or about 1.5 square feet and a volume of about 4190 cubic inches (about 58,051 $cm^3$) or slightly more than 2.3 cubic feet.

One of the contributing factors to the size of the two-pocket device 200, as well as the single-pocket device 100 (FIGS. 2-4) and other multi-pocket devices, is the size of the currency bills to be handled. For example, some German Deutschmark notes are larger than U.S. currency bills. Therefore, if an application requires that a currency bill processing device be able to process both U.S. and German notes, the transport mechanism of the device must be adapted to handle both sizes of notes. Accordingly, the size of the currency bill processing device can vary according to alternative embodiments of the present invention. According to an alternative embodiments, the two-pocket device 200 has a height $H_2$ ranging from 15-20 inches, a width $W_2$ ranging from 10-15 inches, a depth $D_2$ ranging from 15-20 inches, and a weight ranging from about 35-50 pounds. Therefore, the two-pocket device 200 has a footprint ranging from 10-15 inches by 15-20 inches—about 150 $in^2$ to about 300 $in^2$ —and a volume of about 2250-6000 $in^3$.

Figure 7:
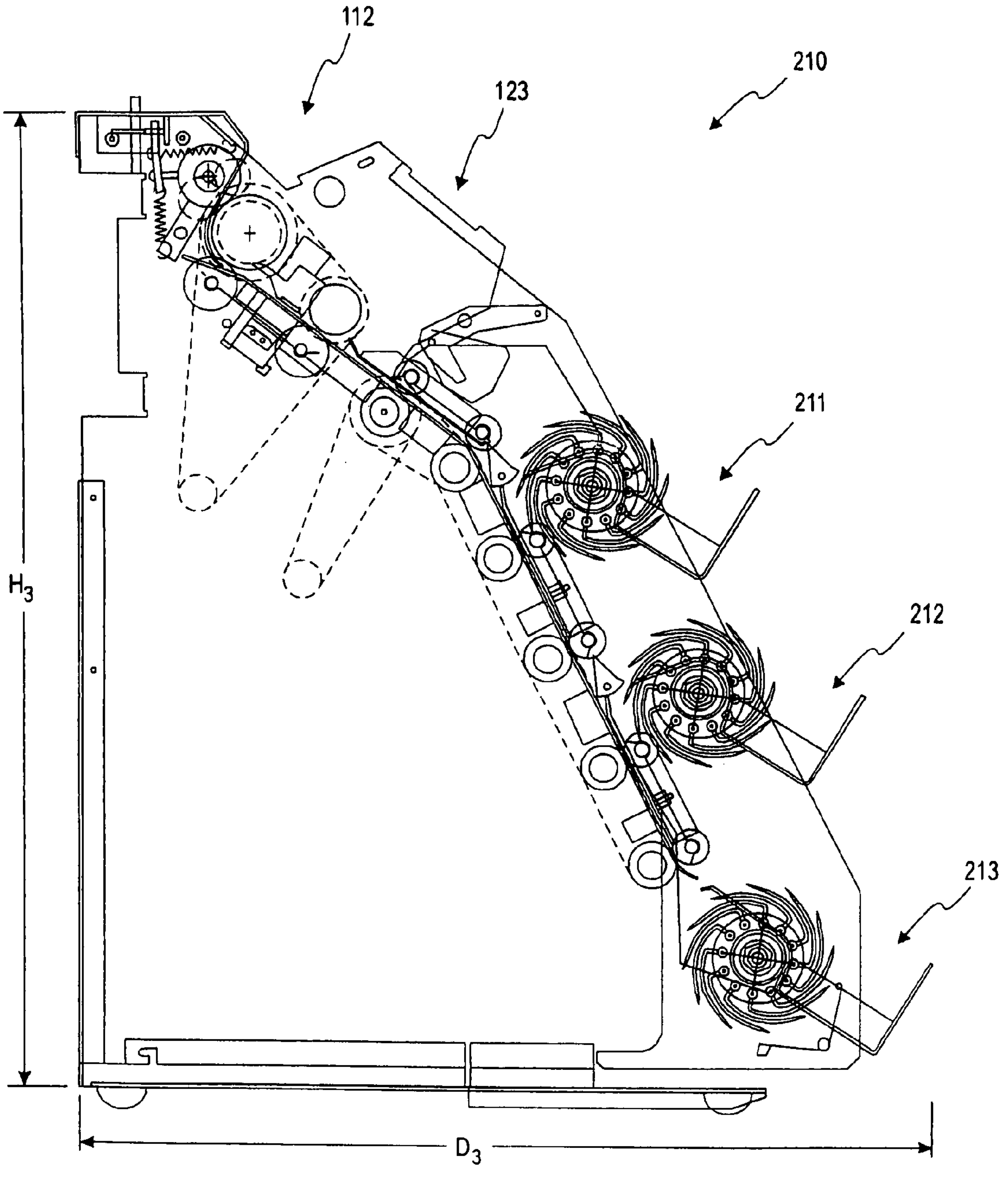
FIG. 7 is a cross-sectional view of a three-pocket currency bill processing device for use with the currency bill and coin processing system of FIG. 1, according to another alternative embodiment of the present invention.

Referring to FIG. 7, a currency bill processing device 210 having three output receptacles 211-213 ("three-pocket device 210") is shown. The three-pocket device 210 can be used as the currency bill processing device 52 (FIG. 1) in an alternative embodiment of the currency bill and coin processing system 50. Again, as with the other multi-pocket devices described and to be described herein, the three-pocket device 210 generally operates in a similar manner to the single-pocket device 100 except that the transport mechanism of the three-pocket device 210 is adapted to transport the currency bills to three different output receptacles 211-213. Multiple output receptacles 211-213 provide an increased number of currency bill processing options to an operator of a currency bill processing device 52. Briefly, for example, an operator can sort more denominations of currency bills as more output receptacles are provided.

According to one embodiment of the present invention, the three-pocket device 210 has a width $W_3$ ranging from 10-15 inches, a height $H_3$ ranging from 20-25 inches, and a depth $D_3$ ranging from 15-25 inches, which results in a footprint ranging between about 150 $in^2$ and about 375 $in^2$. Further details of the three-pocket device 300 are described in U.S. Pat. No. 6,256,407 B1, which is incorporated by reference above.

Figure 8:
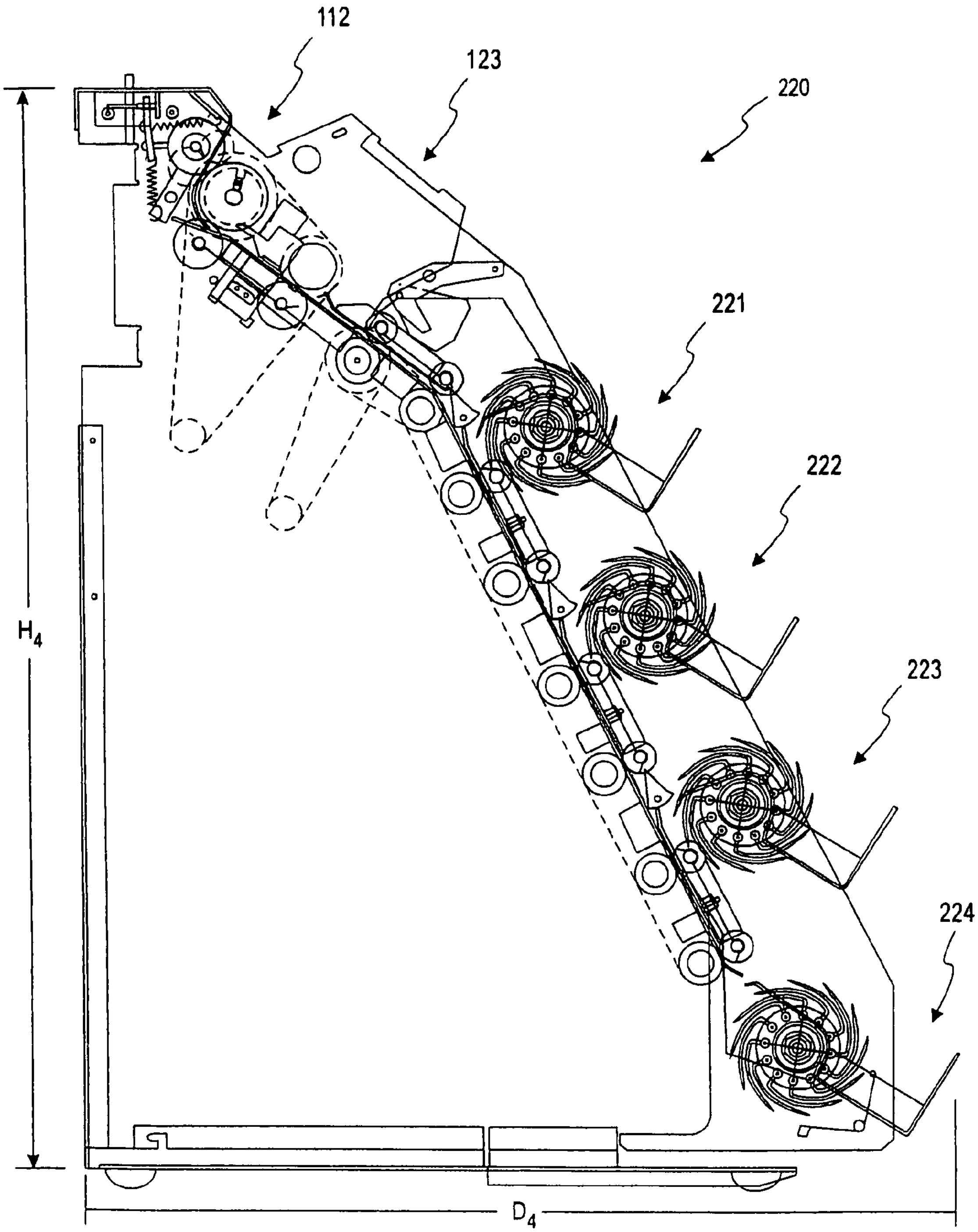
FIG. 8 is a cross-sectional view of a four-pocket currency processing device for use with the currency bill and coin processing system of FIG. 1, according to another alternative embodiment of the present invention.

Referring to FIG. 8, a currency bill processing device 220 having four output receptacles 221-224 ("four-pocket device") is shown. The four-pocket device 220 can be used as the currency bill processing device 52 (FIG. 1) in an alternative embodiment of the currency bill and coin processing system 50. According to one embodiment of present invention, the four-pocket device 220 has a width $W_4$ ranging from 10-15 inches, a height $H_4$ ranging from 25-30 inches and a depth $D_4$ ranging from 20-25 inches, which results in a footprint ranging between about 200 $in^2$ and about 375 $in^2$. Further details of the four-pocket device 220 are described in U.S. Pat. No. 6,256,407 B1, which is incorporated by reference above.

Figure 9:
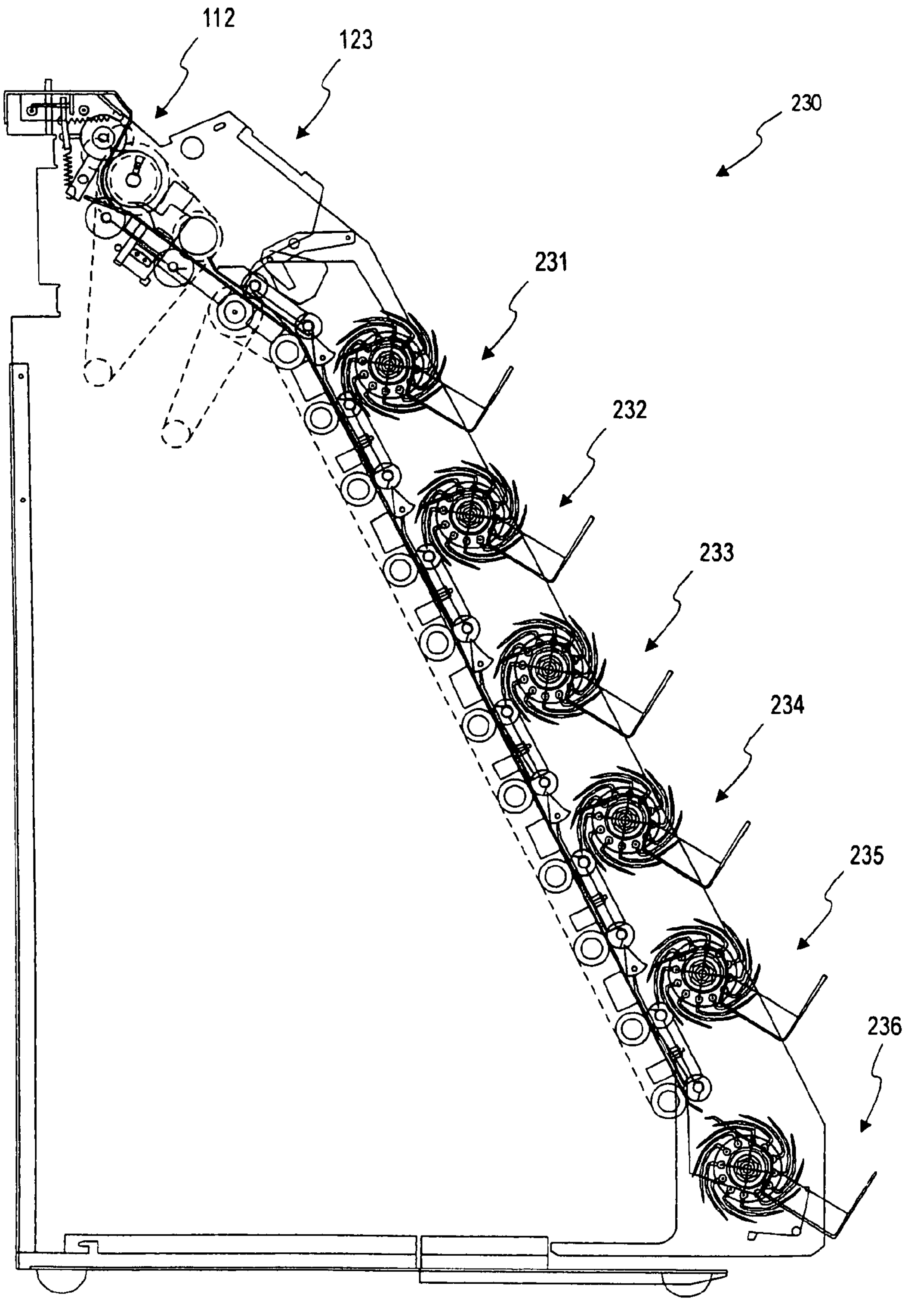
FIG. 9 is a cross-sectional view of a six-pocket currency processing device for use with the currency bill and coin processing system of FIG. 1, according to another alternative embodiment of the present invention.

Referring to FIG. 9, a currency bill processing device 230 having six output receptacles 231-236 ("six-pocket device") is shown. The six-pocket device 230 can be used as the currency bill processing device 52 (FIG. 1) in an alternative embodiment of the currency bill and coin processing system 50. According to one embodiment of present invention, the six-pocket device 230 has a width $W_6$ ranging from 10-15 inches, a height $H_6$ ranging from 35-45 inches and a depth $D_6$ ranging from 22-32 inches, which results in a footprint ranging between about 222 $in^2$ and 480 $in^2$. Further details of the six-pocket device 230 are described in U.S. Pat. No. 6,256,407 B1, incorporated by reference above.

According to one alternative embodiment of the present invention, the multi-pocket devices 210, 220, 230 are constructed with generally the same footprint as the two-pocket device 200 (e.g., ranging between about 150 $in^2$ to about 300 $in^2$). Accordingly, these multi-pocket devices 210, 220, 230 are small and compact allowing them to be rested upon a tabletop or countertop. Generally, the multi-pocket devices 210, 220, 230 increase in height as more output receptacles are added.

Figure 10:
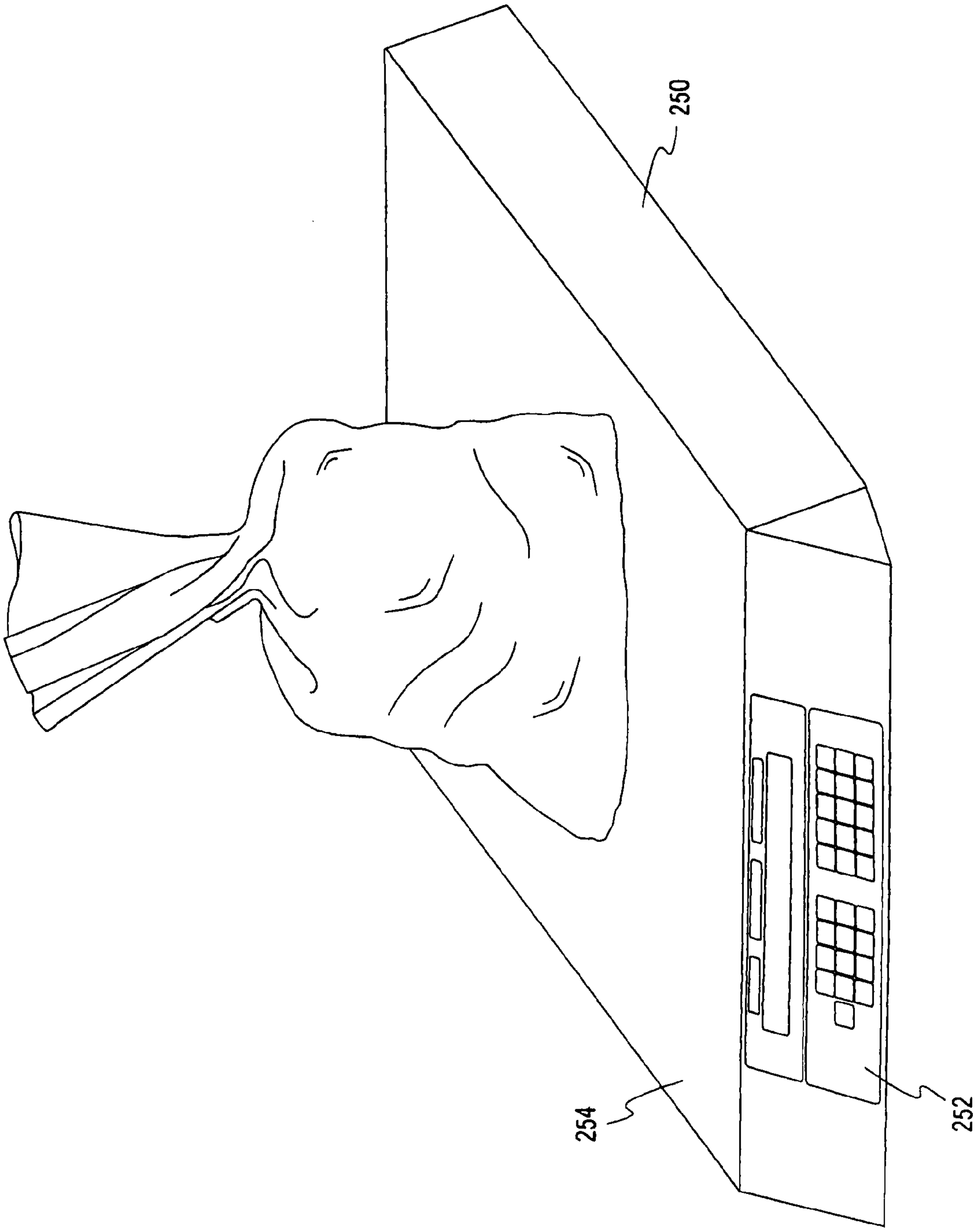
FIG. 10 is a perspective view of a coin scale, shown weighing bagged coins, for use with the currency bill and coin processing system of FIG. 1, according to one embodiment of the present invention.
Figure 11:
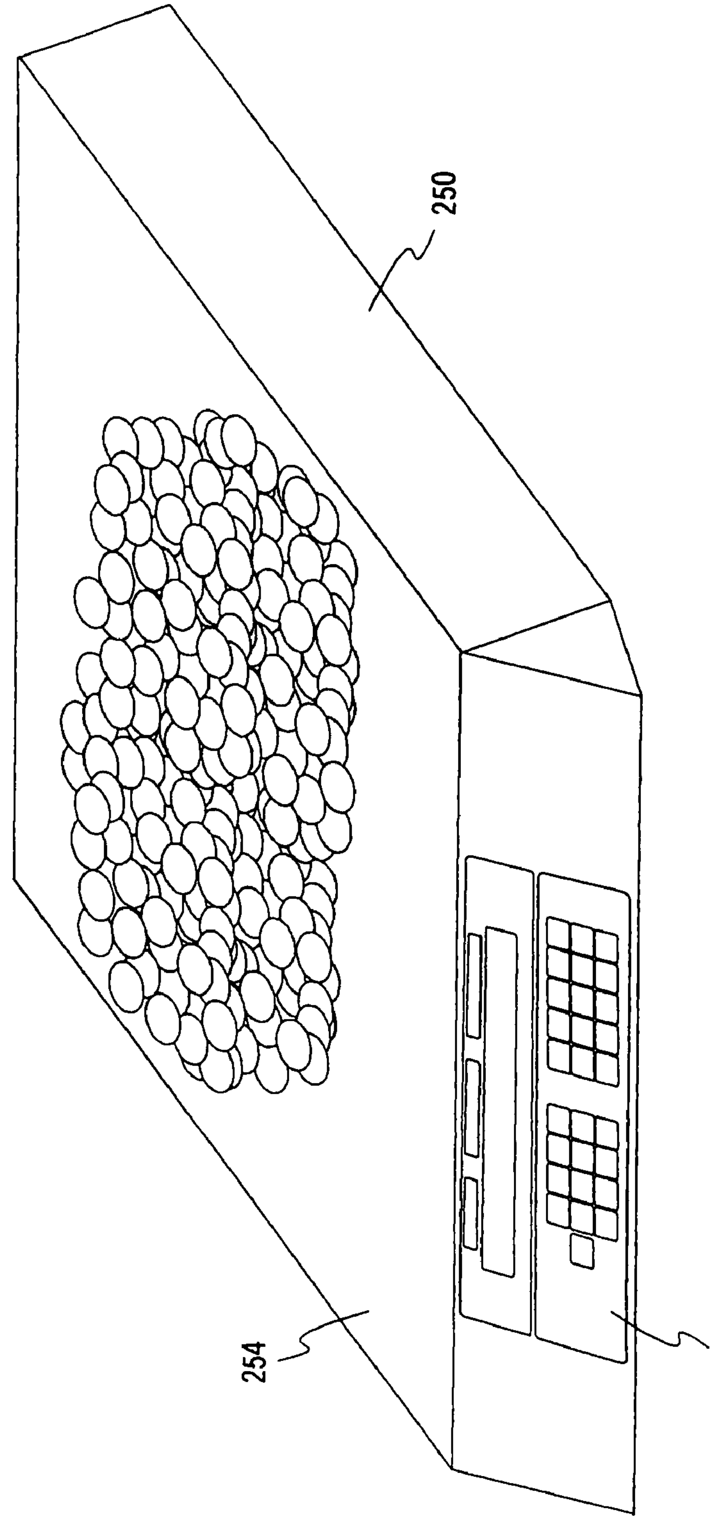
FIG. 11 is a perspective view of a coin scale, shown weighing loose coins, for use with the currency bill and coin processing system of FIG. 1, according to one alternative embodiment of the present invention.

Referring now to FIGS. 10 and 11, a coin scale 250 is shown having a bag of coins disposed thereon and a batch of loose coin disposed thereon, respectively. The coin scale 250 can be used as the coin scale 54 according to one embodiment of the currency bill and coin processing system 50. The coins scale 250 weighs coins of a single denomination and then calculates the total value of the weighed coins based on the weight of the coins. The coin scale 250 has a compact size allowing it to be used on a tabletop or desktop.

According to the illustrated embodiment, the coin scale 250 includes an operator interface 252 having an LCD display for displaying information to an operator and a keypad for receiving input from an operator. According to an alternative embodiment of the currency bill and coin processing system

50, the coin scale 54 does not have an operator interface; rather, the coin scale 54 utilizes the operator interface 58 (FIG. 1) of the currency bill and coin processing system 50. In order to determine the value of coins processed, the operator interface of the coin scale 250 receives input from the operator indicative of the denomination of coins about to be weighed because the coin scale is only able to processes a single denomination of coins at a time according to one embodiment of the present invention. According to one embodiment, a plurality of denomination specific algorithms are stored in a memory of the coin scale 250, or the memory 57 of the system 50, for calculating the aggregate value of coins based upon the weight of the coins. For example, an operator desiring to determine the aggregate dollar amount of a plurality of quarters, places the quarters in a tray 254 of the coin scale 250 and inputs via the operator interface 58 that quarters are to be processed and the coin scale 250 then determines the aggregate dollar amount of the quarters based upon their weight and then displays that amount to the operator via the operator interface. The coins placed in the tray 254 of the coin scale 250 for processing can comprise bagged coins as shown in FIG. 10, loose coins as shown in FIG. 11, rolled coins (not shown), coin in a container(s) or a combination thereof. In addition to government issued coins, the coin scale 250 can be programmed to weigh and process other types of "coins" including casino tokens, transit tokens, and other types of tokens.

According to another embodiment, it is unnecessary for the operator to input the coin denomination to be weighed to the coin scale 250; rather, the coin scale 250 automatically prompts the operator to weigh coins of a specific denomination and sequentially prompts the operator to weigh another specific coin denomination after the pervious denomination has been weighed as the coin scale 250 checks through a list of coin denomination stored in a memory. For example, upon activation, the coin scale 250 instructs the operator, via the operator interface 252, that pennies are to be placed on the tray 254 and weighed. The penny total is determined and is added to a running total. After the penny total is determined, the coin scale indicates to the operator to place nickels on the coin tray 254. If there are no nickels to be weighed, the operator can indicate so via the operator interface 252 by pressing a continue button, for example. After each coin denomination is weighed, the coin scale 250 prompts the operator to weigh the next coin denomination until the predetermined list (e.g., the coins in the U.S. coin set) is exhausted. The coin scale 250 checks through the list in a logical sequence (e.g., in increasing or decreasing order of denomination value) or in a different preprogrammed manner.

According to an alternative embodiment of the present invention, the coin scale 250 is capable of determining a total dollar amount of a batch of rolled coins of mixed denominations. For example, according to such an embodiment, the coin scale 250 can determined that a roll of quarters (typically having forty quarters) and a roll of dimes (typically having fifty dimes) both placed on the tray 254 has a collective value of fifteen dollars.

According to one embodiment, when counting loose coins of several denominations with the coin scale 250, each coin denomination is processed by itself so it is first necessary to segregate the coins by denomination. Often, in the retail or banking environment, coins are already segregated according to denomination in a cash till drawer. The operator must input the denomination of other coins to be processed via the operator interface 252, or allow the coin scale to advance to subsequent denominations according to a preprogrammed sequence of coin denominations. As each coin denomination is counted, the determined total corresponding to each denomination is stored in a memory of the coin scale 250 or a memory of the currency bill and coin processing system 50. The totals are then summed after all coin denominations have been counted. Alternatively, a running total is maintained as the different coin denominations are being processed. Piece counts of each denomination may also be determined and maintained in the memory.

According to one embodiment of the currency bill and coin processing system present invention, the coin scale 54 (or scale 250 shown in FIGS. 10-11) includes a "zeroing option" which resets the weight on the scale account for the weight of a container into which loose coins are placed. Put another way, the zeroing option accounts for the tare weight. For example, a dish may be placed on the tray 254 and then a zeroing button on an operator interface is depressed which sets the scale back to zero so that the weight of the dish is not included in the weight of coins to be placed in the dish.

According to other embodiments of the present invention, the coin scale 250 is capable of weighing and processing an entire cash drawer. For example, as items are removed from the cash drawer, the coin scale 250 determines the difference between an initial weight and a subsequent weight. Based on the weight difference, the coin scale 250 is able to provide a current value of the cash in the cash drawer.

According to alternative embodiments of the present invention, the coin scale 250 is capable of weighing and processing loose currency or strapped, banded, bundled or clipped stacks of currency. The coin scale 250 weighs the currency and determines a corresponding dollar amount. In addition to government issued currency, the coin scale 250 can be programmed to weigh and processes other types of "currency" including casino script, bar coded tickets, coupons, food stamps, postage stamp, etc.

According to one embodiment, the coin scale 250 for use in the currency bill and coin processing system 50 is a compact device allowing it to be rested on a table top. A coin scale that can be used in one embodiment of the currency bill and coin processing system 50 is commercially available from Digi Matex, Inc. (Model No. DMC-688). An example of another coin scale for use with an alternative embodiment of the present invention is the TellerMate which is made by Percell Group PLC.

Figure 12:
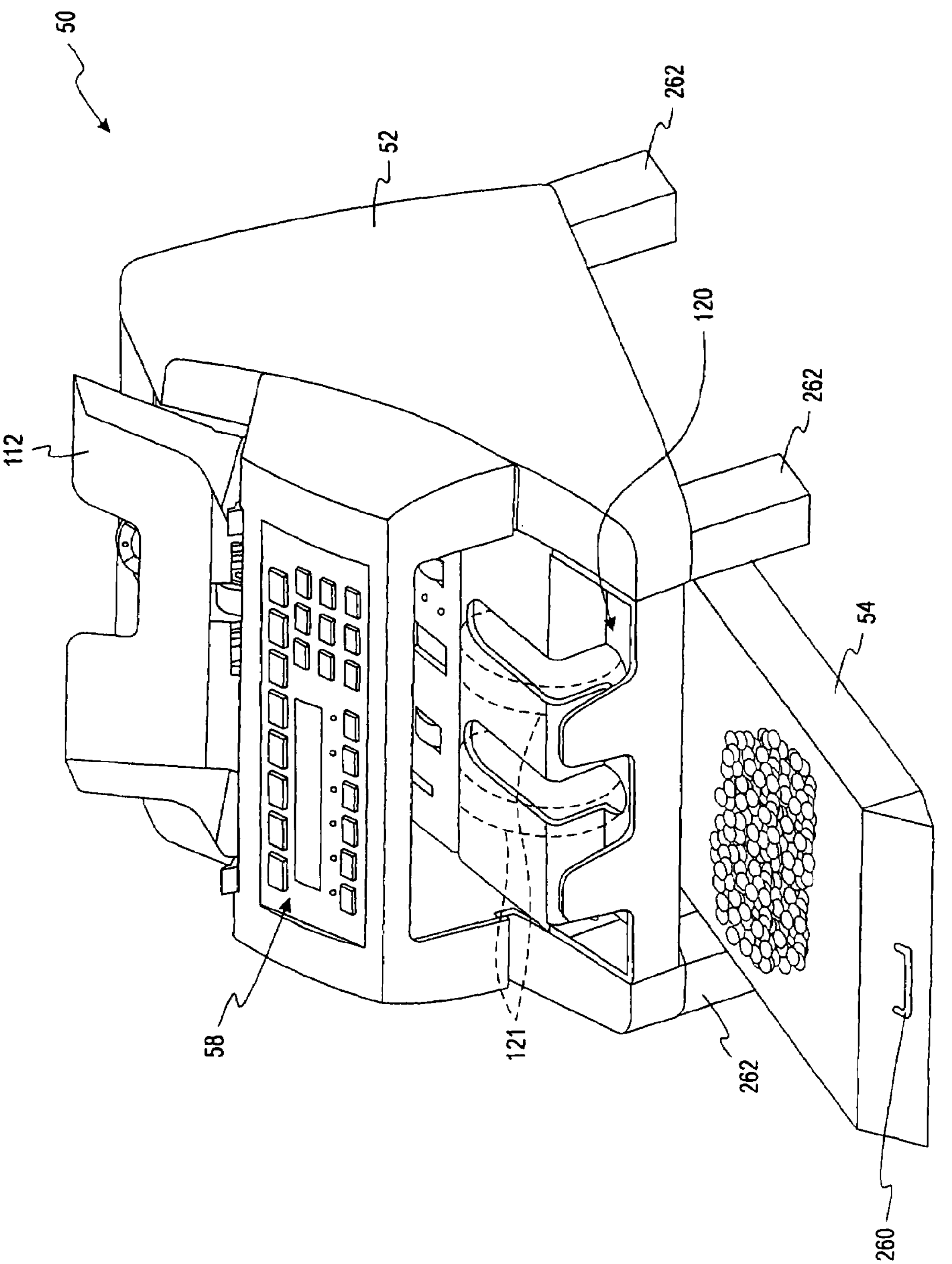
FIG. 12 is a perspective view of a currency bill and coin processing system, according to one embodiment of the present invention.
Figure 13:
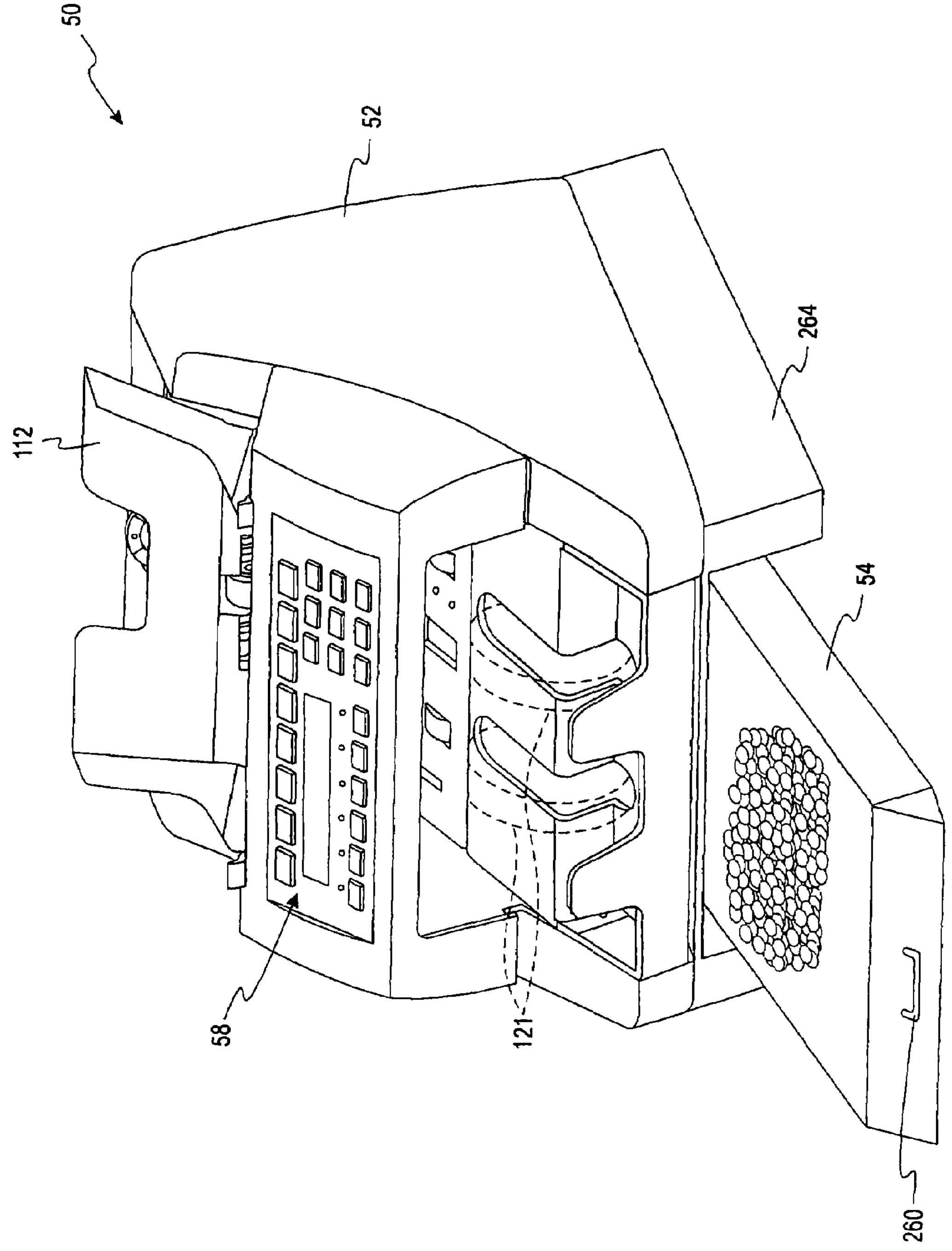
FIG. 13 is a perspective view of a currency bill and coin processing system, according to an alternative embodiment of the present invention.

Referring now to FIGS. 12 and 13, the currency bill and coin processing system 50 is shown according to one embodiment of the present invention wherein the coin scale 54 is disposed below the single-pocket currency bill processing device 52. The coin scale 52 is shown in an operating position extending out from beneath the single-pocket device 52. When not in use, the coin scale 54 is moved (backward into the page as shown in FIG. 12) to a storage position wherein the coin scale 54 is disposed substantially below the single-pocket device 52. According to one embodiment, the footprint of the currency bill and coin processing system 50 is substantially the same as the single-pocket device 52 when the coin scale 54 is in the storage position. According to one embodiment of the currency bill and coin processing system 50, a handle 260 is connected to the coin scale 54 to assist the operator of the system 50 in moving the coin sale 54 between the storage and operating positions. According to an alternative embodiment, the coin scale 54 is coupled to rails (not shown) or is disposed on a slideable shelf or drawer (not shown) to facilitate the movement of the coin scale 54 between the operating and storage positions.

According to the embodiment of the currency bill and coin processing system 50 shown in FIGS. 12 and 13, the system 50 includes an operator interface 58 for receiving operational instructions from an operator of the system 50 and for displaying information to the operator. The currency bill processing device 52 and the coin scale 54 are communicatively linked together allowing the interface 58 to receive and display information relevant to the coin scale 54 and to allow coin totals to be sent to a CPU 56 (FIG. 1) disposed within the currency bill processing device 52.

In the embodiment of the currency bill and coin processing system 50 illustrated in FIG. 12, the single-pocket device 52 is disposed on a plurality of legs 262, which have a height sufficient to allow the coin scale 54 move to the storage position below the single-pocket device 52. In an alternative embodiment of the currency bill and coin processing system 50 of the present invention, the currency bill processing device 52 is disposed on a different type of structure such as a platform 264 as is shown in FIG. 13. The platform 264 has a height and width sufficient to accommodate the coin scale 54 when in the storage position beneath the currency bill processing device 52. Alternatively still, the currency bill processing device 52 may be disposed on a desktop and the coin scale is disposed within a drawer of the desk. Alternatively still, regardless of how the currency bill processing device 52 is supported, the currency bill processing device 52 and the coin scale 54 are arranged such that when the coin scale 54 is in the storage position beneath the currency bill processing device 52, the footprint of the currency bill and coin processing system 50 is substantially equivalent to the currency bill processing device 52 so that the system is compact allowing it to be used on a tabletop. Accordingly, where the currency bill processing device 52 is a single-pocket device 100, the footprint of the currency bill and coin processing system 50 is less than about 0.6 $ft^2$ according to one embodiment of the system 50. In an alternative embodiment, the currency bill and coin processing system 50 has a footprint less than about 1.6 $ft^2$. Alternatively still, the system 50 has a footprint less than about 1.5 $ft^2$.

Figure 14:
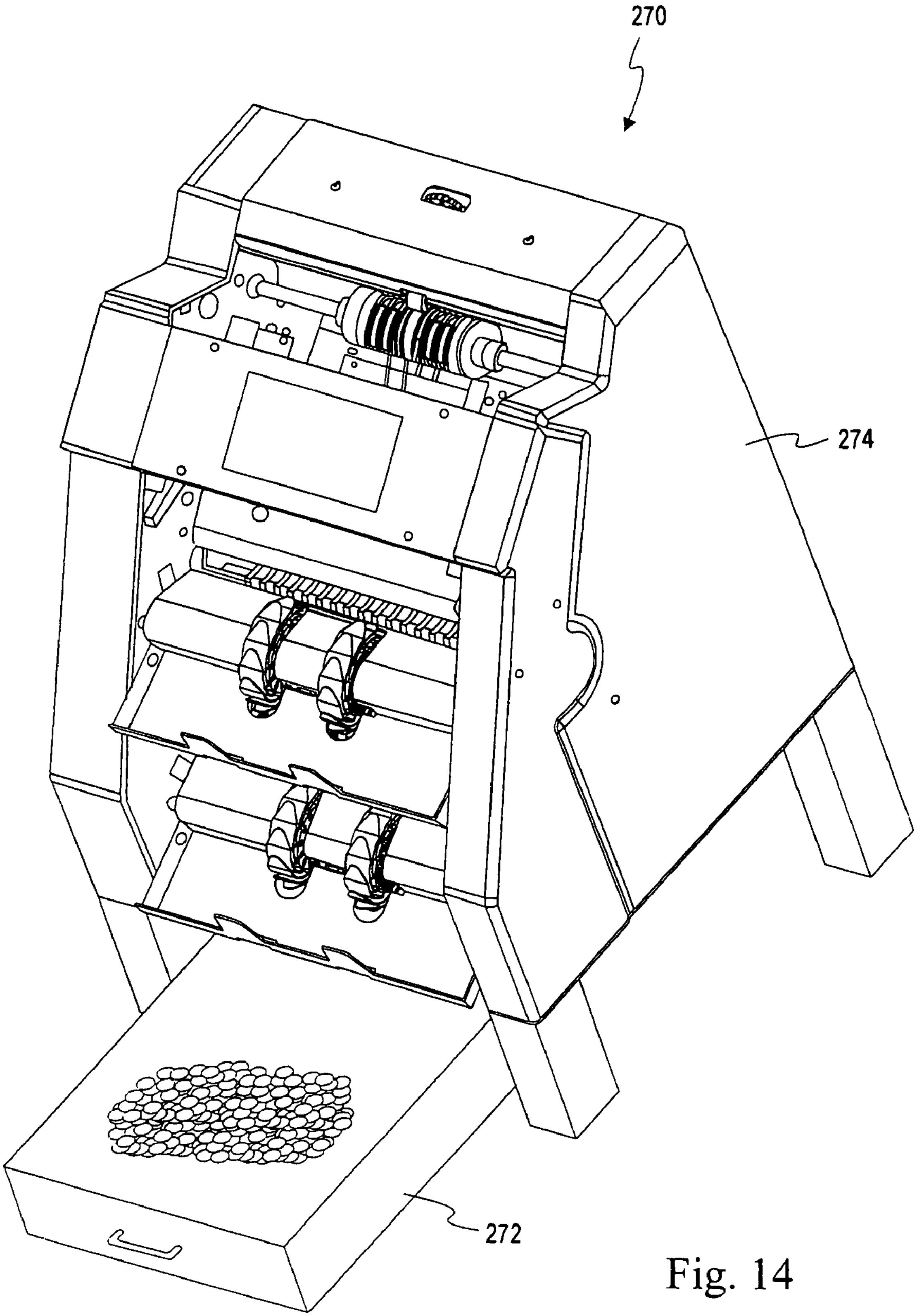
FIG. 14 is a perspective view of a currency bill and coin processing system, according to another alternative embodiment of the present invention.

Referring also to FIG. 14, there is shown an alternative embodiment of the currency bill and coin processing system 270 including a coin scale 272 and a double-pocket currency bill processing device 934. Like the system 50 illustrated in FIGS. 13 and 14, the coin scale 272 is moveable between a storage position and an operating position. According to one embodiment of the currency bill and coin processing system 270, the coin scale 272 is disposed in large-part beneath the double-pocket device 274 when in the storage position. Thus, the footprint occupied by the currency bill and coin processing system 270 when the coin scale 272 is in the storage position is substantially the same as the footprint of the double-pocket device 274. For example, in some embodiments, the footprint of the system 270 is about 150 $in^2$. In other embodiments, the footprint of the system 270 ranges between about 150 $in^2$ and about 300 $in^2$.

Although the embodiments of the currency bill and coin processing system 50 shown in FIGS. 12-14 are shown with a single and double-pocket devices, other multi-pocket currency bill processing devices can be used in connection with the present invention including the multi-pocket devices shown FIGS. 7-9. According to one embodiment of the currency bill and coin processing system 50, regardless of the particular multi-pocket device used as the currency bill processing device 52, the coin scale 54 is disposed in large-part beneath the multi-pocket device when in the storage position and the footprint occupied by the currency bill and coin processing system 50 when the coin scale 54 is in the storage position is substantially equivalent to the footprint of the multi-pocket device. According to one embodiment of the currency bill and coin processing system 50, the footprint of the system 50 ranges between about 150 $in^2$ (about 1 $ft^2$) and about 375 $in^2$ when the currency bill processing device 52 is a multi-pocket device. According to another embodiment of the currency bill and coin processing system 50, the footprint of the system 50 is ranges between about 200 $in^2$ and about 375 $in^2$ when the currency bill processing device 52 is a multi-pocket device. According to yet another embodiment of the currency bill and coin processing system 50, the footprint of the system 50 is ranges between about 222 $in^2$ and about 480 $in^2$ when the currency bill processing device 52 is a multi-pocket device. And in other alternative embodiments of the system 50, the footprint of the system 50 is about 1 $ft^2$, less than about 1.5 $ft^2$, less than about 2 $ft^2$, or less than about 2.5 $ft^2$.

In yet another alternative embodiment of the present invention, the coin scale 54 is not disposed beneath the currency bill processing device 52. Rather, the coin scale 54 is placed next to the currency bill processing device 52, for example. Alternatively still, the coin scale 54, which is still communicatively linked to the currency bill processing device 52, is set away from the currency bill processing device 52. Because the currency bill processing device 52 and coin scale 54 are relatively compact, the overall footprint of the currency bill and coin processing system 50 remains small in these embodiments.

Figure 15:
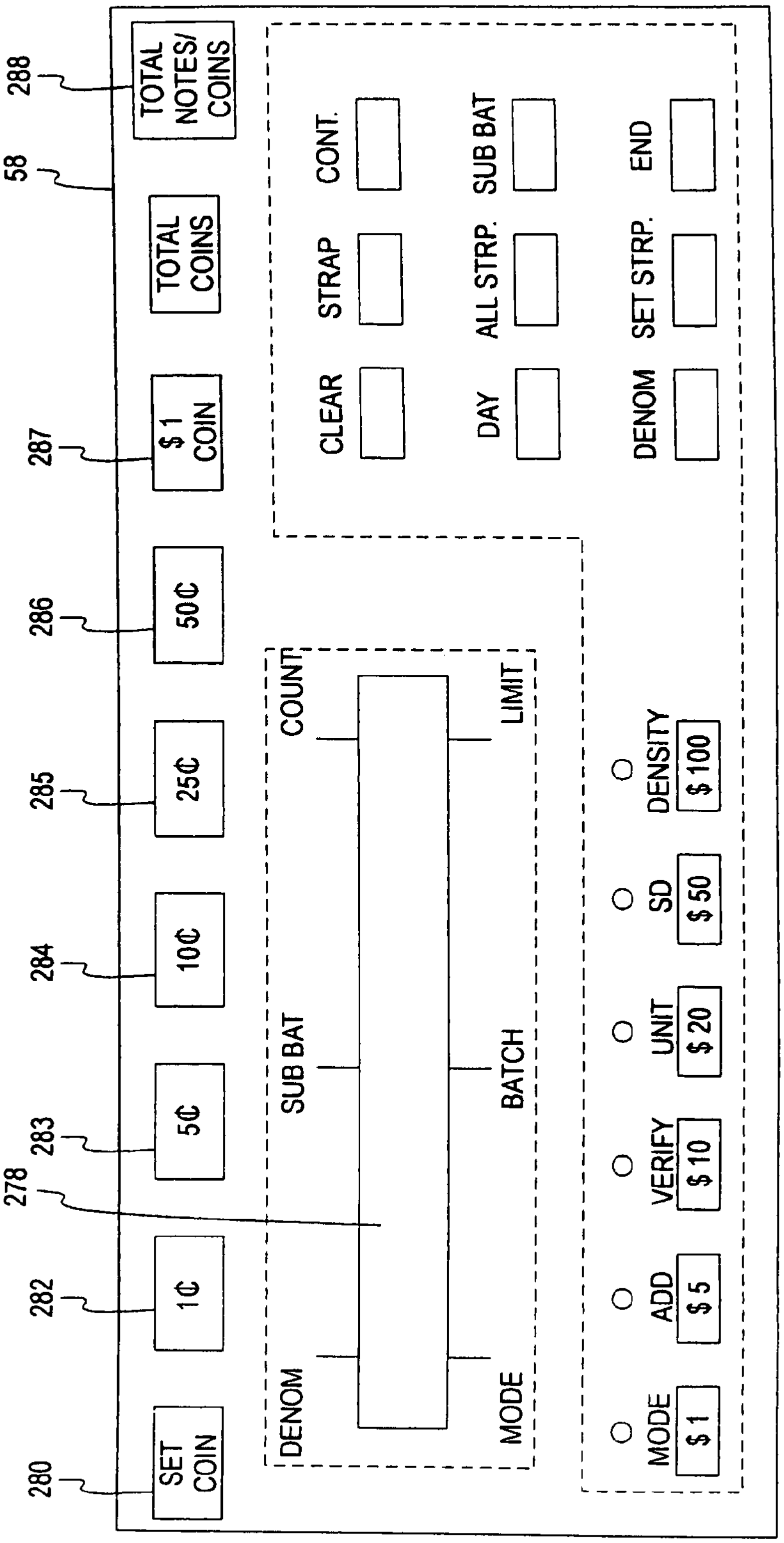
FIG. 15 is a front view of an operator interface for use with one embodiment of the currency bill and coin processing system of FIG. 1.

Referring now to FIG. 15, an operator interface 58 for use with one embodiment of the currency bill and coin processing system 50 of the present invention is shown. The operator interface 58 includes an LCD display 278 and a plurality of keys for inputting operational instructions to both the currency bill processing device 52 and the coin scale 54. In the depicted embodiment, some of the keys of the operator interface 58 keys are specific to the currency bill note processing device 52 and others are specific to the coin scale 54. For example, the 1¢, 5¢, 10¢, 25¢, 50¢ and $1 keys 282-287 disposed along the top of the operator interface 58 are all coin scale 54 specific keys. The operator depresses the "Set Coin" key 280 and then selects the key corresponding the particular coin denomination to be weighed: 1¢ key 282 for pennies, 5¢ key 283 for nickels, 10¢ key 284 for dimes, 25¢ key 285 for quarters, 50¢ key 286 for half-dollar coins and $1 key 287 for dollar coins. Other keys, such a "total notes/coins" key 288 cause the currency bill and coin processing system 50 to sum currency bill total and coins totals. As discussed above, according to an alternative embodiment, the operator interface 58 can comprise a touch screen device. In other alternative embodiments, the operator interface comprises a display and a small number of keys that allow the operator to scroll through and select displayed options.

In addition to operational instructions, the operator interface 58 can also receive identification information from the operator of the system 50 including batch identification information, operator identification information, store identification information, operator shift identification information, etc. For example, an operator of the system 50 may enter a number that identifies a particular cash register at a store, a number that identifies the store, or both. Further, according an alternative embodiment of the system 50, an operator may input, via the operator interface 58, a beginning balance of the cash drawer to be balanced which then compared to the totals determined from the currency bill and coin processing by the system 50. Additionally, the operator interface 58 may receive security information such as a password or number from an operator in addition to an identification information.

Figure 16:
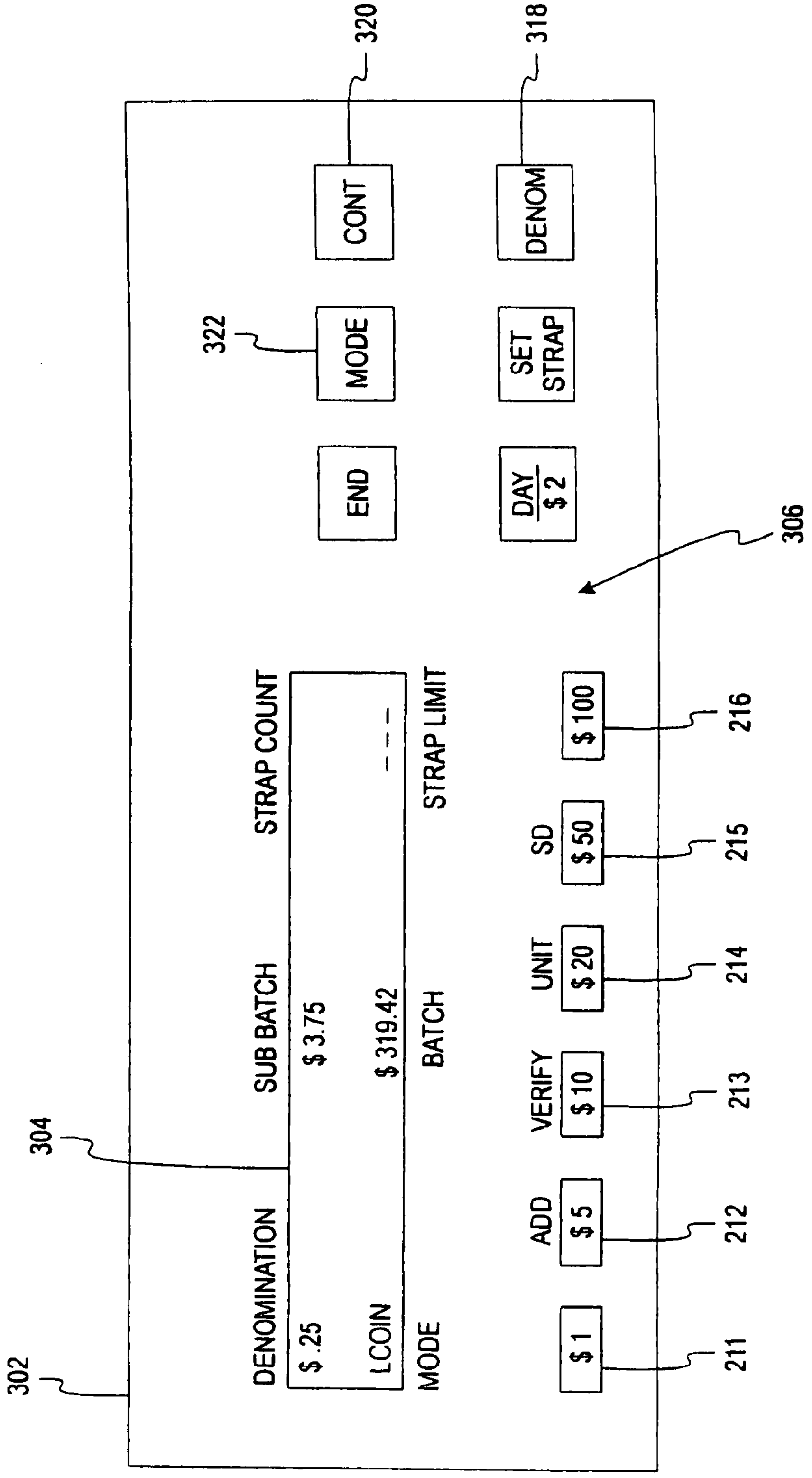
FIG. 16 is a front view of an operator interface for use with another embodiment of the currency bill and coin processing system of FIG. 1.

Referring now to FIG. 16, an operator interface 302 for use with an alternative embodiment of the currency bill and coin processing system 50 of the present invention is shown. The operator interface 302 includes an LCD display 304 and a plurality of keys 406 for inputting operational instructions to both the currency bill processing device 52 and the coin scale 54. Some of the keys including the bill denominations keys 311-316 of the operator interface 302 are specific to the currency bill note processing device 52. Other keys 406, such as a "DENOM" key 318, are relevant to both the currency bill processing device 52 and the coin scale 54. According to one embodiment, the DENOM key 318 is used to scroll through the coin and dollar denominations (1¢, 5¢, 10¢, 25¢, 50¢ and 1$ coins; $1, $2, $5, $10, $20, $50 and $100 bills). When the appropriate denomination is displayed on the display 304, the operator selects the CONT (continue) key 320, or an enter key (not shown), to designate that denomination as the denomination to be processed. Alternatively, when the appropriate denomination is displayed on the display 304, the denomination is designated by using the currency bill and coin processing system 50.

According to one embodiment of the present invention, the dollar denomination keys 211-216 are used to reconcile "no call" currency bills. In an embodiment wherein the currency bill processing device 52 is adapted to denominate the currency bills but the denomination of a currency bill cannot be determined by the 52, the device 52 generates a "no call" error signal. The operator can inspect the note and then depress a dollar denomination key 211-216 causing the dollar amount selected to be added to the running total. Alternatively, according to an alternative embodiment of the present invention, the operator scrolls through the denominations using the DENOM key 318 by depressing the DENOM key 318 until the denomination of the "no call" currency bill is displayed and then depresses the CONT key 320 so that the currency bill is included in the running total.

A "MODE" key is used to scroll through a plurality of operating modes of the currency bill and coin processing system 50. For example, modes such as "MIXED," "SORT" and "STRANGER" are used to control the operation of the currency bill processing device 52. Further details of these modes of operation, and other modes of operation for the currency bill coin processing device 52, are described in U.S. Pat. No. 6,278,795, which is incorporated herein by reference. Further, modes such as "LCOIN" (for weighing loose coins), "RCOIN" (for weighing rolled coins), "CCOIN" (for weighing coins in a container) and "STRAP" (for weighing strapped currency) may be scrolled through using the MODE key 322 for operating the coin scale 54. According to one embodiment of the currency bill and coin processing system 50, the CCOIN mode of operation accounts for the tare weight of a known (e.g., commonly used) container.

Figure 17:
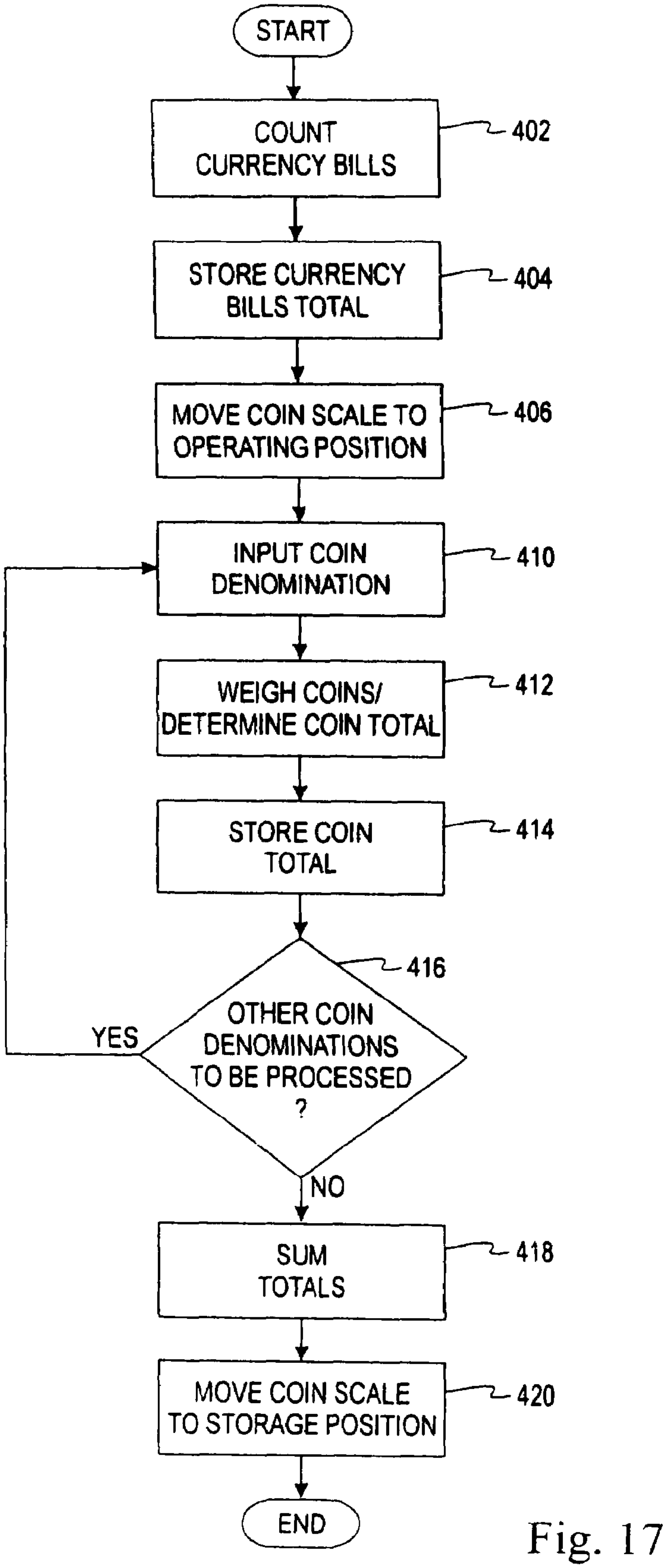
FIG. 17 is a flow chart depicting the operation of one embodiment of the present invention.

Referring to FIG. 17, the operation of the currency bill and coin processing system 50 will now be described according to one embodiment of the present invention. One application of the currency bill and coin processing system 50 is in a retail setting (e.g., a grocery store) where cash transactions are commonplace. Typically in retail settings, cashiers operate cash registers that hold cash (coins and currency bills) and other media in a cash till drawer. Coins and currency bills are segregated by denomination in separate compartments in the cash till drawer. At certain times during the day such as at the end of a cashier's shift or at predetermined intervals, the cash till drawer of each cash registered is "counted-down"—a process whereby cash in the cash till drawer is counted and then compared to the drawer's beginning balance and the day's sales/receipts. In another example, cash till drawers for self check-out depositories (e.g., self check-out registers at retail stores) may also need to be counted-down. Counting-down a cash drawer is a time consuming process and, because the currency bills and coins are typically manually totaled, it is a process wrought with opportunity for human error.

A cashier counting down a cash till drawer can save time and reduce errors by using the coin and currency bill processing system 50. The cashier begins, for example, by first counting the currency bills in the cash till drawer at step 402. The currency bills from the drawer are stacked and placed in the input receptacle the input receptacle 112 of the currency bill processing device 50 (e.g., the single-pocket device 100 of FIG. 2). The currency bill processing device 50 counts currency bills and determines a currency bill total that is displayed on the operator interface 58 and is stored in the memory 57 of the coin and currency bill processing system 50 at step 404. The currency bill processing device 52 may also evaluate the authenticity of each of the currency bills according to an alternative embodiment of the present invention. In embodiments of the present invention wherein the currency bill processing device 52 is a note counter, each currency bill denomination must be individually processed and the totals corresponding to the individual denominations are stored in the memory 57. For example, first the $1 currency bills are placed in the input receptacle and counted by the device 52, then the $5 currency bills are placed in the input receptacle and counted by the device 52, etc. In embodiments where the device 52 is capable of determining the denomination of currency bills, all currency bills in a cash drawer may be placed in the input receptacles at the same time and a total vale can be determined by the device 52.

Continuing with the present example, after the currency bills have been counted, the coins are then counted. The coin scale 54 is moved from its storage position beneath the currency bill processing device 52 to the operating position at step 406, wherein the coin scale 54 is extending out from beneath the currency bill processing device 52. It is noted that the coins and currency bills can be processed in any order. Further, coin processing can be commenced while the currency bill processing is still underway according to some embodiments of the present invention.

A group of coins of a first coin denomination such as pennies, for example, are removed from their individual compartment in the cash till drawer and placed on the coin scale 54. Optionally, the denomination of coins to be processed is input to the system 50 by depressing the "Set Coin" key 280 of the operator interface 58 (FIG. 15) to prompt the coin scale 54 that the denomination of coins to be weighed is to be entered and then depressing the 1¢ cent key 282 is for assigning the penny denomination as the coin denomination to be processed at step 410. Alternatively, the denomination of coins to be processed is automatically detected. Alternatively still, the coin scale 52 runs the operator through a sequence of denominators and first prompts the operator to weigh pennies, for example. In such an embodiment, it is not necessary for the operator to input the coin denomination to be processed or to use a "Set Coin" key.

The coin scale 52 weighs the pennies and provides a total value for the pennies at step 412, which is communicated to the cashier via the operator interface 58. The penny total is then stored in the memory 57 of the currency bill and coin processing system 50 at step 414. Alternatively, the pennies are added to a running coin total (which in the present example consists only of pennies thus far) or an overall running total wherein the penny total is added to the currency bill total. In addition to a penny total, the operator interface 58 can also display the total number of the pennies and the total weight of the pennies. Further, a hardcopy of these totals can be provided by the optional printer 60. After the penny total is determined, the operator removes the pennies from the coin scale 54.

If there are other coin denominations to be processed, the cashier then proceeds to weigh another denomination of coins such as nickels, for example, at step 416. The cashier places the nickels on the coin scale 54 and, in a similar manner to the pennies, a nickel total is determined. The nickel total is stored in the memory of the system 57, is added to the running coin total and/or is added to the overall running total. In situations wherein the quantity of nickels, for example, is too voluminous for the coin scale 54 to handle in one load, the nickels can be processed in more than one batch.

The cashier proceeds to count all the other coin denominations that are left in the cash till drawer (e.g., dimes, quarters, half-dollar coins and dollar coins). After completing processing each of the coin denominations, the operator can depress the "Total Notes/Coins" key 288 causing the system 50 to sum the totals corresponding with the individual coin denominations and currency bills at step 418, which represents the aggregate amount of cash in the cash till drawer. The cashier can then move the coin scale 54 back to the storage position beneath the currency bill processing device 52 at step 420 so that the currency bill and coin processing system consumes less table-space.

In some applications, such as in the retail settings, the coins in a cash drawer may include rolled coins. For example, the cashier may have rolled coins on hand in the cash drawer in anticipation of running out of a particular coin denomination during the day. According to one embodiment of the currency bill and coin processing system, the coin scale is also able to weigh and count rolled coins. The rolled coins of each denomination are weighed along with the loose coins of the same denomination or are weighed separately. Either way, the rolled coins are included in the aggregate total.

In other applications, particularly in a banking environment, a bank teller may also have strapped, banded, bundled, or clipped stacks of currency to be processed along with the loose currency. The bank teller can manually input the totals corresponding to each total via the operator interface 58 because the amount of currency bills in a strapped stack of currency bills is typically known. For example, it is commonplace to include one-hundred currency bills in a strapped stack of currency bills. Alternatively, the strapped stacks are unstrapped and processed by the currency bill processing device 52. Alternatively still, the coin scale 54 can weigh the strapped stack of currency bills and determine a corresponding total. The teller places the strapped currency bills, one denomination at a time, on the coin scale 54 and inputs via the operator interface 58 the denomination of currency bills on the coin scale 54. For example, the operator interface 58 may include a $1 key for designating the $1 denomination for processing strapped stacks of currency bills. The stack of currency bills is then weighed and the coin scale 54 calculates the dollar amount corresponding to the strapped stack of currency bill. A strapped $1 currency bill total is then stored in the memory 57 of the system 50. Subsequent stacks of currency bills are processed in a like manner. After all the coins (loose, bagged, and rolled) have been processed and all the currency bills (loose and strapped) have been processed, the operator selects the "Total Notes/Coin" key 288 on the operator interface 58 and the aggregate total of all coins and currency bills processed is displayed by the operator interface. Alternatively, where the coin scale 54 automatically checks through a sequence of coin denominations to be weighed, the coin scale 54 may automatically sum the totals after exhausting the list of denominations. In such an embodiment, a total key 288 may not be necessary as the system 50 can automatically determine the totals upon exhausting the sequence of denominations. Alternatively still, the system 50 maintains a running totals so that after each coin denomination of coin is weighed, or each currency bill denomination is processed, the system adds the total to previously determined totals. Alternatively still, the system 50 recalls denominations for correction.

In an alternative embodiment of the present invention, the currency bill and coin processing system 50 is communicatively linked to an internal computer system of the retail store or the bank where the system 50 resides. Therefore, in the previous example wherein a cashier counted down a cash drawer, the aggregate total determined for the cash drawer is automatically compared to the drawer's beginning balance and sales activity which is stored on the internal computer system.

While the currency bill and coin processing system 50 has been described in terms of a compact or table-top device, the currency bill and coin processing system 50 can include a high-capacity currency bill processing devices for certain applications that may require the ability to process currency bills at a higher capacity. A high-capacity currency bill processing device which can be communicatively coupled to a coin scale 54 according to an alternative embodiment of the present invention is described in U.S. Pat. No. 6,398,000 ("Currency Handling System Having Multiple Output Receptacles"), which is incorporated herein by reference in its entirety.

Figure 18:
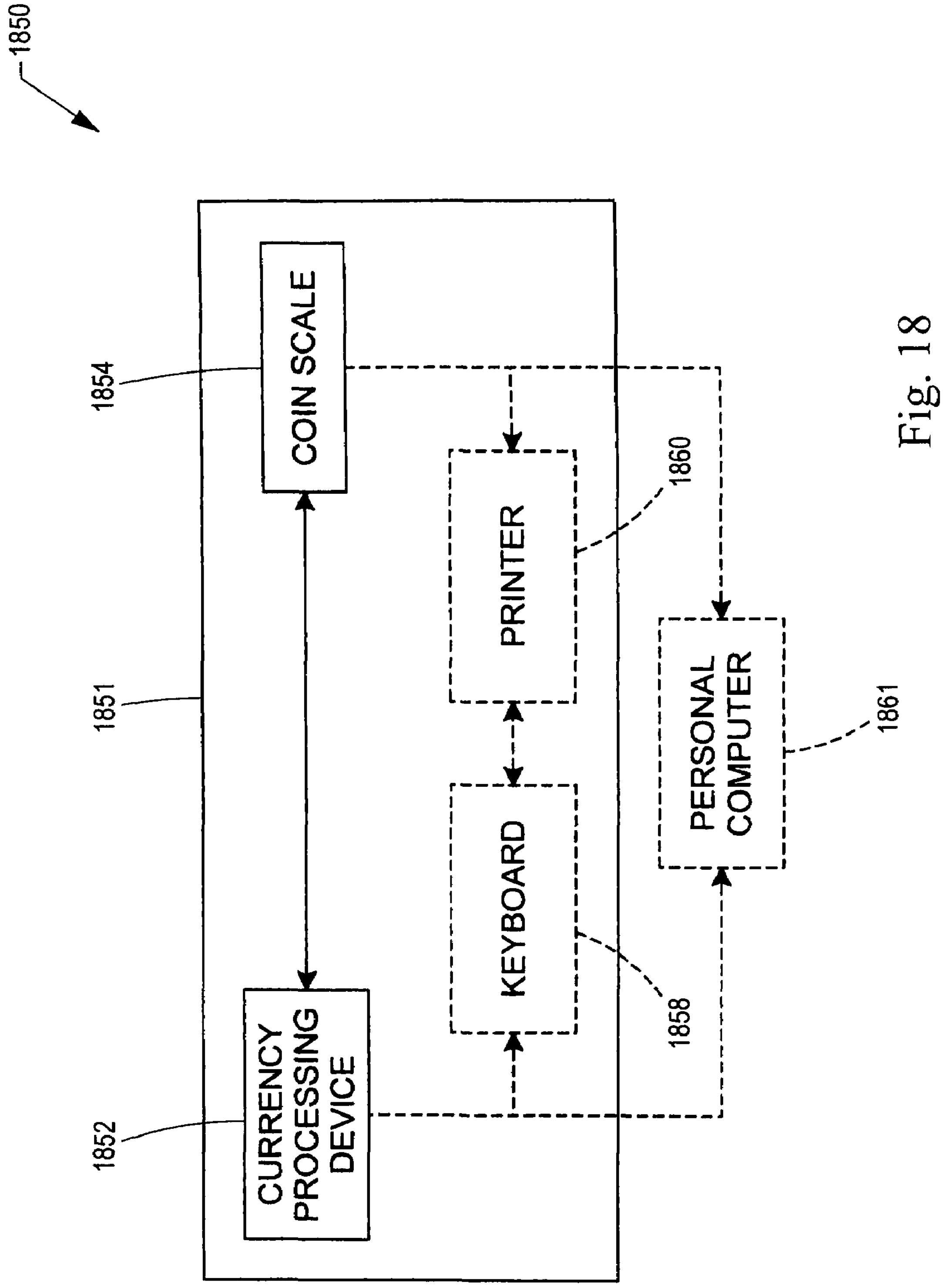
FIG. 18 is a functional block diagram of a currency bill and coin processing system, according to an alternative embodiment of the present invention.

Referring to FIG. 18, a currency bill and coin processing system 1850 includes a housing 1851 that integrates into a single unit a currency processing device 1852 for counting currency bills and a coin scale 1854 for counting coins. One use of the currency bill and coin processing system 1850 is to total currency bills and coins in a batch such as, for example, a cash till drawer at a bank or a retail store. The currency bill processing device 1852 and the coin scale 1854 are communicatively linked for summing currency bill totals and coin totals determined by the respective devices. The currency bill processing device 1852 and the coin scale 1854 may be communicatively linked by way of wires or by a wireless communication system according to alternative embodiments of the currency bill and coin processing system 1850. The currency bill and coin processing system 1850 can operate and include similar features as any of the systems described in reference to FIGS. 1-17.

Optionally, the housing 1851 further integrates into the single unit at least one of a keyboard 1858 and a printer 1860, each of which being communicatively linked to at least one of the currency processing device 1852 and the coin scale 1854. More specifically, the keyboard 1858 and the printer 1860 are communicatively linked to one or more processors (which are described in more detail in reference to one or more of FIGS. 1-17) associated with the currency processing device 1852 and the coin scale 1854.

According to some embodiments, the keyboard 1858 is adapted to manually receive from an operator information related to at least one of currency bills, coins, and other forms of media. According to some embodiments, the operator can use the keyboard 1858 to input information related only to currency bills and coins. According to some embodiments, the operator can use the keyboard 1858 to input other information, such as customer information, account-related information, etc. The other forms of media include traveler check information, gift certificate information, credit card receipts, coupons, etc. According to some embodiments, the printer 1860 is adapted to print a hardcopy of information related to any one or more of the currency bills, coins, other forms of media, customer information, account-related information, etc.

According to some embodiments, an optional computer 1861, such as a personal computer, is communicatively linked to the currency bill and coin system 1850 for sending and/or receiving information to/from the currency bill and coin system 1850. The personal computer 1861 is communicatively linked to one or more of the currency processing device 1852, the coin scale 1854, the keyboard 1858, and the printer 1860. For example, the keyboard 1858 can be used to operate the personal computer 1861. According to some embodiments, the computer 1861 may be located within the housing 1851.

Figure 19:
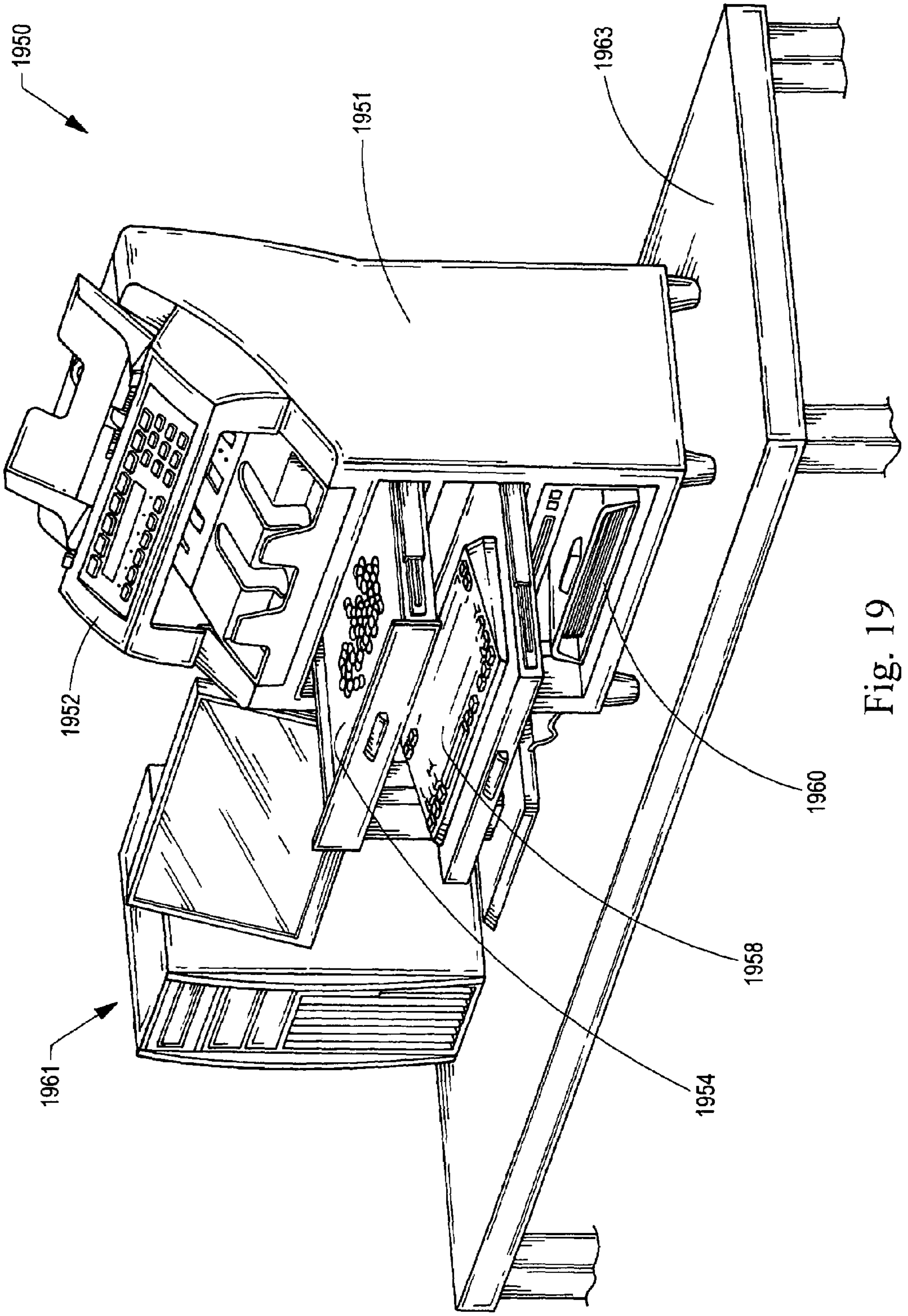
FIG. 19 is a perspective view of a currency bill and coin processing system, according to another alternative embodiment of the present invention.

Referring to FIG. 19, according to some embodiments an integrated system 1950 includes a housing 1951, a currency bill processing device 1952, a coin scale 1954, a keyboard 1958, and a printer 1960. The integrated system 1950 is coupled to a personal computer 1961 on top of a table 1963. The currency bill processing device 1952 is located above the coin scale 1954 (toward the top of the housing 1951), the keyboard 1958 is located below the coin scale 1954, and the printer is located below the keyboard 1958 (toward the bottom of the housing 1951).

According to some embodiments, the currency bill processing device 1952 is immovably located within the housing 1951 such that it is accessible for use from within the housing 1951. The coin scale 1954 is movable from a storage position, within the housing 1951, to an operating position (as shown) outside the housing 1951. Similarly, the keyboard 1958 is movable from a storage position, within the housing 1951, to an operating position (as shown) outside the housing 1951.

According to some embodiments, the storage position of the coin scale 1954, of the keyboard 1958, or of any other components of the system 1950 (e.g., the currency bill processing device 1952, the printer 1960, etc.) is such that the component is fully or partially within the housing 1951. According to some embodiments, the operating position of a respective component is such that the component is fully or partially outside the housing 1951.

According to some embodiments, the printer 1960 is immovably located within the housing 1951, wherein the printed hardcopies (e.g., papers) are easily available to the operator. In alternative embodiments, any of the currency bill processing device 1954, the coin scale 1954, the keyboard 1958, and the printer 1960 can be movably or immovably located within the housing 1951.

The integrated system 1950 provides the operator with simple and accessible features for financial transactions that are provided in a device that is generally compact in size. For example, the operator can obtain a currency bill total from the currency bill processing device 1952, a coin total from the coin scale 1954, an other-media total from the keyboard 1958, etc. Similarly, the operator can use the keyboard 1958 to operate the integrated system 1950 and/or the personal computer 1961. The printer 1960 can be used to print information from the integrated system 1950 and/or from the personal computer 1961. Further, the integrated system 1950 provides a solution to reducing space-requirements necessary for storing and using each of the currency bill processing device 1952, the coin scale 1954, the keyboard 1958, and the printer 1960. Optionally, the integrated system 1950 may be used in accordance with any of the embodiments described above in reference to FIGS. 1-18.

Figure 20:
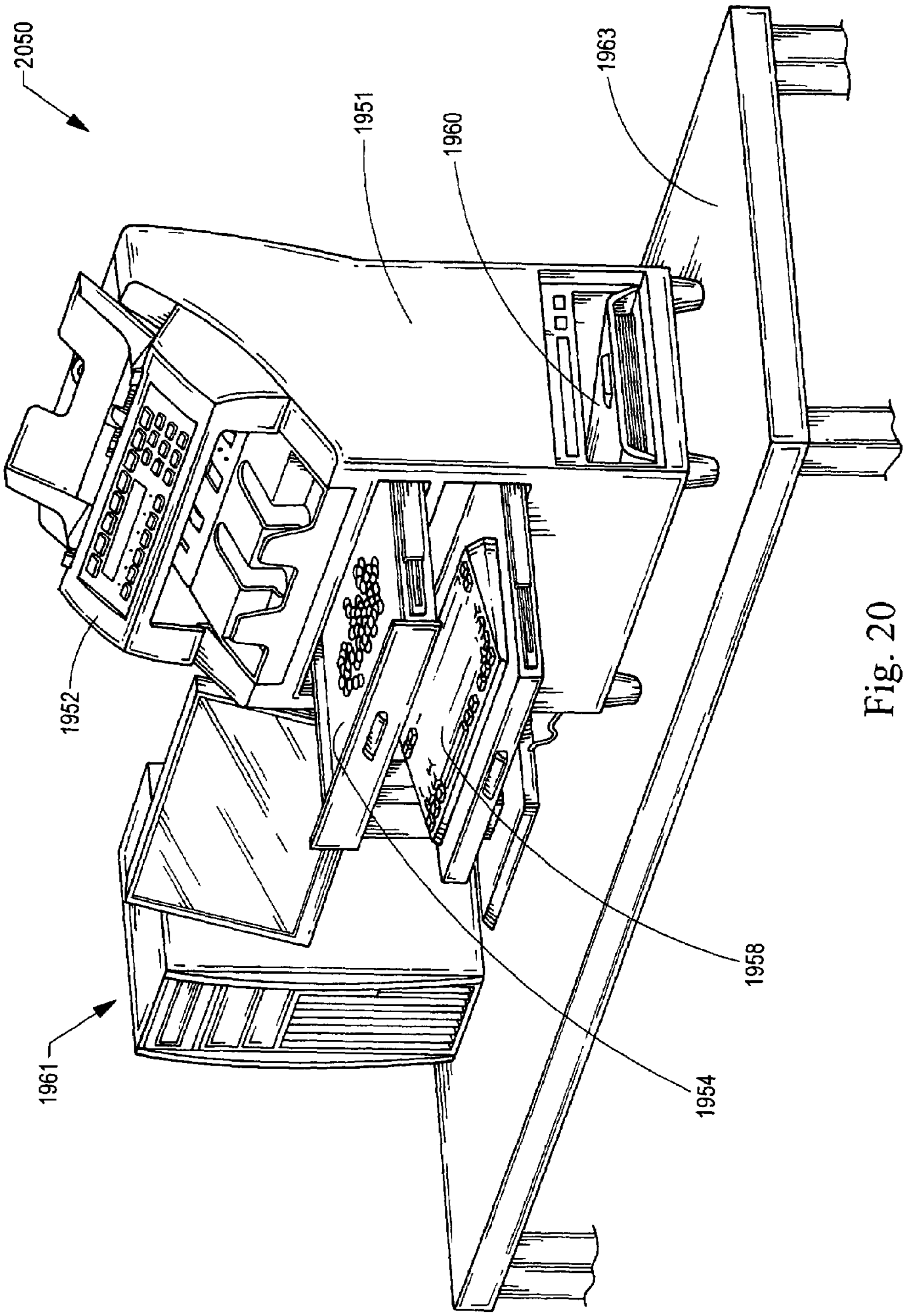
FIG. 20 is a perspective view of a currency bill and coin processing system, according to another alternative embodiment of the present invention.

Referring to FIG. 20, an integrated system 2050 includes a housing 2051, along with the currency bill processing device 1952, the coin scale 1954, the keyboard 1958, and the printer 1960. The housing 2051 is similar to the housing 1951 described above in reference to FIG. 19, except that the printer 1960 is located on the side of the housing 2051. This embodiment provides an alternative way to access printouts from the printer 1960. In alternative embodiments, the currency bill processing device 1952, the coin scale 1954, the keyboard 1958, and the printer 1960 can be located anywhere within the housings 1951 and 2051.

Figure 21:
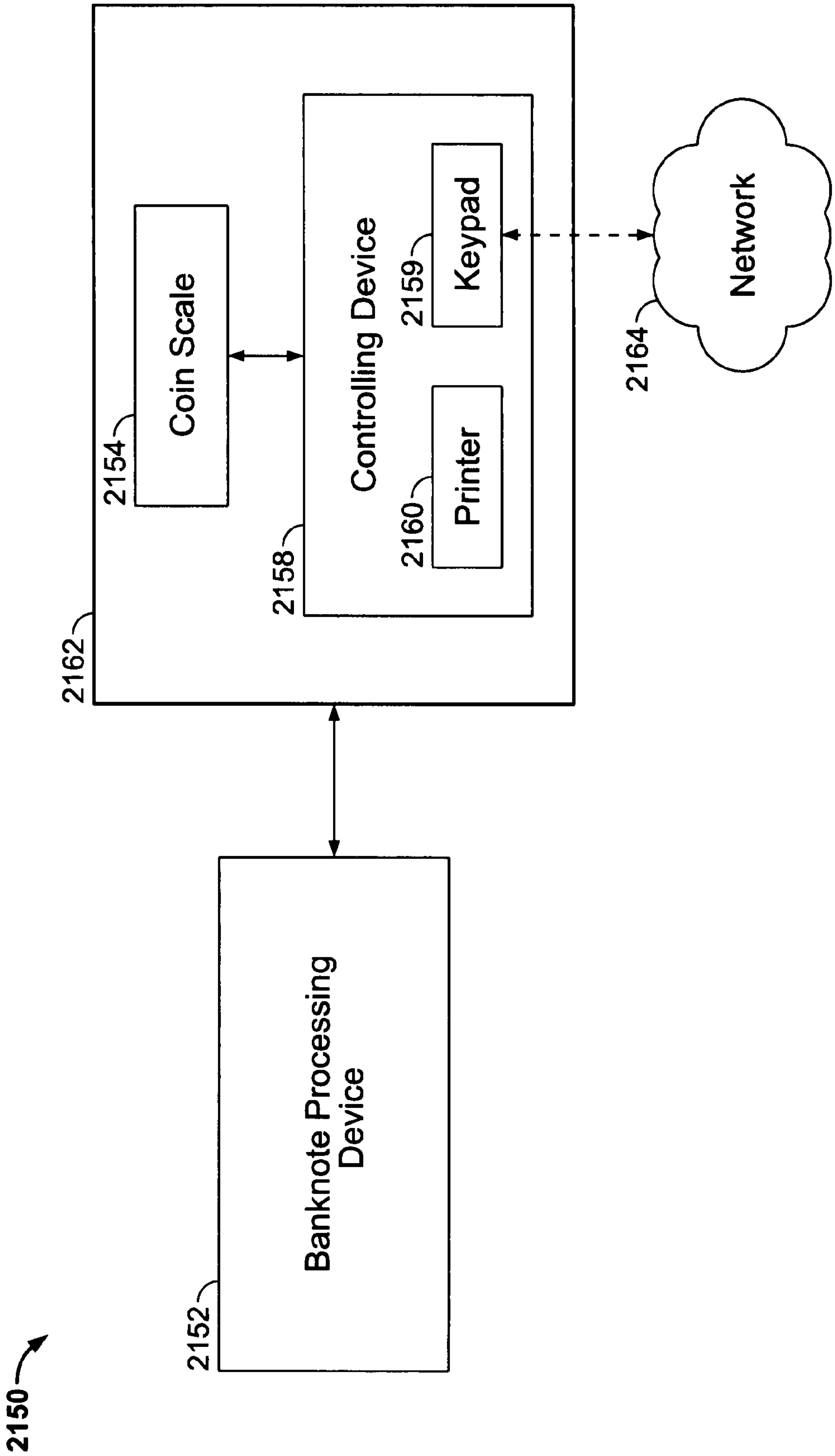
FIG. 21 is a functional block diagram of a currency bill and coin processing system, according to another alternative embodiment.
Figure 22A:
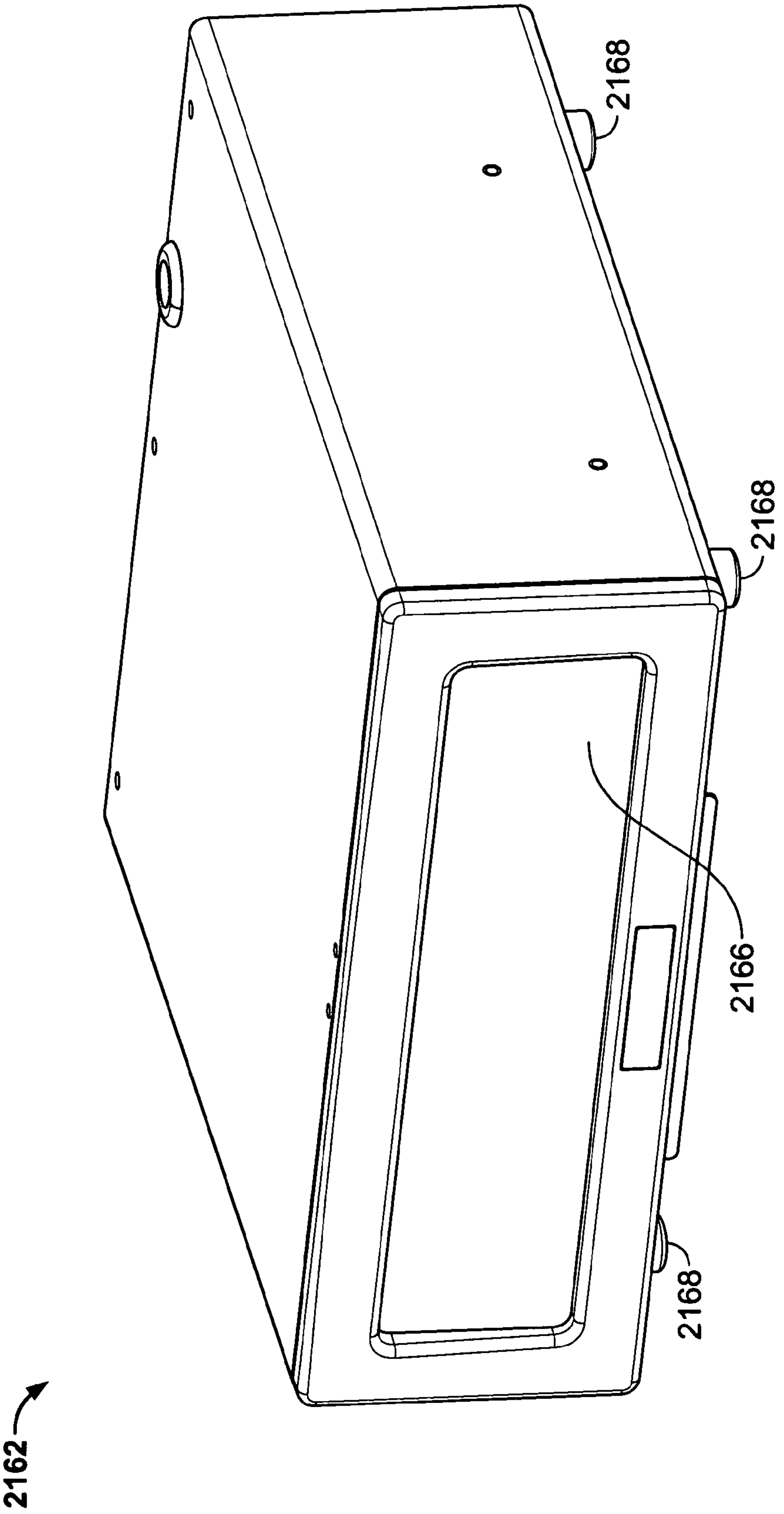
FIG. 22A is a perspective of an enclosure for a currency bill and coin processing system.
Figure 22B:
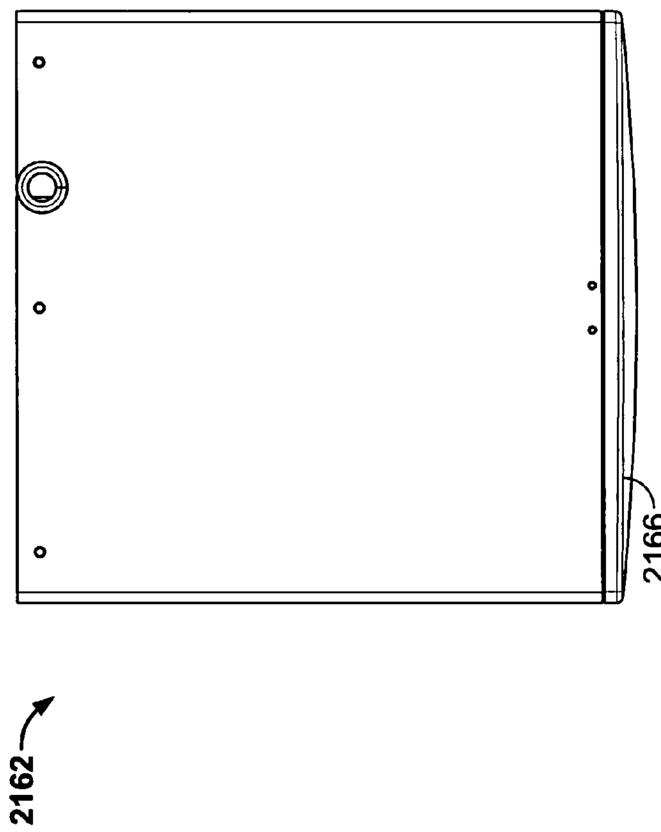
FIG. 22B is a top view of the enclosure of FIG. 22A.
Figure 22D:
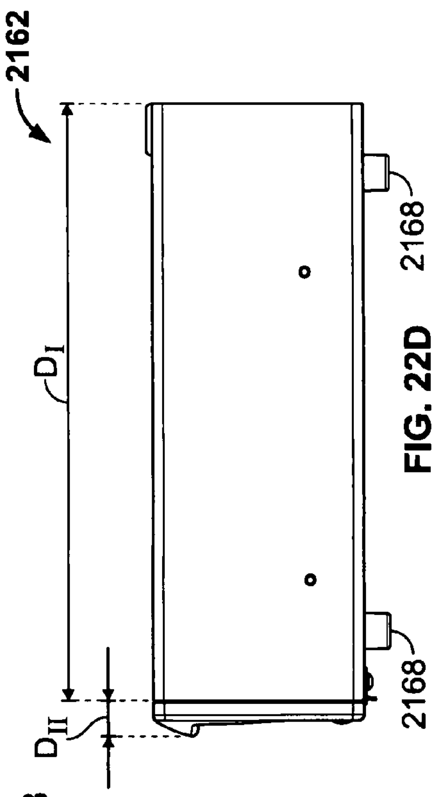
FIG. 22D is a side view of the enclosure of FIG. 22A.
Figure 22C:
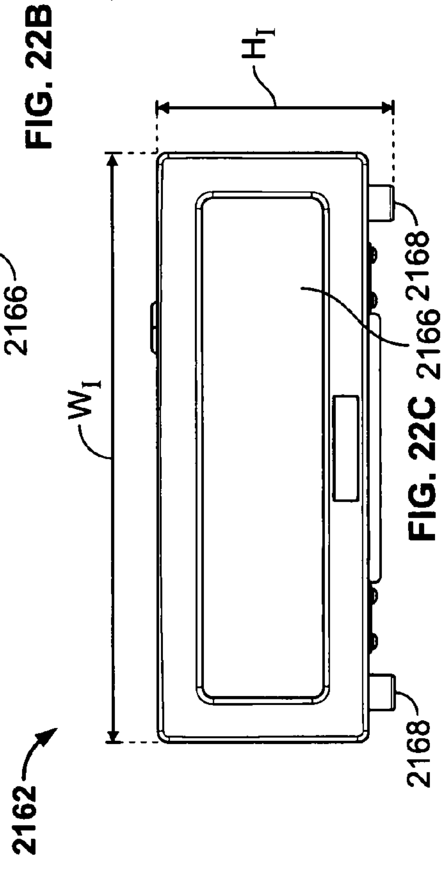
FIG. 22C is a front view of the enclosure of FIG. 22A.

Referring to FIG. 21, a functional block diagram illustrates a currency bill and coin processing system 2150 having a currency bill processing device 2152 (also referred to as a banknote processing device), a coin scale 2154, and a controlling device 2158. The currency bill processing device 2152 is generally used to analyze, authenticate, denominate, count, scan, and/or otherwise process currency bills and/or other media. For example, the currency bill processing device 2152 can be or include similar features to any of the currency bill processing devices 100, 200, 210, 220, 230 described in reference to FIGS. 2-9. The system 2150 is especially useful when small volumes of coin and larger volumes of currency bills (or other media) require processing.

Among other functions, the system 2150 provides a quick value count of loose change and/or rolled coin, prepares a large volume of cash for deposit (including no-cash media), and sets up tills for the next shift of an employee (e.g., in a convenience store or a retail operation). The system 2150 has innate intelligence to guide a user (or operator) through the process of processing currency, requires minimum counter space, and is capable of communicating with a retailer's cash management system.

The coin scale 2154 can be or have similar features to any of the coin scales 54, 250, 272, 1854, 1954 described in reference to FIGS. 1, 10-14, and 18-20. According to an alternative embodiment, the coin scale 2154 is a coin scale manufactured by Acculab, model VIC-3101 (VICON series). The VIC-3101 coin scale has a weighing capacity of about 3,100 grams and a weight of about 1.1 kilograms. The VIC-3101 coin scale has a width of about 6.8 inches (about 17.27 cm), a depth of about 9.8 inches (about 24.89 cm) and a height of about 3.15 inches (about 8 cm). Among other features, the VIC-3101 coin scale includes a tare feature (e.g., deducting the weight of a coin holder from the weight of the coins). In one application of the coin scale 2154, a user places one or more removable coin cups from a register till unto the coin scale 2154, which determines the value of the coins present in the coin cups. The coins are either loose or rolled. The coin scale 2154 is generally an inexpensive alternative to hand counting in settings such as retail or convenience stores.

The controlling device 2158 can be or have similar features to any of the CPU 56 described in reference to FIG. 1 or the personal computers 1861, 1961 described in reference to FIGS. 18-20. According to an alternative embodiment, the controlling device 2158 is a point-of-sale terminal having an integrated keypad 2159 and an integrated printer 2160. For example, the controlling device 2158 is a Vx570 terminal manufactured by VeriFone, Inc. The Vx570 VeriFone terminal includes 128×64 pixel graphics, an LCD display with backlighting, a magnetic card reader, a 3×4 numeric keypad 2159, and an integrated thermal printer 2160. The Vx570 VeriFone terminal has a width of about 4 inches (about 10.16 cm), a depth of about 8 inches (about 20.32 cm), and a height of about 3.07 inches (about 7.78 cm). The weight of the Vx570 VeriFone terminal is about 1.65 pounds.

The controlling device 2158 is communicatively coupled to the currency bill processing device 2152 and the coin scale 2154 by way of wires or by a wireless communication system. The controlling device 2158 controls, generally, the currency bill and coin processing system 2150. For example, the controlling device 2158 indicates whether the currency bill processing device 2152 and the coin scale 2154 are operable, and prompts a user for basic and advanced operation of the system 2150. The keypad 2159 is adapted to receive input from an operator, including information related to currency bill totals, coin total, other-media totals, etc. The printer 2160 includes a provision for printing a selected number of copies and for indicating error messages, such as a paper jam or an out-of-paper condition.

According to an alternative embodiment, the controlling device 2158 and the coin scale 2154 are positioned inside an enclosure 2162 (which is described in more detail below). Optionally, the currency bill processing device 2152 is supported by the enclosure 2162. In alternative embodiments, the currency bill and coin processing system 2150 is communicatively coupled to a network 2164 for communicating with a point-of-sale system. The network 2164 can be any type of network, including an accounting system and a remote management system. For example, the controlling device 2158 is optionally coupled to a retailer's in-house cash management system via the Internet to communicate cash till information.

Referring to FIGS. 22A-22D, the enclosure 2162 has a front door 2166 for accessing the coin scale 2154 and the controlling device 2158, which are stored inside the enclosure 2162. The enclosure 2162 has a width $W_I$ of about 13 inches (about 33 cm), a main body depth $D_I$ of about 13 inches (about 33 cm), a front door depth $D_{II}$ of about 0.75 inches (about 1.9 cm), an overall height $H_I$ of about 5.25 inches (about 13.34 cm), and a main body height $H_{II}$ of about 4.69 inches (about 11.9 cm). The enclosure 2162 further includes a plurality of feet 2168 attached to a bottom surface of the enclosure 2162. Specifically, the plurality of feet 2168 includes two front feet and two rear feet.

Figure 23:
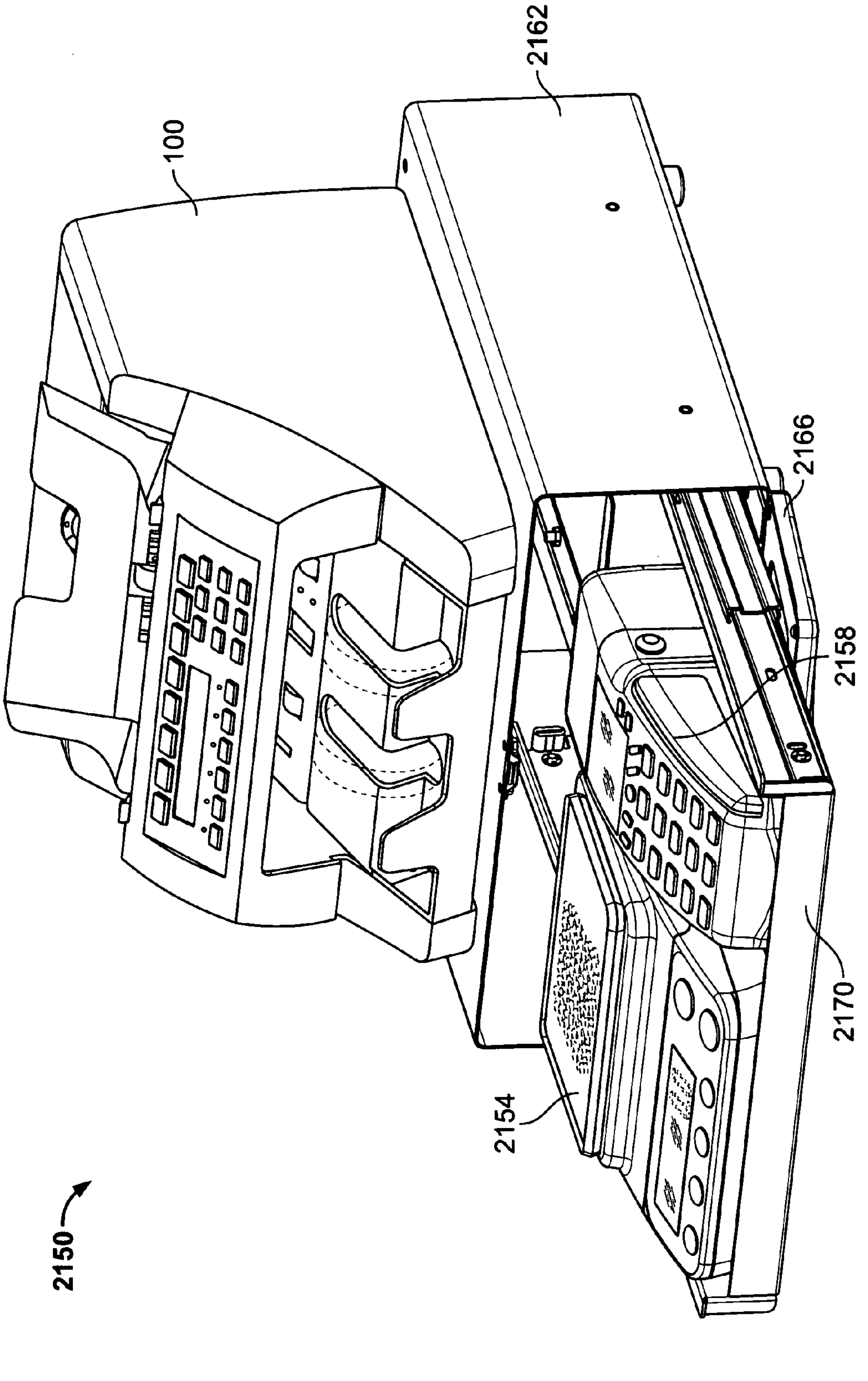
FIG. 23 is a perspective view of a currency bill processing device and the enclosure of FIG. 22A, in which a coin scale and a point-of-sale terminal are located.

Referring to FIG. 23, a physical embodiment of the currency bill and coin processing system 2150 is illustrated in more detail. Specifically, the enclosure 2162 is illustrated with the front door 2166 in an open position to permit the extension (exterior to the enclosure 2162) of a tray 2170. The tray 2170 includes the coin scale 2154 and the controlling device 2158 positioned adjacent each other. Additionally, the single-pocket device 100 is positioned on top of the enclosure 2162.

According to this embodiment, the overall footprint of the system 2150 changes based on whether the tray 2170 is extended (exterior to the enclosure 2162) or retracted (fully or partially within the enclosure 2162). For example, when the tray 2170 is fully retracted inside the enclosure 2162, the overall footprint of the system 2150 is identical to the footprint of the enclosure 2162. Thus, the smallest footprint of this embodiment is about 13 inches (about 33 cm) in width, about 13.75 inches (about 34.9 cm) in depth. The footprint dimensions of the system 2150 are large enough to accommodate the footprint of the single-pocket device 100 (which has a footprint of about 11 inches (about 27.94 cm) in width and about 12 inches (about 30.48 cm) in depth)). The height of the system 2150 includes the height of the enclosure 2162, which is about 5.25 inches (about 13.34 cm), and the height of the currency bill processing device 2152 (e.g., about 9.5 inches (about 24.13 cm) for the single-pocket device 100, about 17.5 inches (about 44.45 cm) for the two-pocket device 200, etc.). Thus, the system 2150 has an overall height of about 14.75 inches (about 37.47 cm) if the single-pocket device 100 is being used, and an overall height of about 22.75 inches (about 57.79 cm) if the two-pocket device 200 is being used.

If the user desires to extend the tray 2170 such that the coin scale 2154 and the controlling device 2158 are fully outside of the enclosure 2162, the only dimension that changes is the footprint depth. The depth will likely increase by about 8 inches (about 20.32 cm) to fully expose the controlling device 2158 (if the Vx570 VeriFone terminal is used) and by about 9.8 inches (about 24.89 cm) to fully expose the coin scale 2154 (if the VIC-3101 coin scale is used). Accordingly, to fully expose the controlling device 2158 (if the Vx570 VeriFone terminal is used) and the coin scale 2154 (if the VIC-3101 coin scale is used), the footprint of this embodiment is about 13 inches (about 33 cm) in width and about 23.55 inches (about 59.82 cm) in depth.

Figure 24:
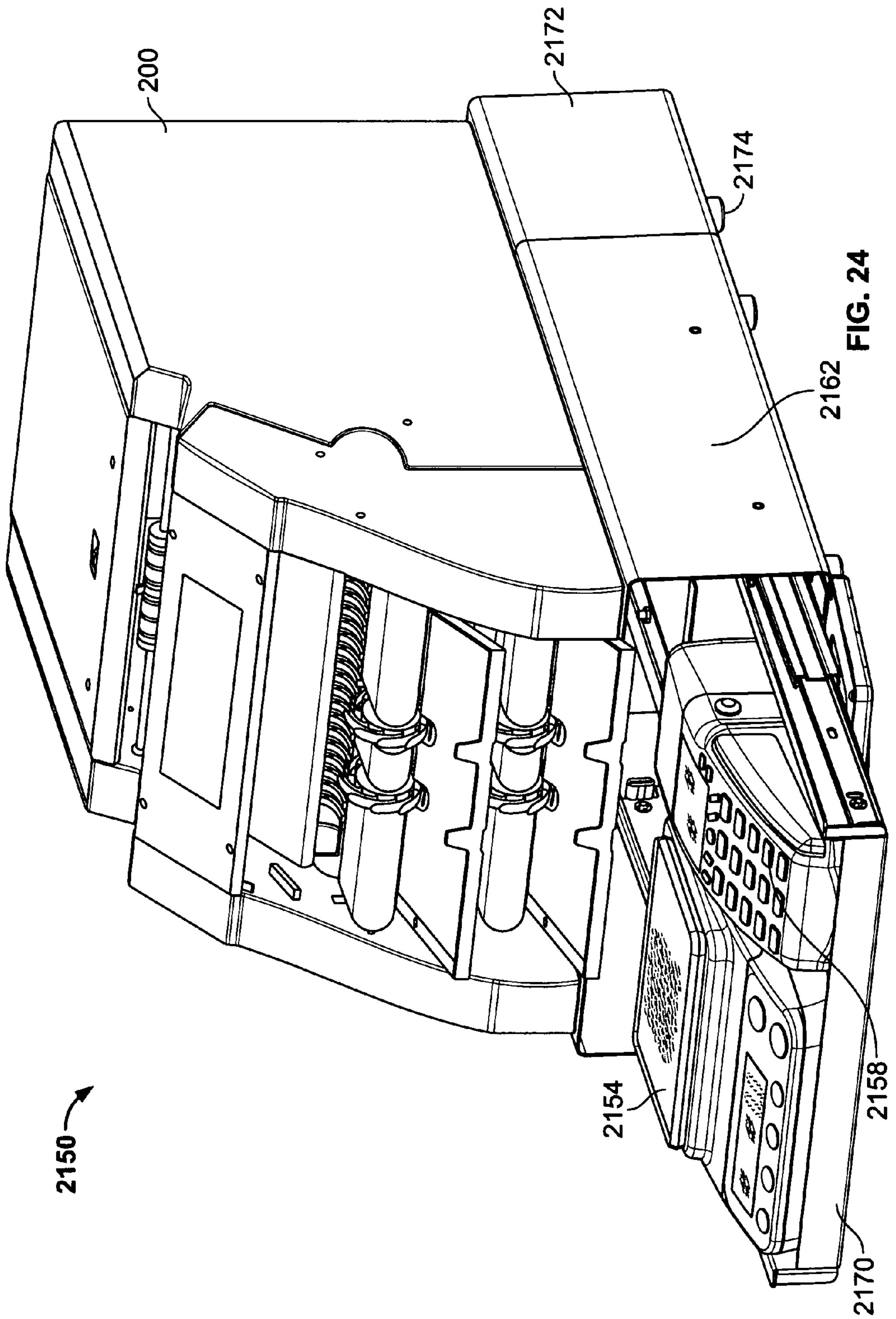
FIG. 24 is a perspective view of the enclosure of FIG. 22A having an attachment for accommodating a larger foot print of a currency bill processing device.

Referring to FIG. 24, the enclosure 2162 is modified to receive an extension attachment 2172 for accommodating a currency bill processing device 2152 that has a larger footprint. For example, the extension attachment 2172 is designed to accommodate the footprint of the two-pocket device 200. According to one embodiment, the extension attachment 2172 has a depth of about 5.5 inches (about 13.97 cm). Thus the enclosure 2162 and the extension attachment 2172 have a combined overall depth of about 19.25 inches (about 48.90 cm). The extension attachment 2172 includes a pair of feet 2174.

According to an alternative embodiment, the currency bill and coin processing system 2150 can be used to provide cash information from any store of a chain of stores. The cash information can be accessed by any store of the chain stores or, optionally, information access can be limited to a particular office, e.g., a corporate office. Nevertheless, cash information from all the tills from all the stores is inputted into a monitored system. The cash information can include financial numbers (e.g., total coin currency for a certain day), images of currency bills, checks, or other media, etc. For example, via an imaging device, a corporate headquarters office can access serial numbers of currency bills that were received in any store of the chain of stores. The imaging device can be any integrated or separate high speed imaging device, check imager, etc. The imaging device can be set up to perform bulk imaging or imaging of one document at a time. For example, in accordance with one embodiment, the imaging device may be of the type disclosed in U.S. Pat. No. 6,810,137, issued on Oct. 26, 2004, and U.S. Pat. No. 7,000,828, issued on Feb. 21, 2006, each of which is assigned to the current assignee and incorporated herein by reference in its entirety. The scanning system can include, for example, a full image scanner that includes means for obtaining a full video image of a plurality of documents, means for obtaining an image of a selected area of the documents, and means for obtaining information contained in the selected area of the documents.

Figure 25:
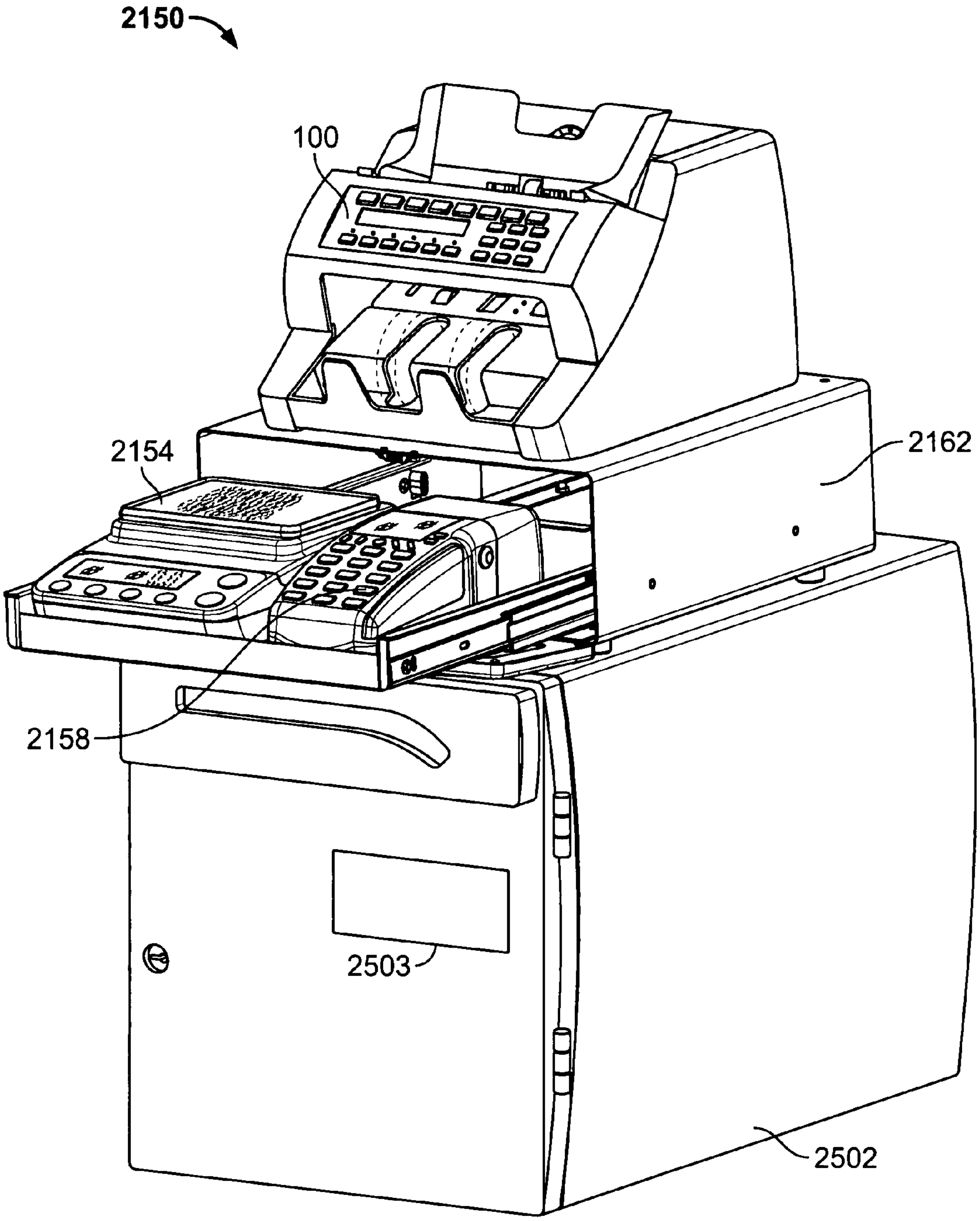
FIG. 25 is a perspective view of a currency bill and coin processing system coupled to a safe, according to an alternative embodiment.

Referring to FIG. 25, the currency bill and coin processing system 2150 includes or is coupled to a safe 2502 for transferring currency into the safe 2502. Optionally, a safe interface couples the system 2150 to the safe 2502 and automatically transfers the currency from the system 2150 directly into the safe. The safe 2502 can optionally include a cash dispenser 2503 for retrieving currency from the safe 2502. According to the illustrated embodiment, the system 2150 is positioned on top of the safe 2502.

The safe 2502 is useful for minimizing transportation of currency from one location to another. For example, some retailers prefer to recycle currency as much as possible to minimize fees associated with transporting currency. Other retailers prefer to start each day with new currency and end the day by transporting all currency to a safe. To reduce theft prevalent in retail markets, it would be advantageous to decrease or eliminate the distance between the system 2150 and the safe 2502 (e.g., transferring currency directly or indirectly into the safe 2502).

The system 2150 can be programmed to provide appropriate till currency bills and coins based on a user needs. For example, a user may bring a cash till to the system 2150 to count currency bill and coin totals at the end of an employee's shift. After recording the total information, the system 2150 is programmed to remove (or indicate for removal) an amount of currency bills or coins such that a base starting amount is left in the till for the next shift. For example, if the total currency bills and coins from a till is $1,000 and the base starting amount (as required by retailer preferences) is $150, the system 2150 automatically removes $850 directly into the safe 2502. Alternatively, the system 2150 prompts the user to remove $850 from the till and to deposit the removed currency into the safe 2502. According to an alternative embodiment, the user empties the till after the currency bills and coins have been counted and, then, uses the cash dispenser 2503 to receive the base starting amount for the till.

Figure 26:
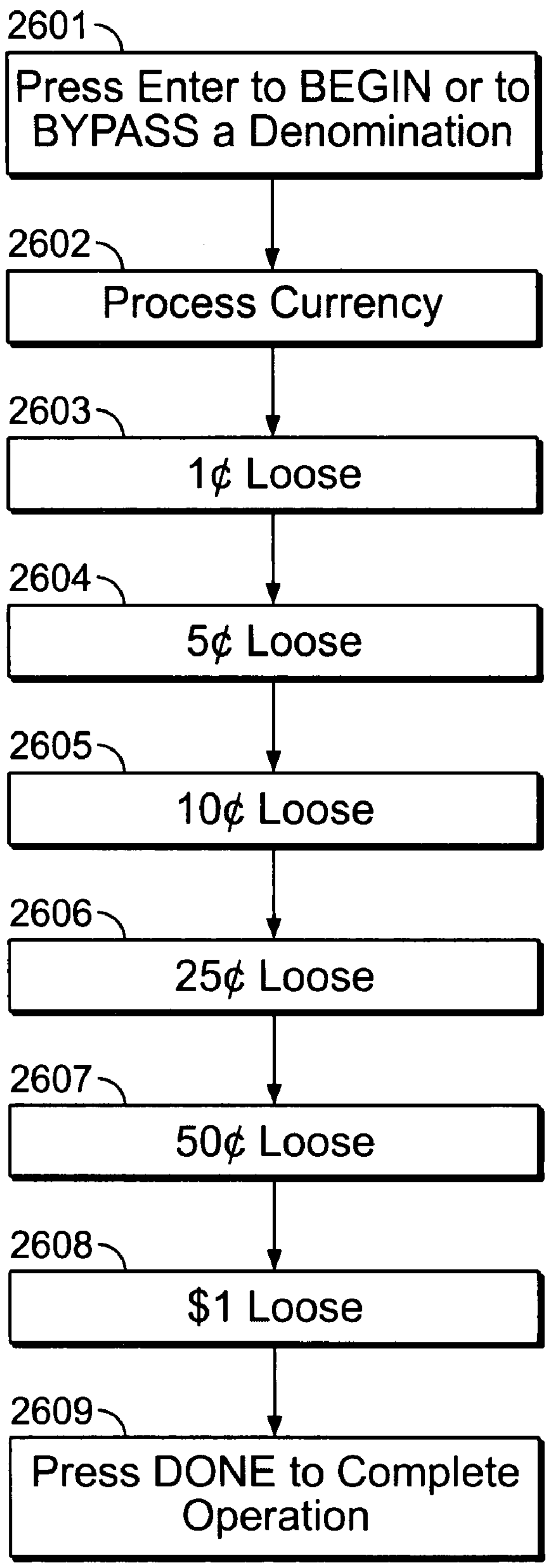
FIG. 26 is a flowchart representing prompts for user input when using a bill and coin processing system, according to an alternative embodiment.

Referring to FIG. 26, according to an alternative embodiment, the controlling device 2158 provides prompts for user input to simplify use of the currency bill and coin processing system 2150. The user is guided through a sequence of steps using as few key presses as possible. The prompts minimize, or likely eliminate, time associated with training new personnel to use the system 2150. This is highly beneficial especially in stores where personnel turnover is high (e.g., low-paying, unskilled jobs).

In the illustrated example, the user is guided through a basic cash processing operation of the system 2150. The controlling device 2150 prompts the user to "Press Enter to BEGIN or to BYPASS a Denomination" (2601). After the user presses the "Enter" button, the controlling device 2150 prompts the user to load currency bills in the currency bill processing device 2152. After the currency bills are processed, the user removes the currency bills from the currency bill processing device 2152 and receives totals (by denomination) from the currency bill processing device 2152. The controlling device 2150 prompts the user for coins of the penny (i.e., 1 cent) denomination (2603), which can be placed on the coin scale 2154 loose or in a cup. The user removes the coins promptly, after the coin scale 2154 has determined the weight of the coins, and the controlling device receives a total for the penny denomination coins. The controlling device 2150 prompts the user, in turn, for the remaining coin denominations, nickels, dimes, quarters, etc. (2604-2608) and the user proceeds accordingly. The user can bypass a denomination by pressing the "Enter" button (2601) or can complete the operation by pressing the "Done" button (2609). A total for the coins and for the currency bills is provided by the controlling device 2150, which can print a receipt for the user via the printer 2160. The receipt can list separately, by denomination, totals for currency bills, other media, loose coins, and rolled coins. Media entries, for example, can be listed as single line totals for each media type. Grand totals can be listed as a single line entry, which includes all processed currency, coin, and media entries. A similar procedure can be used to process rolled coin.

The controlling device 2150 can further include other, more advanced, features. For example, the controlling device 2150 can include a date entry feature. When this feature is enabled in set up, the user is prompted to enter the date after each power up and it is saved as long as the controlling device 2150 is not powered off. The user is prompted to "enter DATE" as soon as the unit is powered on. Optionally, the controlling device 2150 includes an automatic date/clock function. Another exemplary feature can include a media entry feature. When this feature is enabled, the controlling device 2150 prompts the user to "enter media 1" after the last coin denomination is processed (either loose or rolled). The user is further prompted to enter additional media types, until the last media type is enabled.

While the invention is susceptible to various modifications and alternative forms, specific embodiments thereof have been shown by way of example in the drawings and herein described in detail. For example, although the exemplary embodiments of the currency bill and coin processing system 2150 are shown with single and double-pocket devices, other multi-pocket currency bill processing devices can be used, including the multi-pocket devices shown in FIGS. 7-9. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A system for processing currency bills, coins, and other media, the system comprising:

a compact currency bill processing device for counting currency bills of a plurality of denominations, the currency bill processing device having an input receptacle for receiving a stack of currency bills and a transport mechanism adapted to transport the currency bills, one at a time, from the input receptacle past an evaluation unit to at least one output receptacle, the compact currency processig device being adapted to determine the denomination of each of the currency bills;

a coin scale adapted to receive at least one group of coins of a single denomination and to determine a coin total for the at least one received group corresponding to the value of the coins in the received group; and a controlling device communicatively coupled to the currency bill processing device and the coin scale, the controlling device including a keypad adapted to manually receive information from an operator, the information being related to at least one of the currency bills, the coins, and other media, and a printer adapted to print a hardcopy of information associated with the currency bills, the coins, and the other media.

2. The system of claim 1, further comprising at least one processor communicatively linked to the currency bill processing device, the coin scale, and the controlling device, the processor being programmable to determine the aggregate total corresponding to the sum of at least one of a currency bill total, a coin total, and an other-media total.

3. The system of claim 2, wherein the at least one processor is included in at least one of the currency bill processing device, the coin scale, or the controlling device.

4. The system of claim 1, further comprising an enclosure having an interior tray, the interior tray being movable from a closed position to an open position, the coin scale and the controlling device being located on the interior tray.

5. The system of claim 4, wherein the currency bill processing device is positioned on a top surface of the enclosure.

6. The system of claim 4, wherein the enclosure has a minimal footprint when the interior tray is fully retracted inside the enclosure, the minimal footprint being about 13 inches in width and about 13.75 inches in depth when the currency bill processing device is a single-pocket device.

7. The system of claim 4, wherein the enclosure has a maximum footprint when the interior tray is extended outside the enclosure such that the coin scale and the controlling device are accessible to an operator, the maximum footprint being about 13 inches in width and about 23.55 inches in depth when the currency bill processing device is a single-pocket device.

8. The system of claim 4, wherein the system has an overall height of about 14.75 inches when the currency bill processing device is a single-pocket device.

9. The system of claim 4, wherein the enclosure has a minimal footprint when the interior tray is fully retracted inside the enclosure, the minimal footprint being about 13 inches in width and about 19.25 inches in depth when the currency bill processing device is a two-pocket device.

10. The system of claim 4, wherein the system has an overall height of about 22.75 inches when the currency bill processing device is a two-pocket device.

11. The system of claim 4, further comprising an extension attachment for accommodating a larger footprint, the extension attachment being mechanically coupled to the enclosure.

12. The system of claim 1, where the other-media total includes totals of media selected from a group consisting of traveler's checks, gift certificates, credit card receipts, and coupons.

13. The system of claim 1, wherein the keypad and the printer are integrated in a single housing of the controlling device.

14. The system of claim 1, further comprising a communication link to a network.

15. The system of claim 14, wherein the communication link couples the controlling device to the network via at least one of a wired connection or a wireless connection.

16. The system of claim 14, wherein the network is a cash management system.

17. The system of claim 1, further comprising a safe for receiving currency processed by any of the currency bill processing device and the coin scale.

18. The system of claim 17, wherein the safe is located below an enclosure in which the coin scale and the controller are located.

19. The system of claim 1, further comprising a controller and a display communicatively coupled to the controlling device, the controller being programmable to cause one or more prompts to be displayed on the display, the prompts being associated with operator tasks required for determining a currency processing function.

20. The system of claim 19, wherein the currency processing function includes determining an aggregate total of currency bills, coins, and other media present in a till.

21. The system of claim 19, wherein the controller and the display are integrated in a single housing of the controlling device, the keypad and the printer also being integrated in the single housing of the controlling device.

22. The system of claim 1, wherein controlling device is communicatively coupled to the currency bill processing device and the coin scale via a wired connection or a wireless connection.

23. A method for processing currency bills and coins using a compact currency processing system, the method comprising:

counting currency bills of a plurality of denominations using a currency bill processig device to determine a currency bill total;

determining a coin total for at least one group of coins of a single denomination using a coin scale;

prompting operator input on a display of a controlling device, the controlling device being communicatively coupled to the currency bill processing device and the coin scale, the display being integrated into a housing of the controlling device;

receiving the operator input via a keypad of the controlling device, the keypad being integrated into the housing of the controlling device;

determining an aggregate total corresponding to the sum of the currency bill total and the coin total; and printing on a printer of the controlling device a hardcopy of information associated with the currency bills and the coins, the printer being integrated into the housing of the controlling device.

24. The method of claim 23, further comprising opening an enclosure tray to access the coin scale and the controlling device, the coin scale and the controlling device being located on the enclosure tray.

25. The method of claim 23, further comprising coupling an extension attachment to an enclosure of the currency processing system for accommodating the currency bill processing device.

26. The method of claim 23, further comprising communicating at least some of the information associated with the currency bills and coins to a cash management system.

27. The method of claim 23, further comprising transferring at least some of the currency bills and the coins to a safe.

28. The method of claim 23, further comprising an aggregate total of the currency bill total and the coin total.

29. A currency processing system comprising:

a supporting enclosure having an interior tray, the interior tray being movable between an extended position and a retracted position, the extended position being such that the interior tray is at least partially outside a main frame of the supporting enclosure, the retracted position being such that the interior tray is completely inside the main frame of the supporting enclosure;

a currency bill processing device for determining a currency bill total, the currency bill processing device being located on a top surface of the supporting enclosure;

a coin scale for determining a coin total for at least one group of coins of a single denomination, the coin scale being located on the interior tray of the supporting enclosure;

a controlling device communicatively coupled to the currency bill processing device and the coin scale, the controlling device being located on the interior tray of the supporting enclosure, the controlling device having an integrated keypad and an integrated printer.

30. The currency processing system of claim 29, wherein the system has a width of about 13 inches in width and about 13.75 inches in depth when the interior tray is in the retracted position.

31. The currency processing system of claim 29, wherein the system has a height of about 14.75 inches if the currency bill processing device is a single-pocket device and a height of about 22.75 inches if the currency bill processing device is a two-pocket device.

32. The currency processing system of claim 29, wherein the controlling device further includes a display for displaying prompts for guiding an operator through a sequence of events.

33. The currency processing system of claim 29, wherein at least one of the currency bill processing device, the coin scale, and the controlling device is coupled to a network via at least one of a wired connection or a wireless connection.

* * * * *

UNITED STATES PATENT AND TRADEMARK OFFICE

CERTIFICATE OF CORRECTION

PATENT NO. : 7,551,764 B2
APPLICATION NO. : 11/880011
DATED : June 23, 2009
INVENTOR(S) : Mark G. Chiles et al.

It is certified that error appears in the above-identified patent and that said Letters Patent is hereby corrected as shown below:

In Column 22, Claim 1, please replace Lines 27-29 with the following:

--...the compact currency processing device being adapted to determine the denomination of each of the currency bills;--

In Column 23, Claim 23, please replace Lines 59-61 with the following:

--counting currency bills of a plurality of denominations using a currency bill processing device to determine a currency bill total;--

Signed and Sealed this
Thirteenth Day of September, 2011

David J. Kappos
*Director of the United States Patent and Trademark Office*